(12) United States Patent
Okcu et al.

(10) Patent No.: US 7,886,185 B1
(45) Date of Patent: Feb. 8, 2011

(54) CREATION OF A DEVICE DATABASE AND SYNTHESIS OF DEVICE DRIVER INFORMATION DURING DISSIMILAR SYSTEM RESTORE

(75) Inventors: Okan Okcu, Austin, TX (US); Jason Anthony Miller, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 991 days.

(21) Appl. No.: 11/690,603

(22) Filed: Mar. 23, 2007

(51) Int. Cl.
*G06F 11/00* (2006.01)
(52) U.S. Cl. .......................... 714/7; 711/162; 719/327
(58) Field of Classification Search ................. 714/7; 719/327; 711/162
See application file for complete search history.

(56) References Cited

U.S. PATENT DOCUMENTS

| | | | |
|---|---|---|---|
| 5,598,563 A | 1/1997 | Spies | |
| 5,708,604 A | 1/1998 | Fontana et al. | |
| 5,708,654 A | 1/1998 | Arndt et al. | |
| 5,715,456 A | 2/1998 | Bennett et al. | |
| 5,732,282 A | 3/1998 | Provino et al. | |
| 5,802,365 A | 9/1998 | Kathail et al. | |
| 5,890,204 A | 3/1999 | Ofer et al. | |
| 6,078,990 A | 6/2000 | Frazier | |
| 6,170,055 B1 | 1/2001 | Meyer et al. | |
| 6,185,686 B1 | 2/2001 | Glover et al. | |
| 6,279,011 B1 | 8/2001 | Muhlestein | |
| 6,346,954 B1 | 2/2002 | Chu et al. | |
| 6,535,998 B1 | 3/2003 | Cabrera et al. | |
| 6,640,291 B2 | 10/2003 | Fujibayashi et al. | |
| 6,654,769 B2 | 11/2003 | Ito et al. | |
| 6,654,830 B1 | 11/2003 | Taylor | |
| 6,671,778 B2 | 12/2003 | Naberhuis et al. | |
| 6,681,323 B1 | 1/2004 | Fontaneri et al. | |
| 6,725,715 B2 | 4/2004 | Igarashi et al. | |
| 6,735,715 B1 | 5/2004 | Graham | |
| 6,745,207 B2 | 6/2004 | Reuter et al. | |
| 6,748,429 B1 | 6/2004 | Talluri et al. | |
| 6,760,787 B2 | 7/2004 | Forin | |
| 6,820,035 B1 | 11/2004 | Zahavi | |
| 6,820,214 B1 | 11/2004 | Cabrera et al. | |

(Continued)

OTHER PUBLICATIONS

U.S. Appl. No. 11/690,592, filed Mar. 23, 2007, Okcu, et al.

(Continued)

*Primary Examiner*—Stephen M Baker
(74) *Attorney, Agent, or Firm*—Meyertons, Hood, Kivlin, Kowert & Goetzel, P.C.; Dean M. Munyon

(57) ABSTRACT

Systems, methods, and computer-readable memory media for performing various computer configuration tasks are disclosed. One such configuration task is dissimilar system restore (DSR). Another such task is software deployment. In various embodiments, these configuration tasks operate on a target computer system using a utility operating system to perform detection of certain target system devices, determination of critical device classes on the source computer system, and updating of target computer configuration settings. Other tasks may be performed upon a computer system such as a backup server. These tasks include locating device drivers for the target operating systems and the installing utility operating system, as well as creating device driver packages that are usable to install device drivers for a plurality of devices.

20 Claims, 30 Drawing Sheets

U.S. PATENT DOCUMENTS

| | | | |
|---|---|---|---|
| 6,836,830 | B1 | 12/2004 | Yamagami et al. |
| 6,925,541 | B2 | 8/2005 | Yamagami |
| 6,954,824 | B2 | 10/2005 | Burton et al. |
| 6,999,913 | B2 | 2/2006 | Hensley |
| 7,007,144 | B2 | 2/2006 | Nakanishi et al. |
| 7,065,769 | B1 | 6/2006 | Tolopka |
| 7,107,534 | B1 | 9/2006 | de Jong |
| 7,164,809 | B2 | 1/2007 | Beyrouti |
| 7,287,257 | B2 * | 10/2007 | Meza .......................... 719/321 |
| 7,334,157 | B1 | 2/2008 | Graf et al. |
| 7,356,679 | B1 | 4/2008 | Le et al. |
| 2003/0159070 | A1 | 8/2003 | Mayer et al. |
| 2003/0195995 | A1 | 10/2003 | Tabbara |
| 2004/0003135 | A1 * | 1/2004 | Moore ......................... 709/321 |
| 2005/0125460 | A1 | 6/2005 | Yu et al. |

OTHER PUBLICATIONS

U.S. Appl. No. 11/690,634, filed Mar. 23, 2007, Okan Okcu.
U.S. Appl. No. 11/690,653, filed Mar. 23, 2007, Okcu, et al.
U.S. Appl. No. 11/351,778, filed Mar. 23, 2007, Okan Okcu.
U.S. Appl. No. 10/774,039, filed Feb. 6, 2004, Mitchell B. Mikula.
U.S. Appl. No. 10/435,131, filed May 9, 2003, Ketterhagen, et al.
U.S. Appl. No. 10/788,120, filed Feb. 26, 2004, Okcu, et al.
U.S. Appl. No. 10/788,143, filed Feb. 26, 2004, Graf, et al.
"Breaking Through the Dissimilar Hardware Restore Challenge", White Paper: System Recovery, Symantec Corporation, Copyright 2006, pp. 1-16.
"Recovery Manager® 3.0 User's Guide", http://www.winternals.com/Documentation/UsersGuides/RecoveryManager-v3.0-UsersGuide.pdf, 105 pages.
"Automated System Recovery with VERITAS Netbackup", VERITAS Bare Metal Restore, White Paper, VERITAS Software Corp., 2002, pp. 1-10.
Roman, Steven, "Windows Architecture", Chapter 9 from Win32 API Programming with Visual Basic, published by O'Reilly and Associates, Inc., 2000 Microsoft Corporation, 6 pages.
"Automated Deployment Services Technical Overview", Microsoft Corporation, Aug. 2003, pp. 1-25.
"CBMR-Dissimilar Hardware Recovery", CMB Support, Jun. 2005, 9 pages.
"AIX Change Management Software Upgrade, Preparation and Implementation", http://www.eservercomputing.com/ibmunix/tis/index.asp?sid=20&id=506&p=1, Dec. 2000, 9 pages.
"Introducing IBM Tivoli Configuration Manager", http://publib.boulder.ibm.com/tividd/td/ITCM/GC23-4703-00, 2000, 11 Pages.
Goodwin, Ron M., "Ignite-UX System Recovery", http://www.interex.org/pubcontent/enterprise/mar00/17goodwi.html, 2000, 10 pages.
"PowerQuest Drive Image 7.0", User Guide, May 2003 PowerQuest Corp., pp. 43-63.
"Drive Image 2002", PowerQuest Corp. 2002, 2 pages.
"VERITAS Backup Exec 9.1 for Windows Servers", Intelligent Disaster Recovery Option, White Paper, VERITAS Software Corp, 2003, pp. 1-9.
"How Volume Shadow Copy Services Work", http://www.microsoft.com/technet/prodtechnol/windowserver2003/library/TechRef/2b0d2457-b7d8-42c3-b6c9-59c145b7765f.mspx, Mar. 28, 2003, 7 pages.
"Managing Windows Packages," VERITAS NetBackup Bare Metal Restore 6.0, System Administrator's Guide for UNIX, Windows, and Linux, Sep. 2005, Chapter 10, pp. 163-166.
Office Action in U.S. Appl. No. 10/788,120, mailed Apr. 6, 2007.
Office Action in U.S. Appl. No. 10/774,039, mailed Apr. 19, 2007.
Bryan Leech, "PC-Update Online!" http://www.melbpc.org.au/pcupdate/2003/2003article8.htm, Reprinted from the Mar. 2000 issue of PC Update, the magazine of Melbourne PC User Group, Australia, 4 pages.
Final Office Action mailed Jan. 27, 2009 in U.S. Appl. No. 11/351,778 Okcu, et al.

* cited by examiner

```
1004 ┌ [Manufacturer]
     └ %BRCM% = Broadcom, NTx86.5.1
                        1012A          1012B              1012C                           1012
        ┌ [Broadcom]
        │ %OEM1_DEV5% = OEM1_DEV5.Inst, PCI\VEN_14e4&DEV_165D&SUBSYS_865d1028
        │ %OEM1_DEV5% = OEM1_DEV5.Inst, PCI\VEN_14e4&DEV_165D&SUBSYS_20031028
1010    │ %OEM1_DEV6% = OEM1_DEV6.Inst, PCI\VEN_14e4&DEV_1653&SUBSYS_86531028
        │
        │ %BCM5700%   = BCM5700.Inst,   PCI\VEN_14e4&DEV_1644
        └ %BCM5701%   = BCM5701.Inst,   PCI\VEN_14e4&DEV_1645

┌ [Broadcom.NTx86.5.1]
        │ %OEM1_DEV5% = OEM1_DEV5.XpInst, PCI\VEN_14e4&DEV_165D&SUBSYS_865d1028
        │ %OEM1_DEV5% = OEM1_DEV5.XpInst, PCI\VEN_14e4&DEV_165D&SUBSYS_20031028
1020    │ %OEM1_DEV6% = OEM1_DEV6.XpInst, PCI\VEN_14e4&DEV_1653&SUBSYS_86531028
        │
        │ %BCM5700%   = BCM5700.XpInst,   PCI\VEN_14e4&DEV_1644
        │ %BCM5700%   = BCM5700CX.XpInst, PCI\VEN_14e4&DEV_1644&REV_21
        └ %BCM5700%   = BCM5700CX.XpInst, PCI\VEN_14e4&DEV_1644&REV_22

;*******************************************************************************
; Install sections.
;*******************************************************************************

┌ [OEM1_DEV5.Inst] ◄─── 1042
        │ Characteristics = 0x84 ; NCF_HAS_UI | NCF_PHYSICAL
        │ AddReg    = NtAddReg, BCM5705M.Params, OEM1_DEV5.Params, ParamsNt8021p, ParamsC,
        │ ParamsWOLNS, ParamsFlow, DriverInfo
        │ CopyFiles = CopyFile.NtSys
        │ BusType   = 5
        │
        │ [OEM1_DEV5.Inst.NT.Services]
1040    │ AddService = b57w2k, 2, OEM1_DEV5.AddService, NtEventLog
        │
        │ [OEM1_DEV5.AddService]
        │ DisplayName   = %OEM1_DEV5%
        │ ServiceType   = 1
        │ StartType     = 3
        │ ErrorControl  = 1
        │ ServiceBinary = %12%\b57w2k.sys ◄─── 1044
        └ LoadOrderGroup = NDIS ;*******************************************************************************
; Localizable strings
;*******************************************************************************

┌ [Strings]
        │ BRCM          = "Broadcom"
        │ DISK_DESC     = "Broadcom NetXtreme Installation Media"
        │
1060    │ BCM5700       = "Broadcom NetXtreme Gigabit Ethernet"
        │ BCM5701       = "Broadcom NetXtreme Gigabit Ethernet"
        │
        │ OEM1_DEV5     = "Broadcom 570x Gigabit Integrated Controller" ◄─── 1062
        └ OEM1_DEV6     = "Broadcom NetXtreme Gigabit Ethernet"
```

FIG. 10

```
            ┌                                                              ┌─1600
            │ [Broadcom]
            │ %OEM1_DEV5%  = OEM1_DEV5.Inst,  PCI\VEN_14e4&DEV_165D&SUBSYS_865d1028
            │ %OEM1_DEV5%  = OEM1_DEV5.Inst,  PCI\VEN_14e4&DEV_165D&SUBSYS_20031028
     1610   │ %OEM1_DEV6%  = OEM1_DEV6.Inst,  PCI\VEN_14e4&DEV_1653&SUBSYS_86531028
            │
            │ %BCM5700%    = BCM5700.Inst,    PCI\VEN_14e4&DEV_1644 ◄─1614
            │ %BCM5701%    = BCM5701.Inst,    PCI\VEN_14e4&DEV_1645 ◄─1616      1612
            │ %BCM5702%    = BCM5702.Inst,    PCI\VEN_14e4&DEV_1646
            └

....

┌ [OEM1_DEV6.Inst]
            │ .
     1620   │ .
            │ ServiceBinary = %12%\a57w2k.sys, %12%\b57w2k.sys, %12%\c57w2k.sys
            │ .
            └ .

┌ [BCM5700.Inst]
            │ .
     1630   │ .
            │ ServiceBinary = %12%\a57w2k.sys, %12%\b57w2k.sys
            │ .
            └ .

┌ [BCM5701.Inst]
            │ .
     1640   │ .
            │ ServiceBinary = %12%\a57w2k.sys, %12%\d57w2k.sys
            │ .
            └ .

┌ [BmrDriverInfo]
            │ Section    = OEM1_DEV6.Inst
     1650   │ HardwareId = PCI\VEN_14e4&DEV_1653&SUBSYS_86531028
            │ OsLevel    = 5.1
            │ LoadOrder  = "NDIS"
            └
```

*FIG. 16*

CREATION OF A DEVICE DATABASE AND SYNTHESIS OF DEVICE DRIVER INFORMATION DURING DISSIMILAR SYSTEM RESTORE

BACKGROUND OF THE INVENTION

1. Field of the Invention

This disclosure relates generally to processing of information within computer systems, and more particularly to restoring data to target computer systems.

2. Description of the Related Art

The process of restoring or transferring data to a computer system is often problematic. One frequent problem relates to device drivers. For example, problems may arise if the "target" computer system (that is, the computer system on which data is to be loaded as part of the restore/transfer) has different hardware, etc. from the "source" computer system, on which the data to be restored was originally stored. In this example of "dissimilar system restore" (DSR), different device drivers may be needed on the target computer system than were used on the source computer system.

One such problem in performing DSR relates to obtaining and installing device drivers for certain target devices deemed necessary to boot the target computer system using the restored operating system (that is, the operating system that is desired to be installed on the target computer system). If the operating system that is being used to restore the target computer system (the "restoring" operating system) does not have functionality to determine whether devices running on the target computer system are within certain predetermined "device classes," the DSR process can become complicated, requiring substantial human intervention to complete. Such intervention not only makes DSR susceptible to error, but also can cause substantial delays in completing the restore process.

An improved approach to DSR and other restore operations is therefore desired.

SUMMARY

Various embodiments of methods, systems, and computer-readable memory media storing program instructions for performing configuration activities for one or more computer systems are disclosed.

In one embodiment, one or more computer-readable memory media store program instructions for restoring a target computer system to run a target operating system. The program instructions are executable to generate a database indicative of a first set of device identifiers that are included within a first plurality of driver information files, wherein the first plurality of driver information files are stored on the target computer system and are usable to install device drivers for devices within a predetermined set of device classes. The program instructions are also executable to use a first operating system running on the target computer system to determine a second set of device type identifiers that includes one or more device type identifiers for each device running on the target computer system. The program instructions are still further executable to use the second set of device type identifiers to determine those devices running on the target computer system that have a corresponding entry in the database.

In various embodiments, the first operating system is a utility operating system that does not include an application program interface (API) usable to determine a device class of a device located on the target computer system.

In some embodiments, the program instructions are further executable to select a first driver information file on the target computer system. The program instructions are also executable to select at least a first install section from the first driver information file, where the first install section corresponds to the target operating system. The program instructions are still further executable to determine at least a first device type identifier referenced within the first install section, where the first device type identifier corresponds to a first device. The program instructions are also executable to include the first device type identifier within the first set of device type identifiers.

In one embodiment, the program instructions are further executable to update the database to include a first entry, wherein the first entry includes the first device type identifier, a device class of the first device, wherein the device class of the first device is within the predetermined set of device classes.

In several embodiments, the first entry further may include a name of the first driver information file and a name of the first install section. In other embodiments, the first install section may also correspond to a hardware architecture of the target computer system.

In yet another embodiment, the program instructions are further executable to determine one or more of the predetermined set of device classes from a first set of restored configuration settings that are stored on the target computer system and are associated with the target operating system.

In one embodiment, the predetermined set of device classes may include at least one device class designated as a critical device class within the first set of restored configuration settings.

In various embodiments, the program instructions are further executable to generate a difference set by determining those devices on the target computer system having a device type identifier within the third set of device type identifiers that do not have an entry in restored configuration settings to be installed on the target computer system. The program instructions may be further executable to update the restored configuration settings to include one or more devices indicated by the difference set.

In one embodiment, the program instructions are further executable to identify a location of one or more driver information files corresponding to one or more network interface cards located on the target computer system. The program instructions are further executable to update restored configuration settings to be installed on the target computer system such that the updated restored configuration settings are usable to process the one or more network interface cards after restoration of the target computer system.

In yet another embodiment, the program instructions are executable to delete any network interface cards that are referenced in the restored configuration settings, but are not present on the target computer system wherein the restored configuration settings are to be installed on the target computer system.

In other embodiments, one or more computer-readable memory media store program instructions for restoring a target computer system to run a target operating system. The program instructions are computer-executable under a first operating system running on the target computer system to determine whether any mass storage device on the target computer system is missing a corresponding device driver. The program instructions are further executable to obtain, from a user, one or more driver information files corresponding to a first mass storage device on the target computer system that is missing a device driver and create, from the one or more driver packages received from the user, a driver package corresponding to the first mass storage device.

In other embodiments, the program instructions are executable to obtain, from a first set of configuration settings corresponding to the first operating system, a first set of device type identifiers that includes at least one device type identifier for each mass storage device on the target computer system. The program instructions are further executable to determine a second set of device type identifiers corresponding to those mass storage devices on the target computer system for which a device driver is available. The program instructions are still further executable to compare the first and second sets of device type identifiers.

In other embodiments, one or more computer-readable memory media store program instructions for restoring a target computer system to run a target operating system. The program instructions are computer-executable under a first operating system running on the target computer system to determine a list of devices on the target computer system that are within a predetermined set of device classes and that do not have corresponding entries in a first set of restored configuration settings corresponding to the target operating system. The program instructions are further executable, for each device in the list of devices, to determine a corresponding driver information file on the target computer system and an install section of the driver information associated with that device. The program instructions are further executable to use the install section to determine one or more device driver files and one or more updates to the restored configuration settings that are associated with installation of a device driver for that device.

In some embodiments, the program instructions are executable, for a given device in the list of devices, to apply the one or more updates to the restored configuration settings for the given device. The program instructions are further executable to copy the device driver files for the given device to the target operating system.

In one embodiment, the program instructions are executable to install, using the first operating system, a first service referenced by a first install section of a first driver information file, where the first install section is associated with a first device. The program instructions are further executable to retrieve a configuration setting of the first operating system that is updated by installation of the first device. The program instructions are further executable to apply the retrieved configuration setting to a corresponding configuration setting of the target operating system.

In yet another embodiment, the configuration setting of the first operating is a relative configuration setting.

In various embodiments, the program instructions are executable to process a first install section of a first driver information file to determine one or more updates to absolute configuration settings associated with a first device.

In another embodiment, the program instructions are executable to modify a path name associated with one or more device driver files referenced within a first install section of a first driver information file, where the first install section may be associated with a first device. The program instructions are executable to copy the one or more device driver files to a location specified by the modified path name, where the location corresponds to the target operating system.

Other embodiments include corresponding computer systems and methods.

BRIEF DESCRIPTION OF THE DRAWINGS

FIG. 10 depicts an example driver information file.

FIG. 16 depicts another example driver information file.

DETAILED DESCRIPTION

Figure 1A:
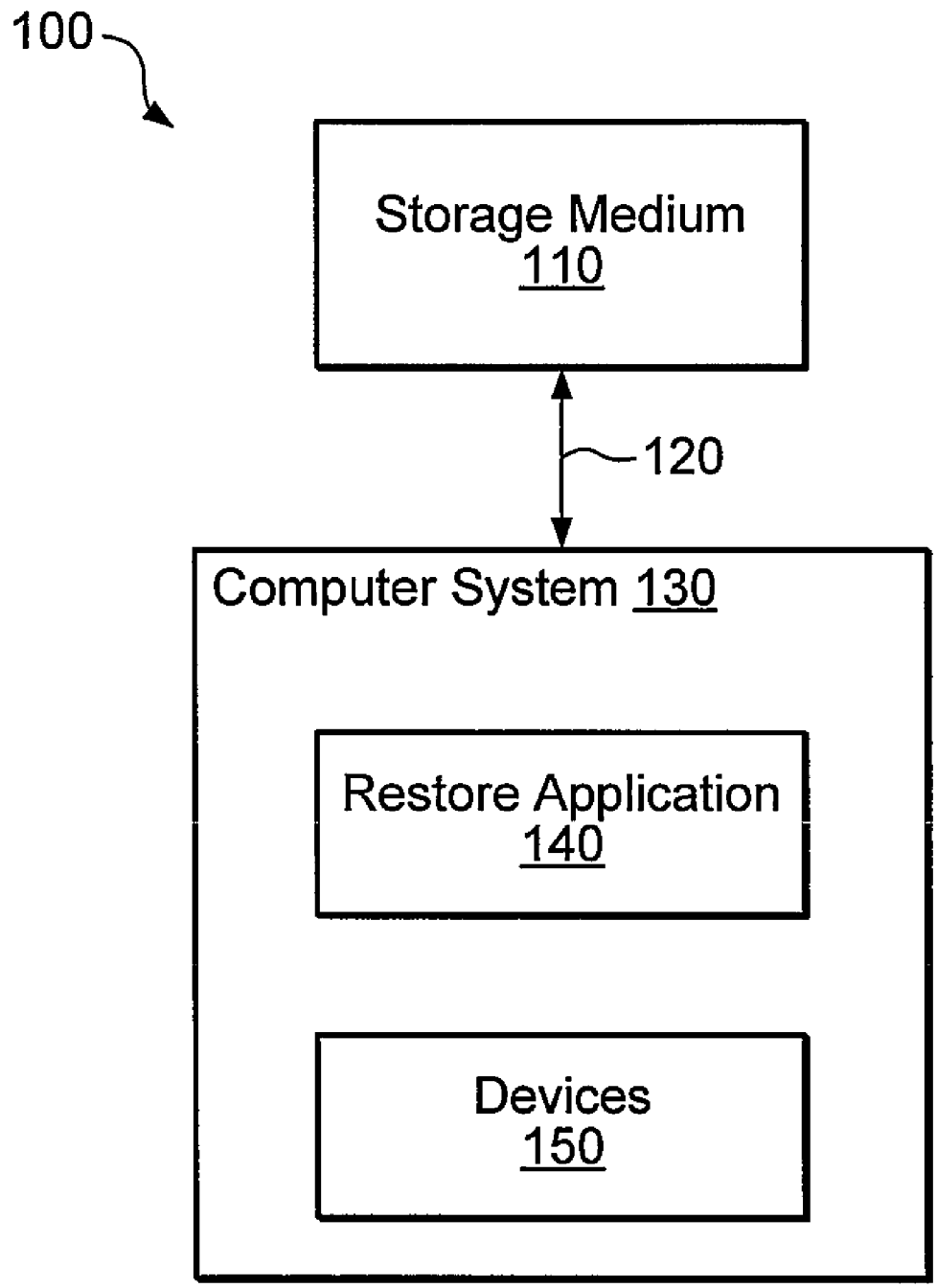
FIG. 1A is a block diagram of one embodiment of a system for performing restore or transfer functions.

The present disclosure describes systems, methods, and computer-readable media storing program instructions for a number of configuration-type activities for computer systems, including restoring, transferring or deploying data to one or more computer systems. As described below, several of these systems and methods involve operations relating to device drivers. As used herein, a "device driver" refers to a piece of software (e.g., a program or component) that manages interaction with a hardware device (e.g., between an operating system and a hardware device). For example, described below (among other things) are systems and methods for obtaining the proper device drivers for a target computer system, for creating device driver "packages" to be added to a target computer system, and for adding device drivers to a target computer system. Also disclosed below are systems and methods for detecting those devices that are included on a target computer system that does not yet have a target operating system loaded—detection of such devices can be used to identify the device drivers that may be needed to perform configuration tasks. As used herein, a "target operating system" refers to a OS that is being installed on a target computer system, which may be different from an operating system that is being used to install the target OS. In one embodiment, for example, MICROSOFT's™ Windows PE™ operating system may be used on a particular target computer system to install Windows XP™ as a target OS.

Also disclosed herein are systems, methods, and computer-readable media storing program instructions for automating the process of setting values for configuration settings on a target computer system. As used herein, the term "configuration settings" refers to values on a computer system (e.g., relating to hardware, software, networking, etc.) that are used by the operating system in order for the computer system to function properly. Values in a "registry" found on a computer system running a MICROSOFT™ WINDOWS™ operating system are examples of configuration settings.

Configuration tasks such as those referred to above are described in more detail below. First, the process of "dissimilar system restore" (DSR) is described with reference to FIGS. 1A-23. Deployment is then discussed with respect to FIGS. 24-25. As will be described in great detail below, the disclosed embodiments are usable to perform configuration tasks on computer systems with WINDOWS-based operating systems (e.g., WINDOWS XP, WINDOWS 2000, etc.). All of the disclosed embodiments are not intended to be limited to such computer systems, however.

Dissimilar System Restore (DSR)

As used herein, "dissimilar system restore" (DSR) is the process of transferring/restoring data originally associated with a source computer system to a target computer system, where at least some of the hardware, network settings, disk layout, etc. on the target computer differs from that of the source computer. The data to be transferred/restored may not physically reside on the source computer before being copied to the target computer system, but might instead be located on a server (e.g., a backup server), as in the case where data from the source computer system has been previously backed up to a server, allowing it to be subsequently restored/transferred to an arbitrary target computer system. The terms "restore" and "transfer" both connote moving of data to the target computer system—in some contexts, "restore" refers to a situation in which data is being transferred because the source computer has crashed, while the term "transfer" may not have such a connotation. As used herein, however, both terms refer to a moving of data. Thus, a DSR may refer to either a "restore" or a "transfer" operation. The term "restore" is used generally below to mean "restore" or "transfer."

Before discussing embodiments of DSR, consider the process of restoring data associated with a first computer system back to that same computer system at a subsequent point in time. Such a procedure may be thought of as "same system restore," by way of contrast to DSR. Same system restore may also be applicable when restoring data from a first computer system to a second computer system, where the first and second computer systems have identical hardware configurations (for example, each computer system has the same processor, the same network interface card, etc.)

Turning now to FIG. 1A, a block diagram of one embodiment of a system 100 is illustrated. As shown, system 100 includes a storage medium 110 coupled to a computer system 130 via a connection 120 (which may be a network connection in one embodiment). In this embodiment, computer system 130 stores program instructions and data usable to implement a restore application 140. Computer system 130 also includes a plurality of devices 150. Devices 150 may include any type of hardware within computer system 130. In one embodiment, devices 150 include devices such as network interface cards (NICs) and mass storage devices (MSDs) (e.g., disk drives, tape drives, etc.).

In the embodiment shown, restore application 140 can act to transfer data to storage medium 110 (e.g., in performing a backup operation) and to transfer data from storage medium 110 (e.g., in performing a restore operation). Thus, restore application 140 can also be thought of as a "backup application," or "backup/restore application." Restore application 140 acts as a client in communicating with storage medium 110 in one embodiment, which may be located on one or more server computers. Accordingly, restore or backup application 140 can also be referred to as a "client" (the term "backup client" is used subsequently below). There are many commercial products that can perform functionality akin to restore application 140, including SYMANTEC's™ Norton Ghost™ and Veritas NetBackup™.

During operation of computer system 130, restore application 140 is configured to send specified files and configuration information regarding system 130 to storage medium 110. The configuration information may include, for example, information stored in a registry file in a WINDOWS™-based computer system. Restore application 140 may run at pre-designated times or in response to specific user input.

Consider the following use of an application such as restore application 140 in the context of system 100. Suppose that the hard drive controller of computer system 130 fails catastrophically ("crashes") such that it has to be replaced. (The hard drive controller is one of devices 150.) Previously, restore application 140 has copied some version of system data (e.g., word processing documents, e-mail, etc.) and configuration settings to storage medium 110. Storage medium 110 may also store an "image" of the operating system that was running on computer system 130.

After crashing, computer system 130 may then be repaired—for example, by receiving a new hard drive controller. If the new hard drive controller is the same as the previous controller, the device driver is typically the same as that used before the crash of system 130. Accordingly, if the device driver for the hard drive controller has been stored on storage medium 110 by restore application 140, this device driver can typically be transferred back to system 130 via connection 120, which increases the chance that system 130 will continue to perform as it did prior to the hard drive crash. Thus, the fact that a given device driver is available during the restore process can greatly decrease the complexity of this process.

The embodiments described below with reference to FIGS. 1B-23 are described in the context of DSR. It should be noted, however, that these embodiments may be equally applicable in the same system restore context. Accordingly, this disclosure is not intended to be read as limited to the DSR context. For example, various embodiments described below may be used in a "standalone" context (e.g., outside a restore process).

Figure 1B:
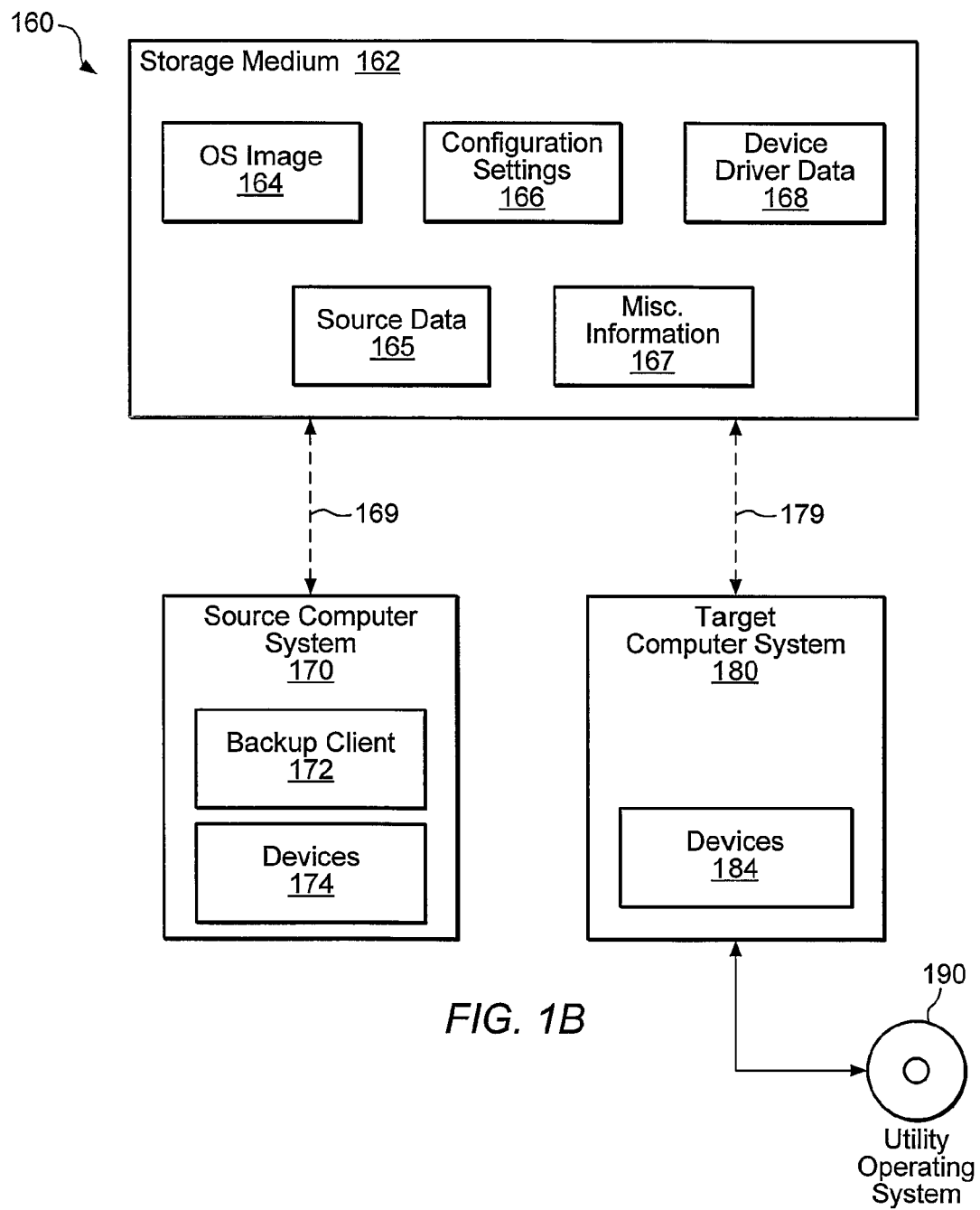
FIG. 1B is a block diagram of one embodiment of a system for performing dissimilar system restore (DSR).

Turning now to FIG. 1B, one embodiment of a system 160 for performing DSR is shown. The data to be transferred as part of the DSR process may include a variety of information, including an operating system image, configuration settings, device drivers, and other information (e.g., disk partition information). DSR can be used, for example, in migrating from a first hardware platform to a second, differing hardware platform. In various situations, this migration may occur because the source computer has failed or because a user wishes to change physical machines.

As shown, system 160 includes a storage medium 162 coupled to a target computer system 180 via connection 179. Storage medium 162, which may be a server system in one embodiment, is also shown as coupled to a source computer system 170 via connection 169. Connection 169 is shown as a dotted line in FIG. 1B, which indicates that source computer system 170 may or may not have a working connection to storage medium 162. Connection 169, like connection 179, can be a network connection (and connections 169 and 179 can also be over the same network).

Source computer system 170 stores program instructions and data usable to implement backup client 172. Source computer 170 also includes a plurality of devices 174. Target computer system 180, in one embodiment, has no preloaded software prior to the DSR process and thus may be referred to as "bare metal hardware," including devices 184 (which may differ in some fashion from devices 174 in the context of FIG. 1B). As will be described below, devices 184 include an input/output device (e.g., optical drive, floppy disk, flash drive, etc.) usable to load a utility operating system (UOS or utility OS) 190. UOS 190 is usable, among other things, to perform certain tasks relating to restoring data to target computer system 180.

In the embodiment shown in FIG. 1B, storage medium 162 stores a variety of types of data that can be restored to target computer system 180. These types of data include an operating system (OS) image 164, source data 165, configuration settings 166, device driver data 168, and other types of information (referred to for the sake of convenience as "miscellaneous information 167" in FIG. 1B). In one embodiment, this information was previously stored to storage medium 162 by backup client 172 via connection 169. This stored information is thus available to implement the DSR process. Furthermore, as will be discussed further below, it may be the case that some of the device drivers that will ultimately be used to restore target computer 180 are not stored on storage medium 162 at the outset of the DSR process. Accordingly, information such as additional device drivers may be stored to storage medium 162 at various points in the DSR process.

OS image 164 may correspond to any suitable operating system or operating system version. As used herein, the term "image" refers to all of the files that make up the operating system. For example, OS image 164 may correspond to an operating system such as MICROSOFT's WINDOWS XP™. In one embodiment, OS image 164 was copied by backup client 172 from source computer 170. Alternately, OS image 164 is one of several OS images available to be restored from storage medium 162. Accordingly, if it is determined that OS image 164 is to be restored to target computer system 180, OS image 164 can be referred to as the "target OS" for system 180.

Configuration settings 166, in one embodiment, may correspond to WINDOWS™ registry values. Examples of registry values include device driver settings and TCP/IP settings. Additionally, storage medium 162 stores device driver data 168, which may have been obtained either from source computer 162 or from other sources, such as media supplied by a user. Data 168 may include device driver files, other related files, and information relating to the device drivers (e.g., a database of device drivers stored on medium 162). Source data 165 refers to any user information such as program data (e.g., email, word processing documents) that has been previously stored to medium 162. Finally, storage medium 162 can store "miscellaneous" system information regarding target computer 180—for example, information about how the target hard drive is to be partitioned upon restore.

Storage medium 162 can have any type of non-volatile memory. In one embodiment, storage medium 162 is memory located on or accessible to one or more server computers ("server system"). This server system may be, for example, a server dedicated to storing, among other things, various OS images and corresponding configuration settings for one or more "client" machines. In one embodiment, storage medium 162 can even be storage associated with source computer 170.

As described above, target computer system 180 is the "destination" of the DSR process. Target computer system 180 may be any suitable computer system that includes one or more processors, memory, and one or more input/output devices. As will be described below, target computer system 180 includes at least one device that is usable to load UOS 190 (e.g., CD or DVD ROM drives, FLASH memory drive, floppy disk drive, or a bootable network card that can load UOS 190 from an image on a remote network server). For illustrative purposes, UOS 190 is indicated as residing on an optical medium in FIG. 1B.

Utility OS 190 may be any suitable operating system. While UOS 190 may be a full-fledged operating system, in many embodiments UOS merely includes sufficient functionality to boot target computer 180 and perform various diagnostic and utility functions. In one embodiment, UOS 190 is MICROSOFT's Windows PE™. The "PE" in Windows PE™ refers to "preinstallation environment," and may be considered a "lightweight" version of Windows XP™ or Windows Server 2003™ that is used for the deployment of, for example, workstations and servers, particularly in enterprise environments. Windows PE™ may also used to preinstall WINDOWS™ client operating systems to PCs during manufacturing. It can also be used as an alternative to MS-DOS™ as an OS by booting from a CD or USB flash drive instead of booting from a floppy. In one embodiment, UOS 190 can be an operating system specifically written or modified to incorporate functionality implementing many of the concepts disclosed herein.

In one case of DSR, target computer 180 has no loaded software when DSR is commenced. Accordingly, UOS 190 may be used to boot target computer 180. Subsequently, as described below, UOS 190 can be used to detect devices located on target computer system 180 (in one embodiment, the devices that are to be detected are limited to NIC or MSD devices). This information can then be used to enable connection 179 (either automatically or by manually configuring a network interface of target computer system 180). Once communication with medium 162 is established, data can then be transferred to system 180, and the DSR process may then continue. Ideally (but not necessarily), software on target computer system 180, once DSR is complete, would function largely as it did on source computer system 170.

Figure 1C:
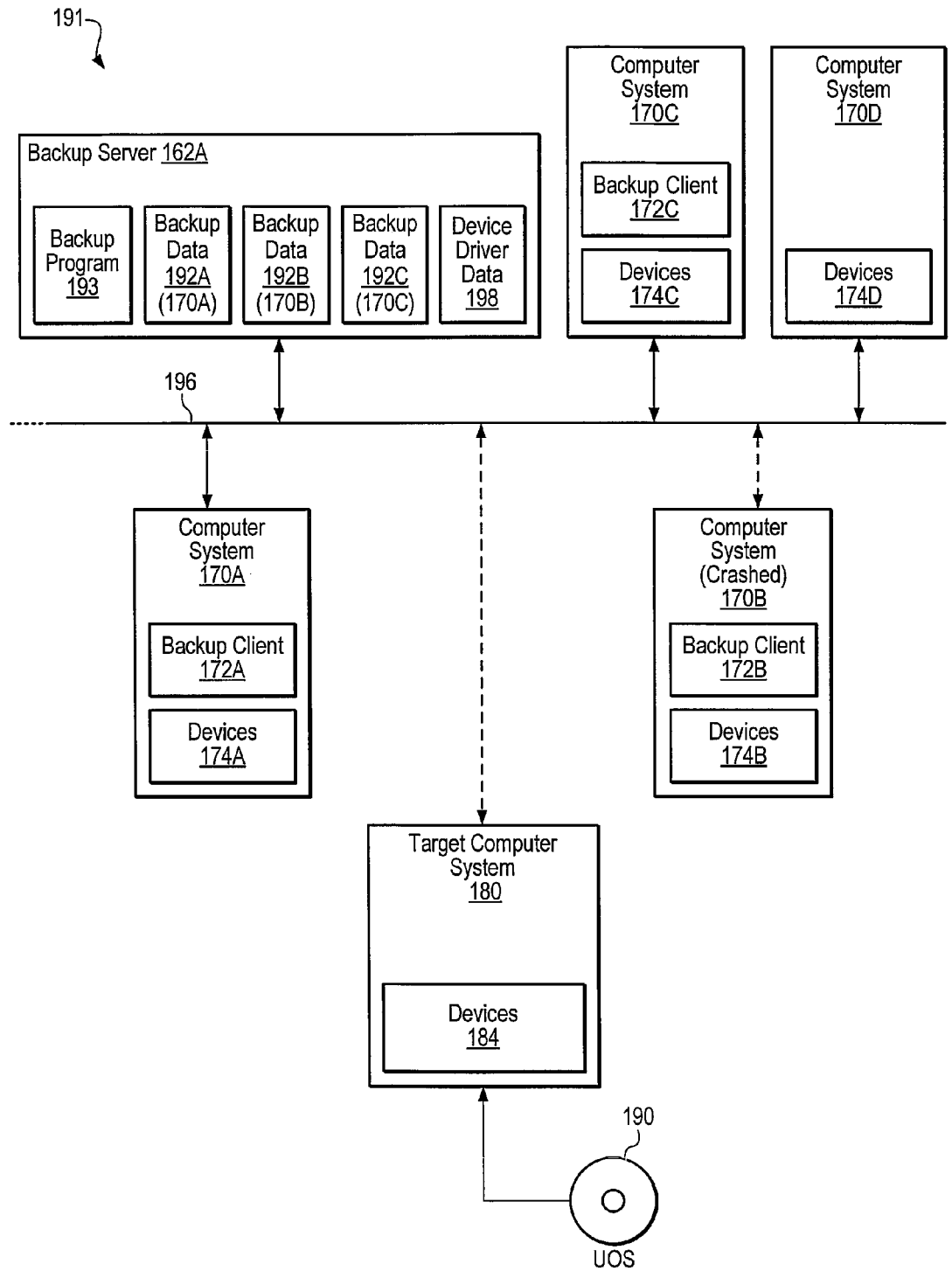
FIG. 1C is a block diagram of one embodiment of a network system that can be used to perform DSR.

Turning now to FIG. 1C, a block diagram of one embodiment of a system 191 is shown. System 191 is usable to facilitate restore/transfer operations. As shown, system 191 includes a backup server 162A coupled via a network 196 to a plurality of computer systems 170A-D and 180. The dotted lines connecting computer systems 170B and 180 with network 196 indicate that the network connection may not be working at a particular point in time.

In the embodiment shown, backup server 162A stores backup data 192A-C, which corresponds to backup data for computer systems 170A-C, respectively. (The term "backup data" and "backup server" do not necessarily connote that the data on 162A was stored as a result of a backup per se—these terms are used more generally here to refer to any data on 162A that may be transferred to computer systems 170 and 180.) Backup server 162A also stores data and program instructions usable to execute a backup program 193 that is usable to communicate with a client/target machine. (Again, "backup program" here simply means a program that can communicate with a client system (e.g., 170/180) to transfer data.) Backup server 162A can include multiple computer systems or storage arrays, and is not intended to be limited to any particular type of storage architecture or configuration.

Optionally, backup server 162A stores driver data 198, similar to device driver data 168 described above. Thus, data 198 may include device driver and related files, as well as other information relating to the drivers (e.g., a driver database). In one embodiment, this driver data may include driver "packages" (discussed below). In one embodiment, device drivers stored on 162A may be "third-party" drivers (that is, drivers for devices that are not "native" to computers systems 170 and 180 and thus not part of the original configuration of these systems). In one embodiment, software on backup server 162A (not shown in FIG. 1B) may automatically locate device driver files on any computer system 170/180 found on network 196, and copy these files to server 162A (and may also update an associated database on 162A that lists device drivers stored on 162A).

Network 196 can be any type of suitable network. For example, network 196 may be a local area network (LAN) or a wide-area network (WAN). The reference numeral 196 is also representative of any type of network infrastructure needed to support network 196.

Computer systems 170A-D and 180 can be any type of computer system that can be coupled to network 196. Each computer system 170/180 is shown as including a corresponding set of devices 174/184. At least one of devices 184 is usable to load UOS 190, which may be Windows PE™ in one embodiment.

Computer systems 170A-C are shown as storing data and program instructions executable to implement an instance of a client backup program 172A-C (these may be the same program or different types of programs). Backup programs 172 are executable to store one or more types of data to backup server 162A, communicating using network 196 and, in various embodiments, backup program 193. The information stored by programs 172 may subsequently be used to fully or partially restore the corresponding source computer system 170. Note that computer system 170D is not shown as having a backup client running; thus, a system such as 170D may not restorable (in this embodiment) via backup server 162A.

In the embodiment shown, target computer system 180 may be restored using data from computer systems 170A-C, using the corresponding data 192 that is stored on backup server 162A. For illustrative purposes, computer system 170B is labeled as "Crashed," meaning that the computer system has experienced a type of failure. Accordingly, this computer system is shown as connected to network 196 with a dotted line, which indicates that the connection to network 196 may not be working.

Target computer system 180 is coupled to receive and boot from a storage medium that includes UOS 190. Target computer system is configured to boot from UOS 190 even without any software loaded on a mass storage device. (Such functionality may be provided via a BIOS or other program stored in a nonvolatile memory of system 180.) As will be described below, various embodiments of the DSR process are usable to restore data 192B (originally transferred from computer system 170B) to target computer system 180.

Figure 2:
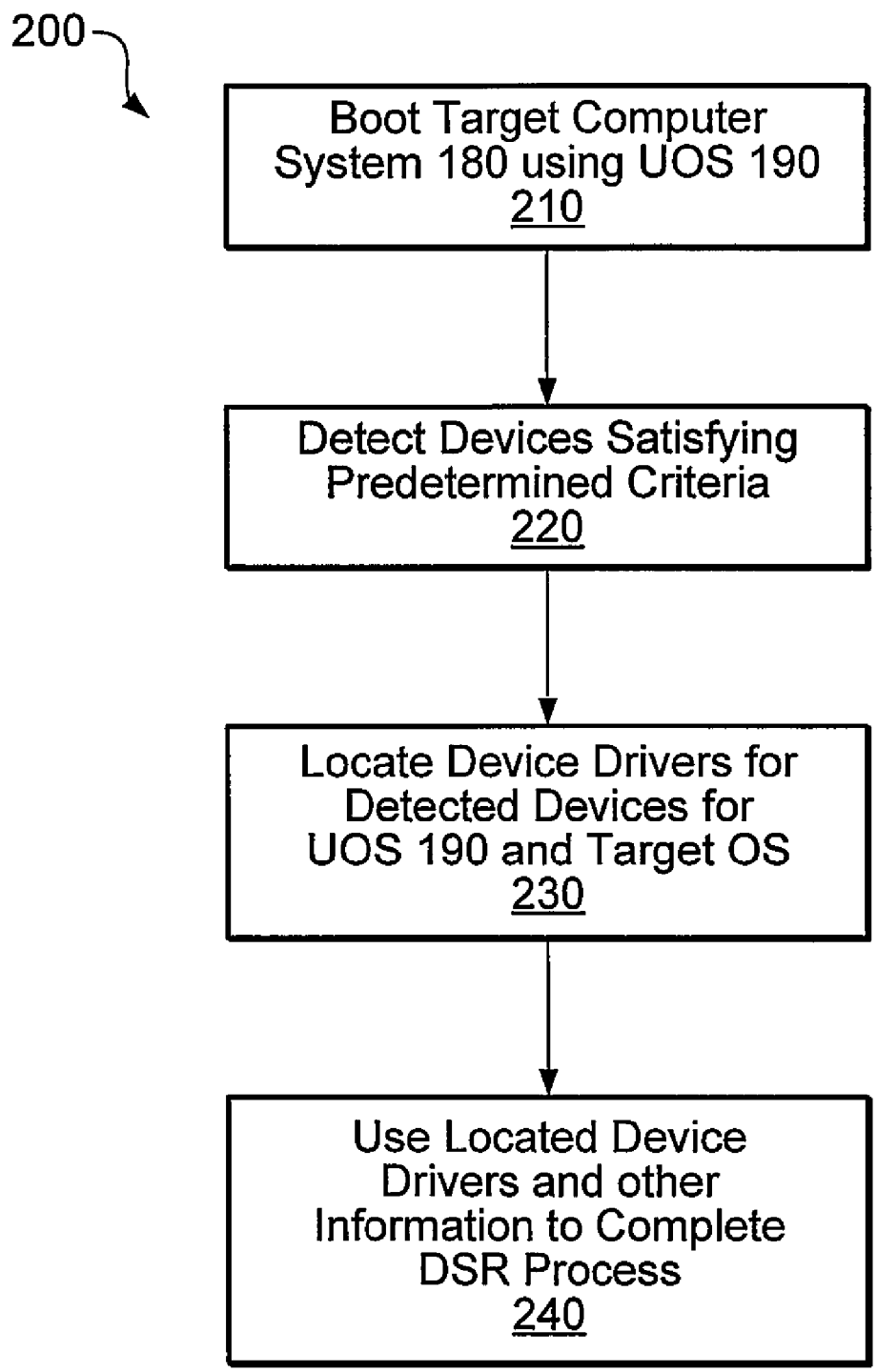
FIG. 2 is a flowchart of one embodiment of a method for performing a portion of a DSR process.

Turning now to FIG. 2, a flowchart of a method 200 is illustrated. Method 200 is one embodiment of a method for performing a portion of a DSR process. While any suitable computer may be the target for the DSR process, method 200 is described with reference to target computer system 180 for convenience.

In step 210, target computer system 180 is booted using a utility operating system 190, such as Windows PE™. UOS 190 may be stored on one or more computer-readable media. Alternately, UOS 190 may be preloaded within memory of target computer system 180. Several of the procedures in the DSR process described below may be performed under control of UOS 190. (Alternatively, several of the procedures in the DSR process described below may be performed on a computer system other than system 180, e.g., backup server 162A).

After booting, devices on target computer system 180 that satisfy predetermined criteria are detected in step 220. In one embodiment, the predetermined criteria relate to characteristics of the device, particularly whether the device is deemed as being needed to implement DSR. For example, one example of predetermined criteria is whether a device is a network interface card (NIC) or mass storage device (MSD). As described below, the NICs in target computer system 180 are used to communicate with storage such as backup server 162A, and the MSDs are used in order to load data to be restored (e.g., from 162A) to target computer system 180. Thus, it may be desirable, in one embodiment, to determine those devices on target computer system 180 that are either a NIC or an MSD. Embodiments of step 220 are described in further detail with reference to FIGS. 3-9. Other embodiments of predetermined criteria are of course possible.

In another embodiment, the predetermined criteria in step 220 may relate to the device "class" of a particular device. As used herein, a device "class" is distinguished from both a device "type" and a device "instance." Every physical device in a computer system is a device "instance." For example, suppose that a particular computer system has two identical NICs (suppose that they are both "X100" cards). Each of the two X100 cards constitutes an "instance" of a device. In this example, however, each of the two X100 cards would have the same device type identifier or identifiers, since both are the same type of cards. In contrast, a device class (e.g., "NET" device class in WINDOWS™-based computer systems) might encompass all NIC-type cards/devices.

In step 230, device drivers for one or more of the devices detected in step 220 may be located. As will be described below, these device drivers may be located in a variety of places, including a backup server (e.g., 162A), the image of the target operating system (that is, the operating system corresponding to the image (e.g., 164) to be loaded on computer system 180), UOS 190, or in a location or media supplied by a user such as a system administrator. The device drivers are located for both the utility OS and the target OS. Embodiments of step 230 are described in further detail below with reference to FIGS. 10-17A.

In step 240, the device drivers located in step 230, along with other information, are used to continue the DSR process. Step 240 may include a variety of operations, including, in one embodiment, adding one or more device drivers to the OS image (e.g., 164) that is destined for target computer system 180. Embodiments of step 240 are described in further detail below with reference to FIGS. 18-23. Upon successful completion of method 200, target computer system 180 may be able to execute software in the same manner previously executed on a source computer system (e.g., 170).

Figure 3:
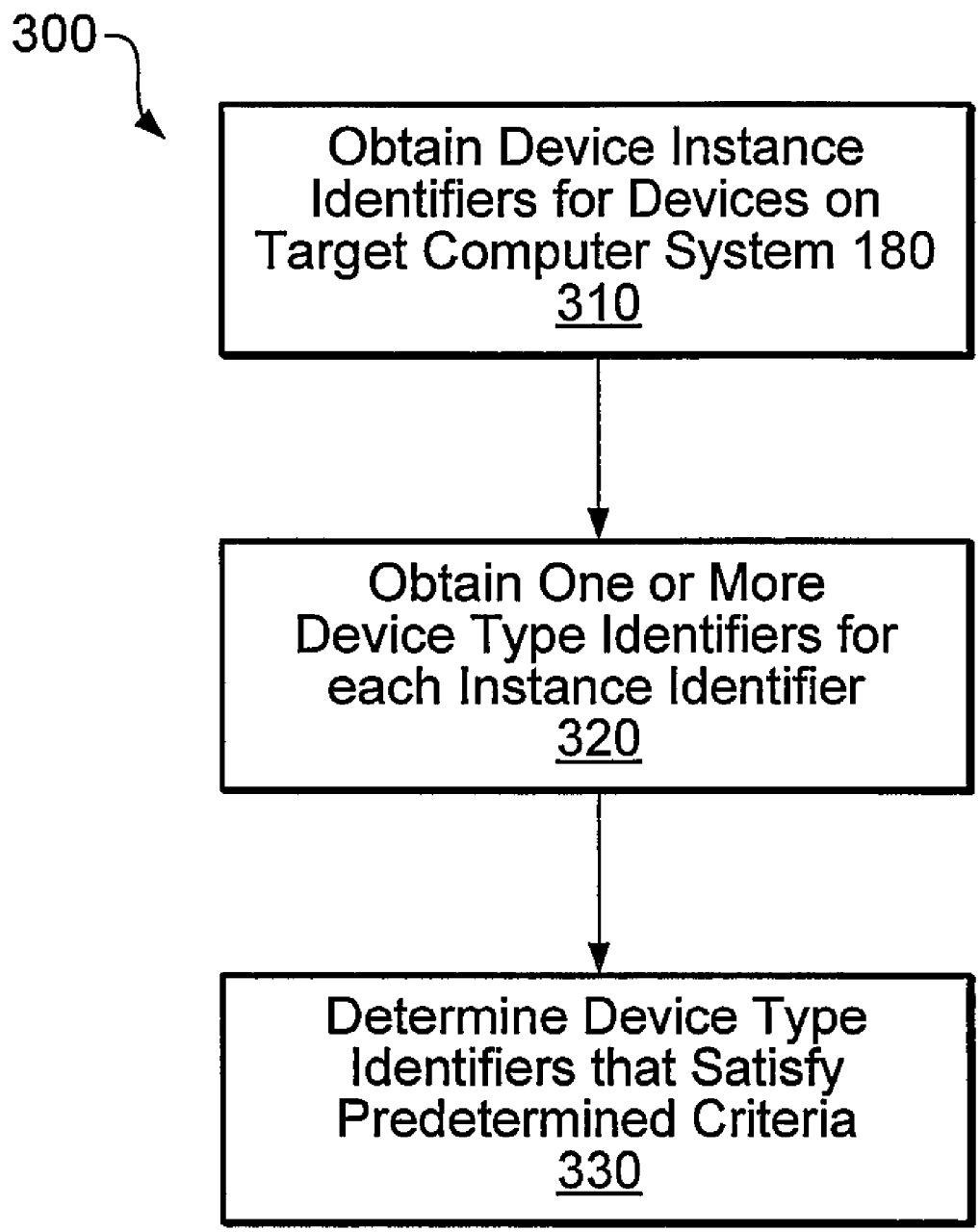
FIG. 3 is a flowchart of one embodiment of a method for performing device detection on a computer system.

Turning now to FIG. 3, a flowchart of a method 300 is shown. Method 300 is one embodiment of a method for performing device detection. In one embodiment, method 300 is performed as part of step 220 described above in the context of FIG. 2. Method 300 can also be performed outside the context of method 200 (that is, outside the context of DSR). Generally speaking, method 300 can be performed on a given computer system for which it is desired to determine the list of devices included in the system. Method 300 is particularly suited to systems that are not preloaded with any software.

In step 310, all device "instances" within a computer system (e.g., target computer system 180) are identified. As used herein, an "instance identifier" is a value that uniquely identifies a device instance, meaning that two otherwise identical devices (e.g., add-in cards) will each have their own instance identifiers. Thus, a list of device instance identifiers can be compiled, which may include two or more instance identifiers corresponding to a given device type (e.g., model). Examples of instance identifiers (also referred to as a "unique device identifier" or "unique device identification value") are plug and play (pnp) identifiers used by MICROSOFT™ operating systems. In one embodiment, the device instance identifiers are obtained via an API of the operating system running on the target computer system 180 (e.g., UOS 190).

In step 320, one or more device type identifiers are determined for each device instance identifier. Unlike instance identifiers, device type identifiers are not guaranteed to be unique within a computer system, as device type identifiers merely identify the type (e.g., model) of a particular device. Alternately, a device type identifier may identify two or more different device types (e.g., two models of devices that share a given device driver). Device type identifiers may thus be usable to specify a device driver for one or more corresponding devices.

In one embodiment, this information in step 320 is obtained from configuration settings of the computer system for which device detection is taking place. For example, when the utility operating system is 190 used to boot target computer system 180, UOS 190 may compile and store device type identifiers for the devices found on the system. These stored device type identifiers may then be accessed via the configuration settings (e.g., by using the device instance identifiers or some derivative thereof). Note that there may be more than one device type identifier for each instance identifier.

Finally, in step 330, the device type identifiers determined in step 320 are analyzed to determine if any of them correspond to devices that satisfy predetermined criteria. ("Predetermined" is relative to the beginning of step 330, as it is assumed that the criteria for which detection is sought are known prior to commencing that step. The predetermined criteria may be fixed and unchangeable or may be set prior to a particular instance of method 300.). In one embodiment, information within the device type identifiers (e.g., a sub string of text within the identifier) is used to determine whether the predetermined criteria are satisfied. (For example, if the predetermined criteria relates to what device class a given device is in, information in the device type identifier might be usable to make the determination of step 330.) Upon completing step 330, information identifying devices satisfying the predetermined criteria is available. This information may be used to determine which device drivers should be checked for their availability (e.g., in step 230 of method 200). As stated above, in an environment that uses a network backup server, the predetermined criteria may correspond to whether the device is a NIC or MSD device.

Method 300 may be performed on any suitable computer system such as target computer system 180. Program instructions (which might be source code, executable code or interpretable code in various embodiment) for implementing method 300 may be located within or added to UOS 190. Alternately, these program instructions may be executed as part of a standalone program (e.g., running on top of UOS 190). Method 300 may also be performed using a network connection if the program instructions implementing the method are executed in a location that is remote from target computer system 180.

Figure 4:
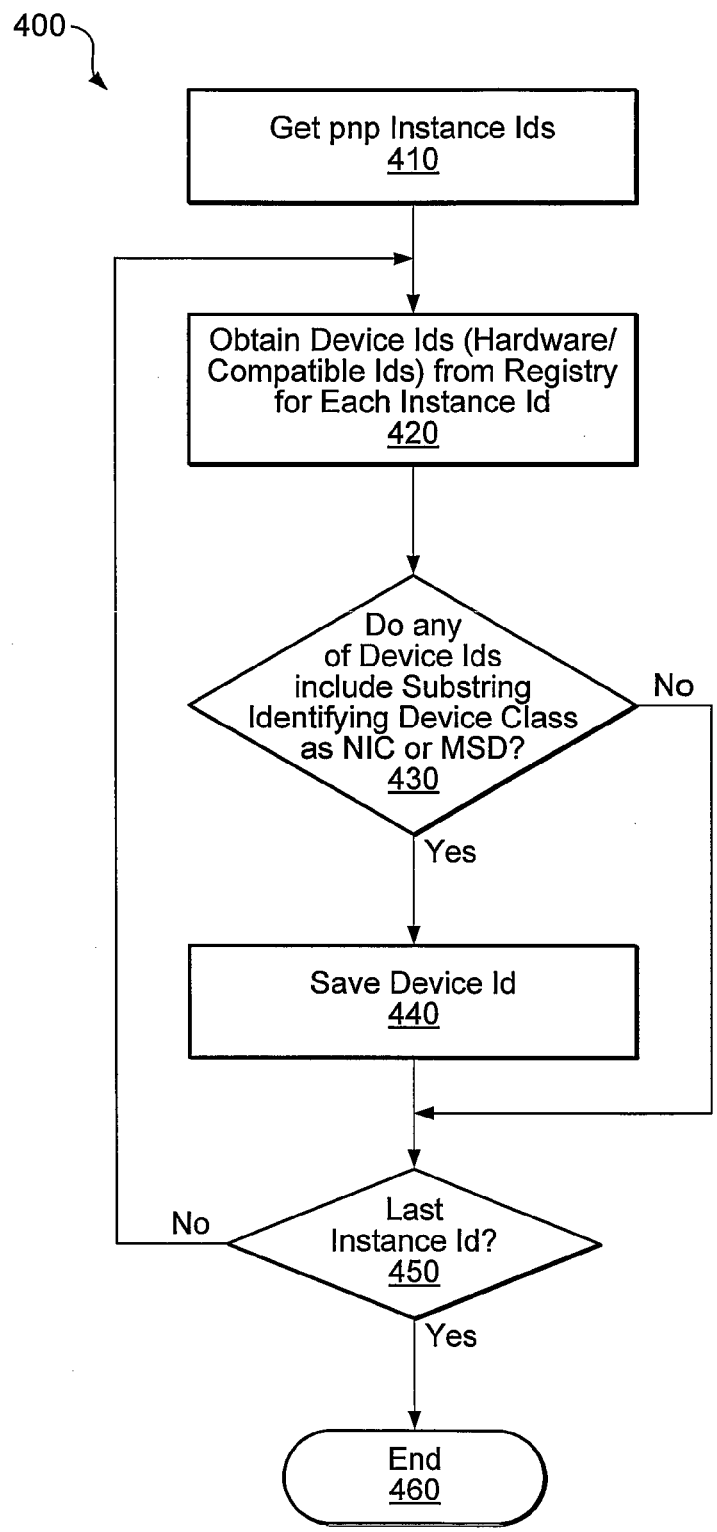
FIG. 4 is a flowchart of one embodiment of a method for performing device detection for a MICROSOFT™ WINDOWS™-based computer system.

Turning now to FIG. 4, a flowchart of a method 400 is shown. Method 400 is one embodiment of a method for using a utility OS such Windows PE™ to perform device detection on a computer running a WINDOWS™ operating system (e.g., system 180). Method 400, like method 300, may be performed within the context of DSR or as a standalone method.

In method 400, a WINDOWS™-based computer system (e.g., system 180) has been booted using a utility operating system such as Windows PE™. In step 410, all plug-and-play (pnp) instance identifiers (ids) are obtained. In one embodiment, these instance ids may be obtained by using the following Windows APIs: SetupDiGetClassDevs( ) SetupDiEnumDeviceInfo( ) and SetupDiGetDeviceInstanceId( ). Step 410 thus returns a unique value for each instance of a given device type if the system has two or more of a given device type, e.g., the same model NIC.

In step 420, one of the obtained instance ids is used to access one or more device type identifiers ("device ids" in FIG. 4) from the system registry. The registry, which is generated by an operating system such as Windows PE™ upon boot up, includes various configuration settings including information regarding one or more device type identifiers for each of the devices resident on the target computer system 180. In one embodiment, the device type identifiers in the registry may be either "hardware ids" or "compatible ids." A hardware id specifically identifies a particular type of device (e.g., a model by a particular device manufacturer) within a device class. For example, the device id or device type identifier for each instance of a BROADCOM™ NetXtreme Gigabit Ethernet card may be PCI\VEN_14e4&DEV_1644 in one embodiment. A compatible id, in contrast, may correspond to a more than type of device (e.g., a family of device types within a given device class that are produced by a particular manufacturer).

In step 430, each of the device type identifiers for the current instance id is analyzed to determine if the corresponding device is a NIC or MSD. (As mentioned above, the predetermined criteria may be different in other embodiments.) In one embodiment, this action may be performed by searching for the substring "&CC_02" to determine if the device identified by the device type identifier is a NIC. Similarly, the device type identifier may be searched for the substring "&CC_01" to determine if the corresponding device is an MSD.

If one of the device type identifiers in step 430 is determined to correspond to a NIC or MSD, the device type identifier is saved in step 440. Method 400 then proceeds to step 450. In step 450, if the current instance id is determined to be the last instance id, method 400 ends at step 460. Otherwise, method 400 returns to step 420, wherein one or more device type identifiers for the next instance id are obtained. If, in step 430, none of the device type identifiers for the current instance id are determined to correspond to a NIC or MSD device, method 400 proceeds to step 450.

Optionally, method 400 also includes the step of saving configuration settings for target computer system 180 that includes the MSD and NIC device type identifiers, and sending this configuration to server 162A for storage. If there is no current network connectivity with server 162, a user may save the configuration locally and manually transfer it to the server.

Note that several variations of method 400 are contemplated. For example, in step 420, all device type identifiers for all instance ids might be obtained before proceeding to perform other actions. In such an embodiment, step 430 might analyze all device type identifiers in one pass, recording those ids that indicate NICs and MSDs as in step 440. In such an embodiment, there would be no need for step 450.

Figure 5:
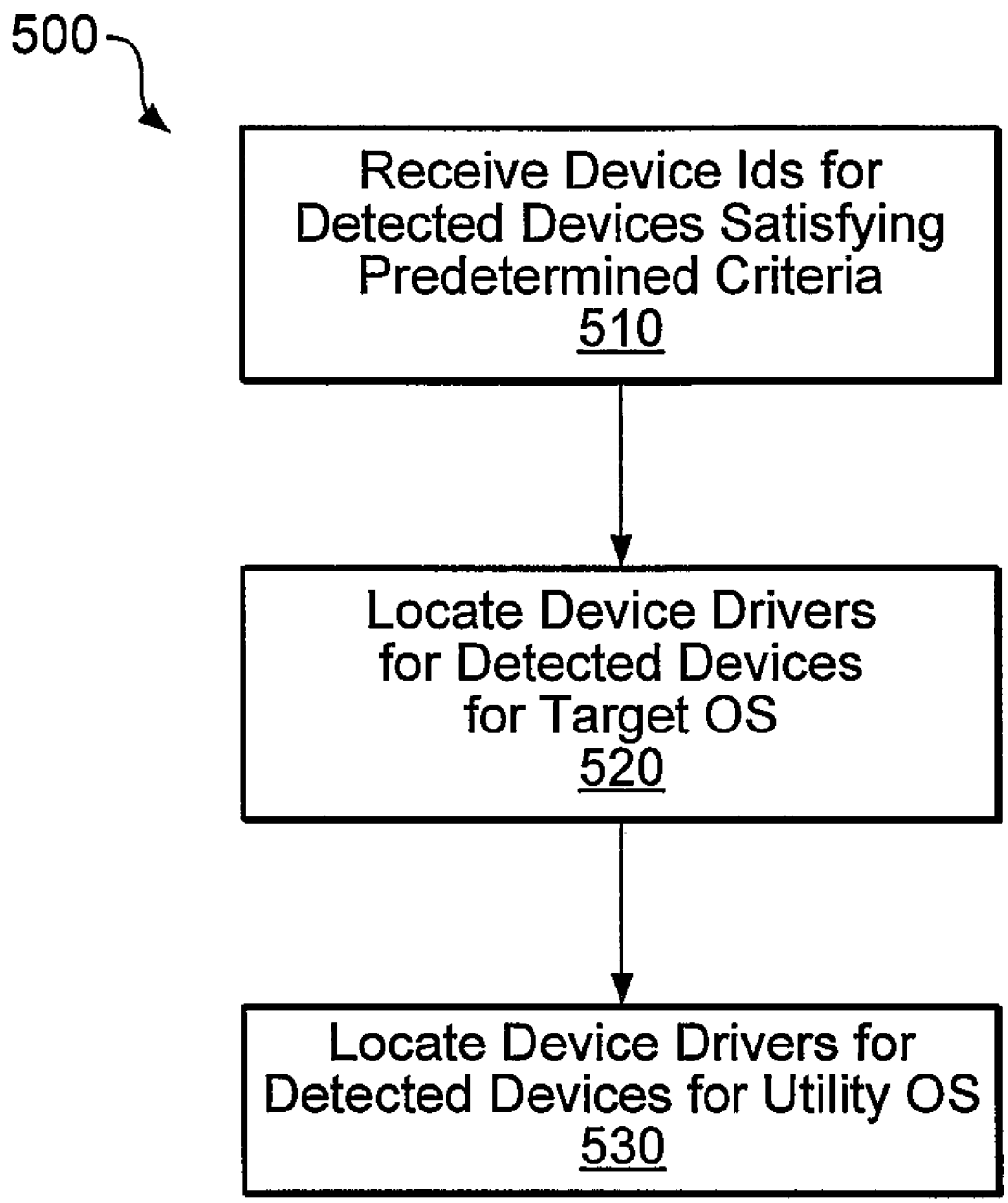
FIG. 5 is a flowchart of one embodiment of a method for locating device drivers for the target operating system (OS) and utility OS during a restore operation.

Turning now to FIG. 5, a flowchart of a method 500 is shown. Method 500 is one embodiment of a method for locating device drivers for the target OS and the utility OS for those detected devices satisfying predetermined criteria such as the exemplary criteria described above. In one embodiment, method 500 may be performed as part of method step 230 described above with reference to FIG. 2. Method 500 begins with step 510, in which device type identifiers ("device ids") are received. These identifiers correspond to devices detected within a method such as method 300 or 400 described above. As explained above, these device type identifiers correspond to devices within target computer system 180 that satisfy predetermined criteria (in one embodiment, the device type identifiers correspond to NIC or MSD devices). In step 520, device drivers for the received device type identifiers are located for the target OS. Step 520 therefore locates device drivers for devices that may be needed to load the target OS on target computer system 180. These drivers may already be in the target OS image 164, on backup server 162A, etc. Drivers located by step 520 will thus be available for subsequent DSR processing (e.g., processing described below with reference to FIGS. 18-23). Embodiments of step 520 are described in further detail below with reference to FIGS. 6-9.

Similarly, step 530 locates UOS device drivers for the devices detected by, for example, methods 300/400. By having access to these device drivers, UOS 190 may thus able to communicate with the corresponding devices during DSR of target computer system 180. Embodiments of step 530 are described below in greater detail with reference to FIGS. 13-17A.

In one embodiment, method 500 may be implemented on a server computer such as backup server 162A. The received device type identifiers may be received via a network connection. Alternately, device type identifiers may be manually copied to backup server 162A from target computer system 180. Program instructions implementing method 500 may be in a standalone application or a part of a larger program.

Figure 6:
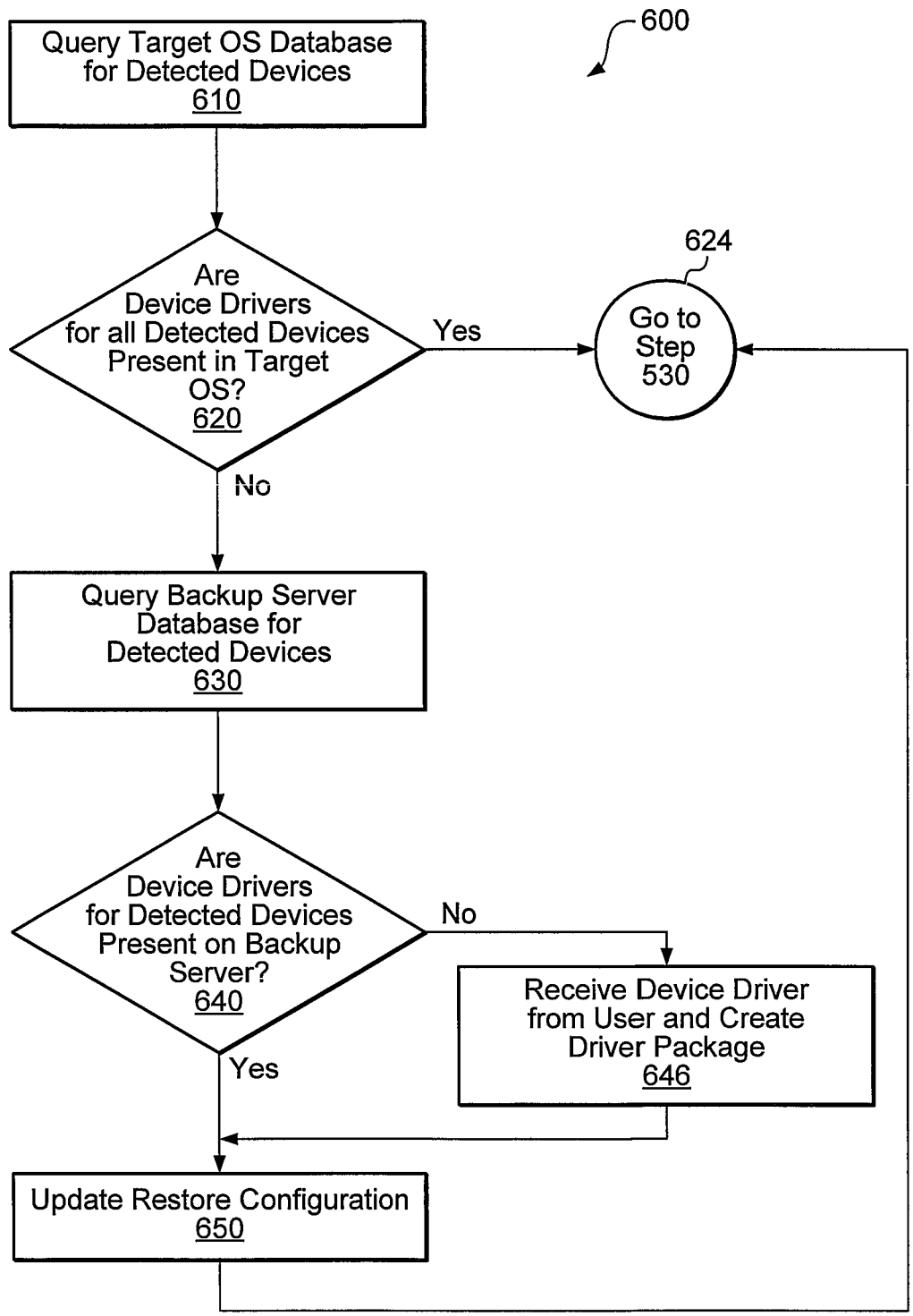
FIG. 6 is a flowchart of one embodiment of a method for determining whether device drivers for detected devices are present in or available to the target OS.

Turning now to FIG. 6, a flowchart of a method 600 is shown. Method 600 is one embodiment of a method for determining whether device drivers for detected devices are present in or available to the target OS. In step 610, a database corresponding to the target OS is queried to determine if the target OS includes one or more of the device drivers corresponding to the detected devices. Details of one embodiment of how the query of step 610 is performed are discussed further with reference to FIG. 7. (Additionally, creation of this target OS database is discussed further with reference to FIG. 9.) As shown in the decision box in step 620, if one or more device drivers for the detected devices are not indicated as being present in the target OS, method 600 proceeds to step 630. In one embodiment, if all detected device drivers are present in the target OS, method 600 concludes at step 624, proceeding, for example, to step 530 of method 500 (locating device drivers for UOS 190).

At step 630, a backup server database is queried for one or more of the detected devices. This database (which may be the same as the database queried in step 610 or a separate database) indicates one or more device drivers stored in a designated location (for example, storage located on one or more server computers such as backup server 162A). The database queried in step 630 can be stored on any suitable storage medium or server. This database, like the database queried in step 610, has been previously created as will be described below.

Storing device drivers on a storage medium such as backup server 162A may advantageously allow DSR to proceed with reduced user intervention (e.g., see method 1100 described below). In one embodiment, backup server 162A may have previously copied and stored various device drivers for devices found on computer systems coupled to the backup server (e.g., via a network such as network 196). Thus, in such an embodiment, a number of device drivers missing from target OS image 164 may already be stored on backup server 162A, thus facilitating a subsequent restore/transfer process such as a DSR of target computer system 180.

In one embodiment, the backup server database may be queried even for device drivers previously determined to be present in the target OS in steps 610-620. This may be performed, for example, if it is desired to check whether a later version of a device driver is present on backup server 162A or other storage medium. Alternately, the backup server database may be queried only for device drivers determined not to be present in the target OS database. Other implementations of step 630 are also possible.

From decision box 640, method 600 proceeds to either step 646 or 650. If there are detected devices that are not present in target OS image 164 or on backup server 162A, method 600 proceeds to step 646, in which device driver information is received from a user and a "driver package" is created. This process, which is discussed in greater detail below with reference to FIGS. 10-12, can make one or more device drivers available to target computer system 180 via backup server 162A. From step 646, method 600 proceeds to step 650, in which the restore configuration (ultimately destined for target computer system 180) is updated to point to device drivers residing on backup server 162A (such as driver packages package created from user-supplied files).

If all detected device drivers are determined to be either in the target OS or on backup server 162A, method 600 proceeds from step 640 to 650, and no user intervention is needed at this point. From step 650, method 600 proceeds to step 624, which corresponds to beginning step 530 of method 500. Like method 500, method 600 may be performed on a server computer such as backup server 162A. Program instructions implementing method 600 may be part of a standalone or larger application on, for example, backup server 162. Alternately, method 600 may run on a computer system remote to server 162A, and act on data stored on backup server 162A via a network connection.

Figure 7:
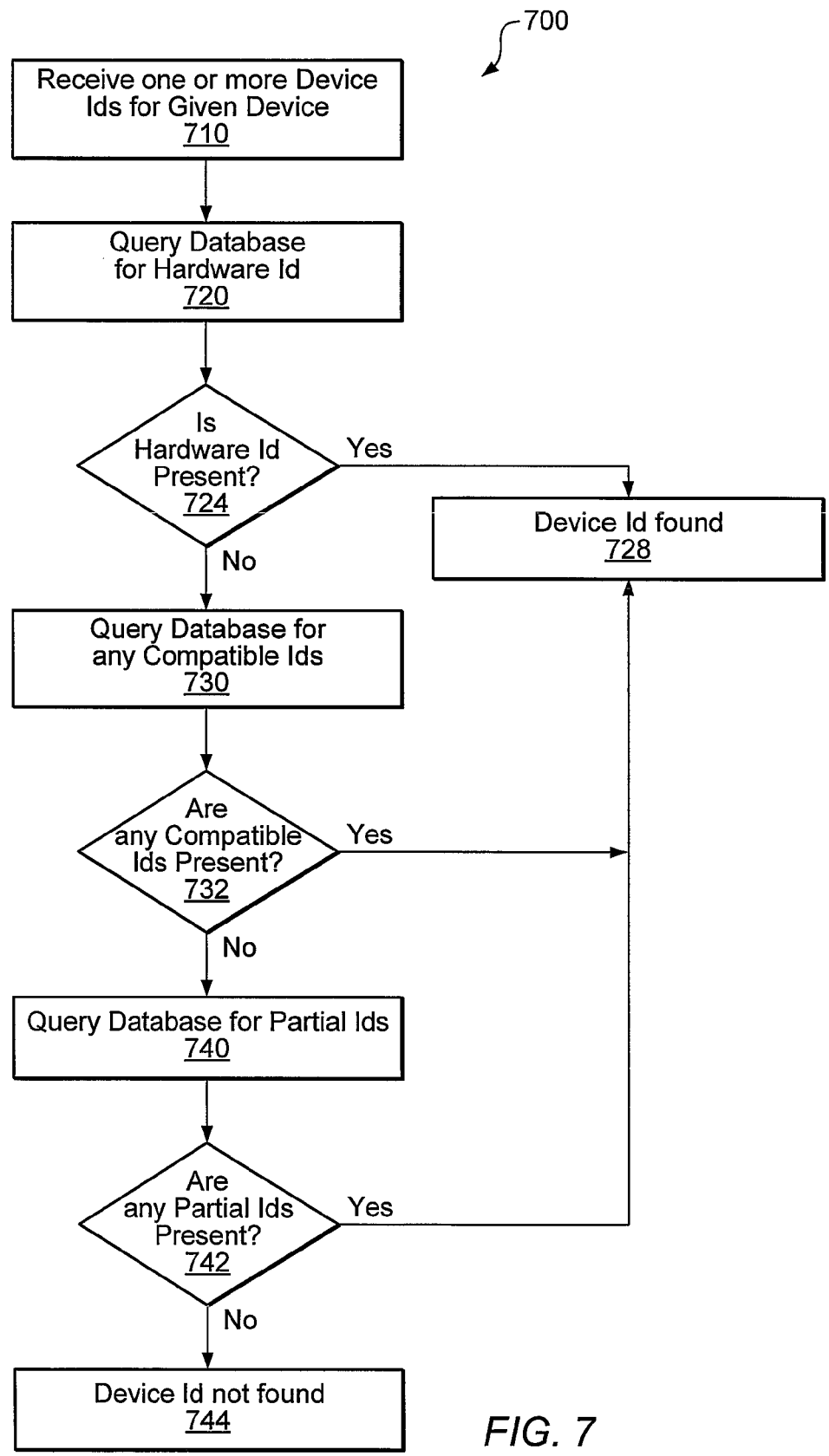
FIG. 7 is a flowchart of one embodiment of a method for querying a device driver database using a device type identifier.

Turning now to FIG. 7, a flowchart of method 700 is shown. Method 700 is one embodiment of a method for querying a device driver database using a device type identifier. Method 700 may be applicable to the database queries previously described in steps 610 and 630 of FIG. 6, as well as to a query of a database storing an indication of drivers present in UOS 190 (discussed below in the context of FIG. 13).

In step 710, one or more device type identifiers ("device ids") are received for a given device. Note that in one embodiment, method 700 may be repeated multiple times for each device id of a given device (e.g., a device instance detected in step 310). The one or more received device type identifiers may include a hardware id and/or one or more compatible ids. As described above, a "hardware id" is a device id that corresponds to a particular device type. In contrast, a "compatible id" is a device id that may correspond to a number of different device types. In this manner, a particular manufacturer may use a compatible id in some instances to cover a number of different device types.

In one embodiment, the one or more device type identifiers received in step 710 include a hardware id. Thus, in step 720, the relevant database is queried for the hardware id. (The "relevant database" may be a target OS database (e.g., in steps 610-620), a backup server database (e.g., in steps 630-640), or a utility OS database (to be discussed below), depending on what type of query is being performed.) The actions that can be taken as a result of this query are shown in step 724. If the query in step 720 indicates that a device driver for the hardware id is present in the database, method 700 ends with step 728, as the device driver is available. If, on the other hand, the query indicates that a device driver for the hardware id is not present in the database, the method proceeds to step 730. If the device type identifier(s) received in step 710 do not include a hardware id, method 700 may proceed directly from step 710 to 730 in one embodiment.

In step 730, the relevant database is queried for any compatible ids received in step 710. As shown in FIG. 7, method proceeds from step 732 to either step 728 or 740 depending on the result of the query made in step 730. Note that in one embodiment, the database queried in steps 720 and 730 (and 740 as well) is the same database.

In step 740, the relevant database is queried for so-called "partial ids." If, in a particular embodiment, partial ids are not supported, steps 740 and 742 may be omitted. As used herein, a "partial id" is a truncated version of a device type identifier. For example, in a WINDOWS™-based system, a partial id of a hardware/compatible id can be useful in attempting to locate a device driver that corresponds to the device type identifier(s) supplied in step 710. An example of partial id generation is discussed below with reference to FIG. 8.

Step 742 indicates actions to be taken as a result of the query made in step 740. If any partial ids are indicated as being present in the database, method 700 proceeds to step 728. Otherwise, method 700 proceeds to step 744, which indicates that a device driver for a particular device id is not present, either in the target OS (e.g., steps 610, 620) or on a backup server (e.g., steps 630, 640).

As noted above, method 700 may be repeated for each device type identifier of a given device, either until a device driver is located (step 728) or all device type identifiers are exhausted (step 744). A failure to locate a device driver for a particular device type identifier may require intervention from a user (e.g., receiving one or more driver files from a user). This process is discussed below with reference to FIGS. 10-12.

Method 700 can be performed on a variety of computer systems, including a computer such as backup server 162A, as part of any suitable program or application.

Figure 8:
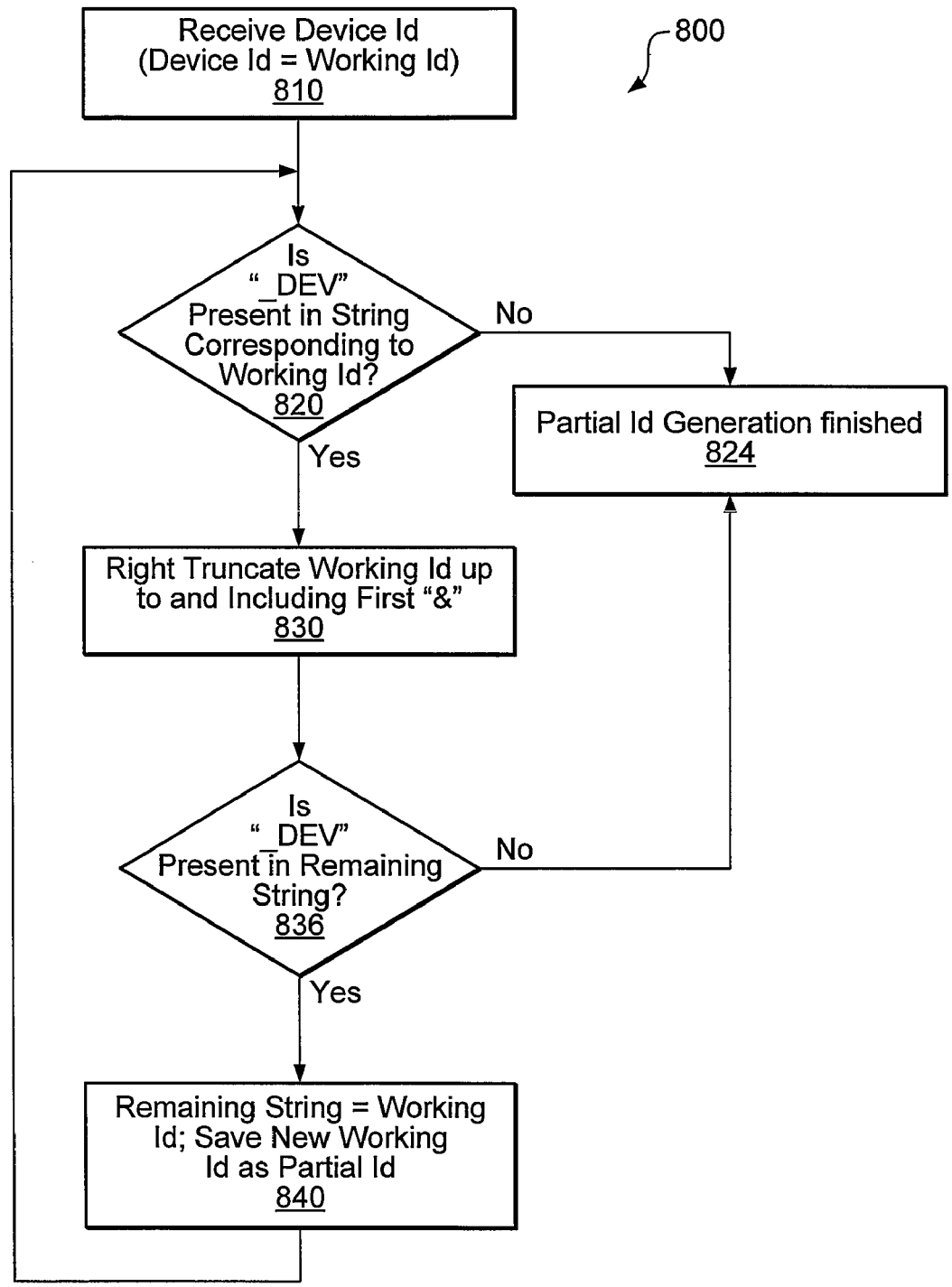
FIG. 8 is a flowchart of one embodiment of a method for generating partial ids for devices in a WINDOWS™-based computer system.

Turning now to FIG. 8, a flowchart of a method 800 is shown. Method 800 is one embodiment of a method for generating partial ids for devices in a WINDOWS™-based computer system. In step 810, a device type identifier ("device id") is received. In the embodiment of FIG. 8, this device type identifier may either be a hardware id or a compatible id. For purposes of describing method 800, consider the received device type identifier to be the current "working id."

In step 820, a determination is made whether the substring "_DEV" is present in the string corresponding to the working id. (In this embodiment, if the substring "_DEV" is not present in this string, the only thing left is the vendor id (e.g., INTEL™), and since a vendor id may correspond to thousands of different devices, this information is not usable alone to identify a particular device type). If "_DEV" is not present in the working id string, method 800 proceeds to step 824, which corresponds to a state in which partial id generation is finished. If, on the other hand, the substring "_DEV" is present in the working id string, method 800 proceeds to step 830. In step 830, a partial id is generated by truncating the N right-most characters in a string corresponding to the working id, where N is selected to include the rightmost "&" character in the string and all characters to the right of the "&." The "&" in WINDOWS™ device type identifiers can thus be used to delimit various portions of the identifier.

Next, in step 836, the remaining string (that is, the non-truncated portion) is again checked to determine if the string "_DEV" is present. If so, method 800 proceeds to step 840, and otherwise to step 824.

In step 840, the remaining working id is saved as a valid partial id. The remaining working id string is now considered the new working id, and method 800 returns to step 830. After each truncation in step 830, a partial id as long as the substring "_DEV" is present in the remaining string after the truncation.

An example of performing method 800 is instructive. Consider the following sample device type identifier that might be received in step 810 as the working id: PCI\VEN_14E&DEV_4324&SUBSYS_00011028&REV_02. In this example of a "PCI" device, 14E represents a vendor id ("hence, 14E is preceded by "VEN_"), 4324 represents the device identifier that the vendor assigned to the device, 00011028 is the subsystem identifier reported by the device, and REV_02 is the revision number.

In the first execution of step 820, since "_DEV" is present in the substring corresponding to the working id, the working id is truncated in step 830 by taking off everything on the right end of the string, beginning with the right-most "&." This truncation results in the following string: PCI\VEN_14E&DEV_4324&SUBSYS_00011028. Because "_DEV" is determined to be present in the remaining string in step 836, the remaining string is saved as a partial id in step 840. This partial id is now considered the working id upon method 800 returning to step 830.

A truncation is performed again in step 830. Because the remaining string still includes the substring "_DEV" (step 836), there is a second partial id: PCI\VEN_14E&DEV_ 4324. This second partial id is saved in step 840. A subsequent iteration of step 830 results in another truncation of the working id, which yields the string PCI\VEN_14E. Because this string is determined not to include the substring "_DEV" (step 836), method 800 proceeds to step 824. In sum, then, two partial ids are generated in the above example: 1) PCI\VEN_14E&DEV_4324&SUBSYS_00011028; and 2) PCI\VEN_14E&DEV_4324. After being generated, these two partial ids could subsequently be used to query a device driver database as described above in FIG. 7.

Various other embodiments of method 800 are possible. For example, step 820 might be omitted if all initial device type identifiers provided as input to method 800 included the substring "_DEV."

Method 800 may be implemented on any suitable computer system such as backup server 162A, and can be included within any type of software program or application. Method 800 may be implemented as a standalone method as well as part of a DSR application.

Figure 9:
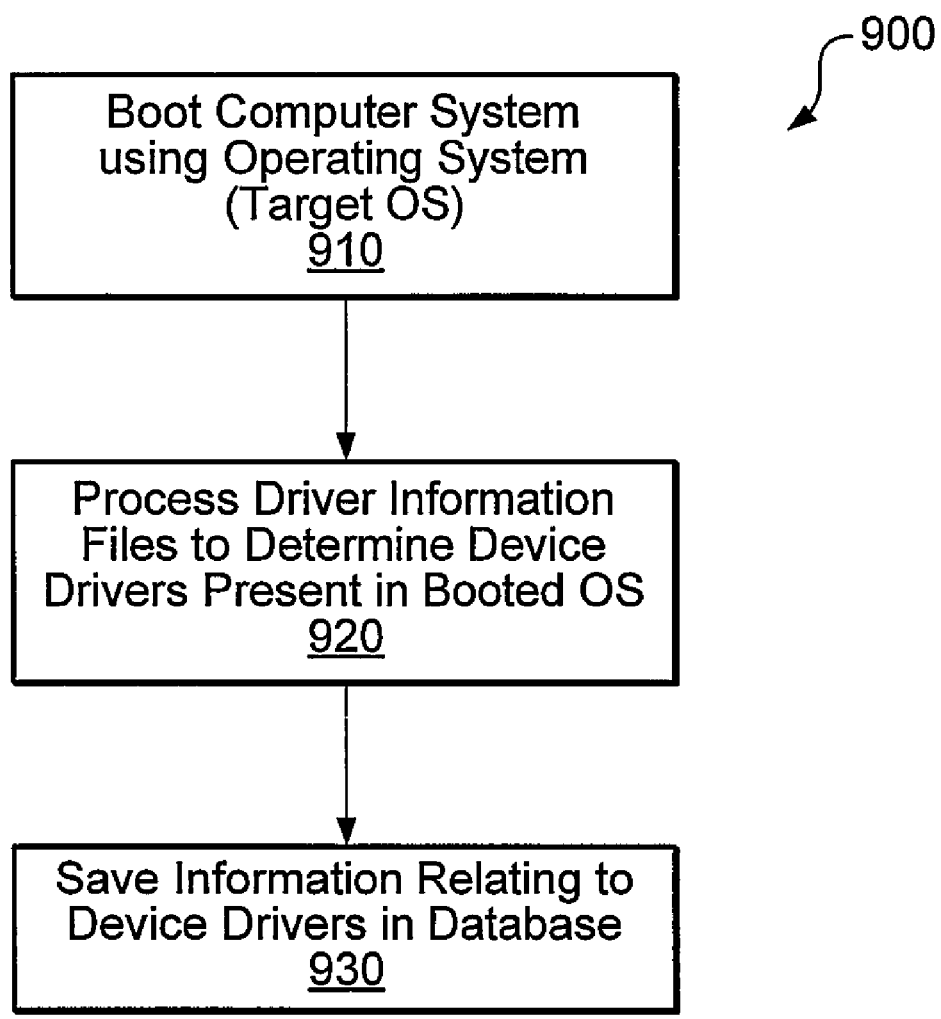
FIG. 9 is a flowchart of one embodiment of a method for creating a device driver database for a particular operating system that may subsequently be used as a target OS.

Turning now to FIG. 9, a flowchart of a method 900 is shown. Method 900 is one embodiment of a method for creating a device driver database for a particular operating system that may subsequently be a target OS. The device driver database described by method 900 is created sometime prior to the query of such a database (e.g., the query in step 610). In one embodiment, this database is created during the DSR process.

In step 910, a computer system is booted that has a particular operating system version. In step 920, so-called "driver information files" that come with the operating system (*.inf files in a WINDOWS™-based embodiment) are processed (e.g., parsed) to determine which device drivers are present in the booted OS. Information relating to these device drivers is then stored in a database that corresponds to the booted OS in step 930. In one embodiment, this information also includes date information for the stored device drivers (e.g., when the device driver was created.)

Subsequently, during a DSR a database corresponding to the OS that is the target OS for the DSR can be queried to determine the presence of specified device drivers, as in step 610 of method 600. (Method 900 can also be practiced outside the context of DSR as well.) As described above, the created database may then be stored on a server such as backup server 162A, where it is then accessible to restore/transfer processes such as the DSR processes described herein. Thus, in some embodiments, a database for a particular OS version need only be generated one time (or infrequently).

Method 900 may be performed multiple times for each target OS that is desired. The result of each iteration of method 900 may be stored in a different database, or in different portions of the same database. For example, method 900 might be performed for the following versions of the WINDOWS™ operating system: Windows 2000™ (without Service Pack); Windows 2000™ SP1; Windows 2000™ SP2; Windows 2000™ SP3; Windows 2000™ SP4; Windows XP™; Windows XP™ SP1; Windows XP™ SP2, Windows 2003™; and Windows 2003™ SP1.

A database similar to that created in method 900 may also be created for the device drivers stored on a storage medium such as that of backup server 162A. Such a database would be usable, for example, in steps 630-640 of method 600 to determine whether particular device drivers are present on backup server 162A. Such a database could then be updated each time new driver files are added to server 162A.

Turning now to FIG. 10, a sample of a driver information file 1000 is shown. As used herein, a "driver information file" is a configuration file used by an operating system that includes information usable to install device drivers for one or more types of devices. A driver information file may be limited to devices within a particular device class. File 1000 shown in FIG. 10 is an "*.inf" file from a WINDOWS™-based computer system. An "inf" file is a file that allows, for example, a manufacturer/vendor to group information relating to a number of device drivers that are within a particular device class (e.g., NET). Manufacturers often use a single inf file to store information relating to device drivers for different OS Versions (e.g., Windows 2000™, Windows XP™), as well as different hardware architectures (e.g., NTx86, NTAMD64, etc.).

Example inf file 1000 includes a manufacturer section 1004, driver sections 1010 and 1020, install section 1040, and localized string section 1060. In this particular embodiment, inf file 1000 includes information for devices within the NET device class. Manufacturer section 1004 denotes that inf file 1000 corresponds to BROADCOM™ devices. A "driver section" is a section within a driver information file that includes driver information corresponding to a target computer system having specified characteristics. For example, driver section 1010 (denoted by "[Broadcom]") includes information for BROADCOM™ NIC devices for different architectures and OS versions. Driver section 1020, on the other hand, corresponds to BROADCOM™ NIC device drivers for x86 architectures and MICROSOFT's™ Windows XP™ operating system. Other driver sections in inf file 1000 have been omitted from FIG. 10 for simplicity. Other inf files may include numerous other additional sections analogous to sections 1010 and 1020.

Driver sections 1010 and 1020 each include a number of lines of information, each corresponding to a particular device type identifier for a BROADCOM™ NIC device. Each line (or "option") includes three parts. Line 1012, for example, includes a variable name 1012A, an install section indicator 1012B, and device type identifier 1012C. Variable name 1012A is %OEM1_DEV5%, which, in the context of FIG. 10, is equal to "Broadcom 570x Gigabit Integrated Controller" (see line 1062 of localized strings section 1060). The device type identifier 1012C given for this device is PCI\VEN_14e4&DEV_165D&SUBSYS_865d1028. Install section indicator 1012B, which has the value OEM1_DEV5.Inst, refers to install section 1040 (see line 1042). Install section 1040 is usable for installing the device driver for device type identifier 1012C, and includes the name of the file for the device driver—in this case, b57w2k.sys (see line 1044).

Figure 11:
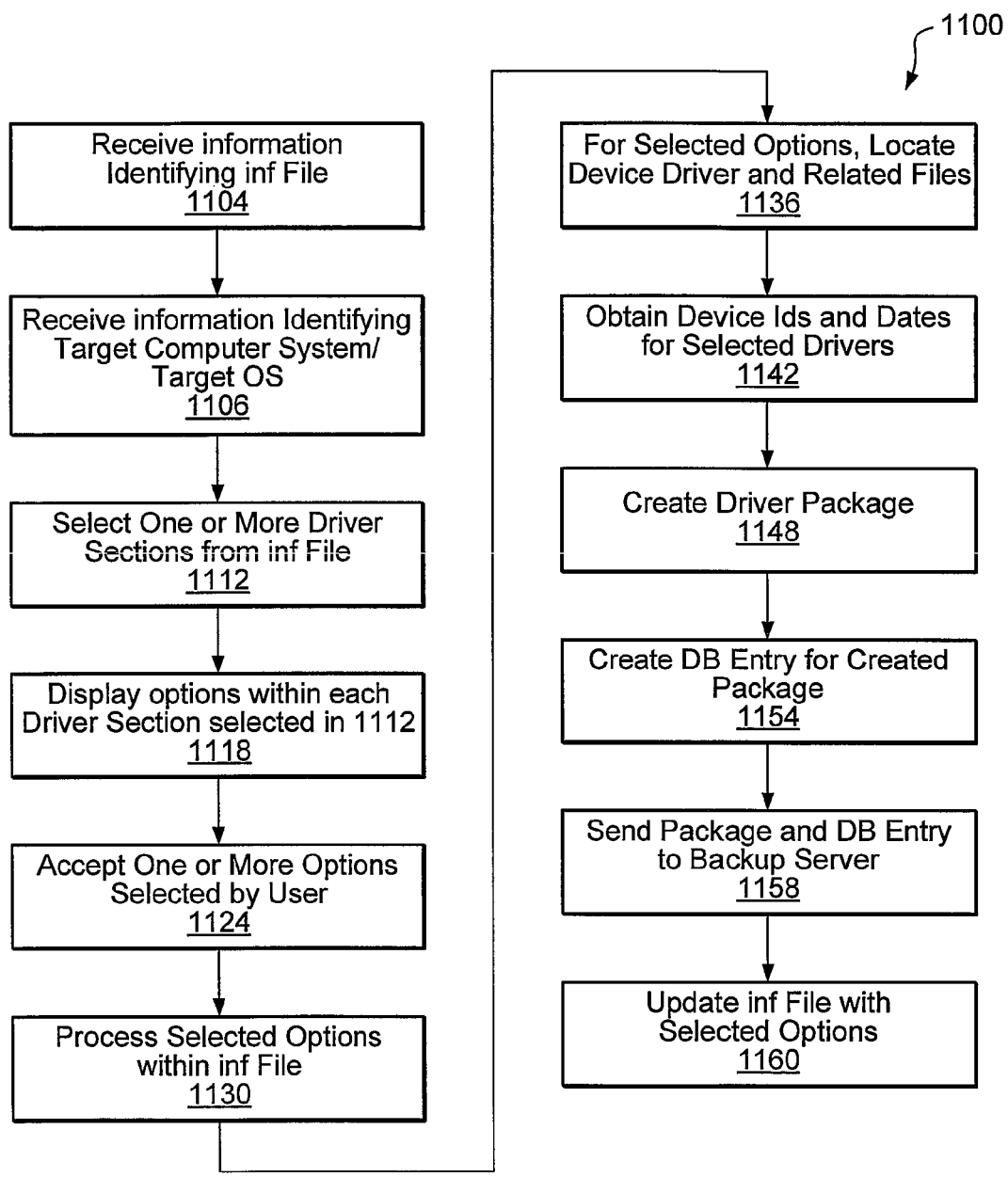
FIG. 11 is a flowchart of one embodiment of a method for creating a driver package.

Turning now to FIG. 11, a flowchart of a method 1100 is shown. Method 1100 is one embodiment of a method for creating a driver package from a driver information file. In the context of DSR, method 1100 may be used, for example, when one or more device drivers are not present in or available to the target OS or the UOS. Accordingly, the inf file processed in the embodiment of FIG. 11 is either received from a user or has its location specified by the user.

As discussed above with reference to FIG. 10, a driver information file such as an inf file may include information regarding a large number of device type identifiers within a given device class. The large amount of information in an inf file may thus make it difficult for a user to select or identify the relevant portions of the file, increasing the probability that an incorrect device driver may be selected for a particular device to be configured. Method 1100 may be used to increase the probability that the correct portion or portions of a driver information file are selected for a given device. Although FIG. 11 is described in reference to an inf file, embodiments of method 1100 can be applied to other types of driver information files. In step 1104, an inf file (e.g., inf file 1000) is identified by a user, along with additional files, such as device driver files. The user may supply physical media (e.g., optical media, flash drive, floppy disk, etc.) that includes these files. These inf file and associated device driver files may have been downloaded from a manufacturer's web site. Alternately, the user may supply information identifying the location of the inf file. For example, the inf file may be located on a network, and the user may supply a path name to the inf file in step 1104.

In step 1106, the user is prompted to supply information regarding the target computer system. This information is usable to select one or more driver sections within the inf file received in step 1104. In one embodiment, the supplied information relates to the OS version and architecture of target computer system 180. For example, the user may indicate that the OS version is Windows 2000™ and the architecture corresponds to an AMD™ 64-bit processor. The information supplied in step 1106 may be received via any suitable user interface, including a graphical user interface.

In step 1112, the information supplied in step 1106 is applied to the inf file received in step 1104 to select one or more driver sections of the inf file. For example, if the user supplies input in step 1106 indicating that the OS version of target computer system 180 is Windows 2000™, only driver sections that correspond to this OS version might be considered for further processing. One particular embodiment of an algorithm that is directed to choosing the most appropriate driver sections in an inf file is described in detail below with reference to FIG. 11A. Various algorithms may be used to eliminate driver sections of the inf file and/or choose the correct driver sections of the inf file.

In at least one embodiment, the utility OS under which the software implementing the method of FIG. 11 is running does not have an API to select the appropriate driver section of a given inf file for a particular device. In one embodiment, code implementing method 1100 may be running on target computer system 180 or backup server 162A, for example under UOS 190.

Figure 12:
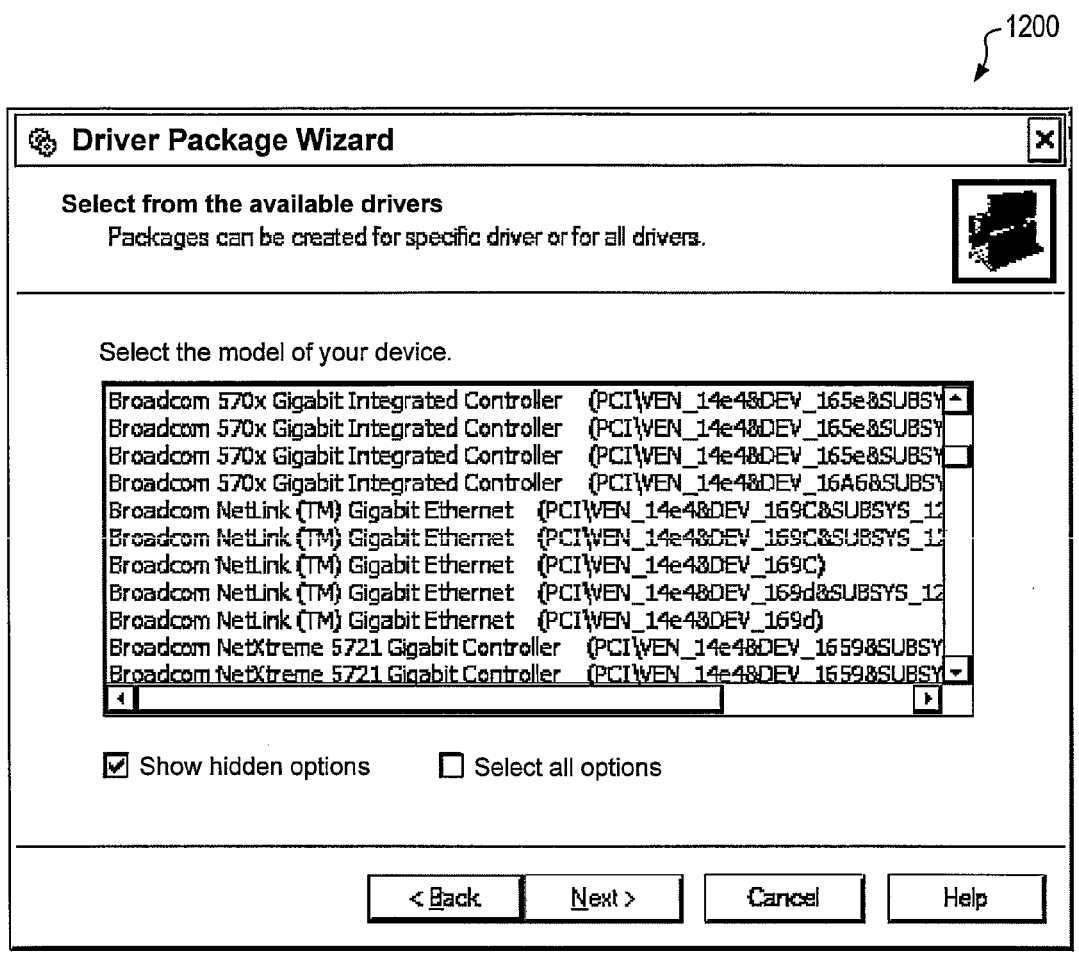
FIG. 12 is a screen shot of software displaying option groups within a selected driver section of an inf file.

After one or more driver sections of the received inf file have been selected for further processing, the user is presented with a display indicating "options" in the remaining driver sections in step 1118. FIG. 12 depicts a screen shot 1200 produced by one embodiment of software implementing step 1118. (This particular screen shot is taken from a computer running SYMANTEC's™ Bare Metal Restore™ product, and may be generated by issuing a BMR Create Package command.) As shown, screen shot 1200 includes a display listing a number of different BROADCOM™ NIC devices. This interface allows a user to select one or more of these devices in step 1124. Accordingly, the interface presented in step 1118 allows a user to create a driver package that supports one or more devices selected from within an inf file. Thus, a user (e.g., a system administrator) with 15 different NIC cards, all of which use the same inf file, can select all 15 NIC cards as options, leading to the creation of one driver package that supports all 15 devices. Step 1124 allows, for example, a user to select all of the devices listed in step 1118.

In step 1130, the selected options from inf file 1000 are processed. Thus, if device type identifier 1012C is selected in step 1124, the corresponding install section for that device is located. Install section indicator 1012B indicates that the proper install section is OEM1_DEV5.Inst, which corresponds to install section 1040, which is identified by the first line in this section (1042). Next, in step 1136, the device driver and related files are located using information specified in install section 1040. The device driver file referenced within install section 1040 is named "b57w2k.sys" (line 1044). Other install sections may reference more than one device driver file, as well as one or more other related files.

In step 1142, the device type identifier and driver dates corresponding to the device driver are determined. A driver "package" is then created for the device driver in step 1148. A package is a collection of the device driver file and any related files. These files may be "packaged" using functionality similar to the Unix™ "tar" command. The package may or may not be compressed. In step 1154, information about the driver package created in step 1148 is gathered. In one embodiment, this information includes the device type identifier and the date of the device driver (i.e., information obtained in step 1142). In step 1158, the driver package created in step 1148 and the information gathered in step 1154 are sent to backup server 162A. In one embodiment, the information gathered in step 1154 is used to update a driver database on backup server 162 that lists drivers stored on the server. The driver database that is updated may be the database accessed, for example, in steps 630-640 of method 600 described above with reference to FIG. 6.

Steps 1130 through 1158 may be repeated for any additional selected driver sections.

In an optional step 1160, inf file 1000 is updated to include information identifying the driver sections that have been selected. This step thus creates an easily accessible record of what option(s) have been selected by the user. In one embodiment, a new section may be added to inf file 1000, such as:

[BmrDriverInfo]

Section=OEM1_DEV5.XpInst

HardwareId=PCI\VEN_14e4&DEV_165D&SUBSYS_20031028

OSLevel=5.1

LoadOrder="NDIS"

Thus, the addition of the above section could be used to subsequently indicate that the install section "OEM1_DEV5.XpInst" had been used to create a driver package. In one embodiment, this install section is therefore considered an "actual" install section for that inf file within the context of a backup server (e.g., 162A) (as opposed to an install section for which the referenced files are not available). Additionally, this section indicates the device type identifier corresponding to this install section, as well as the corresponding OS type (here, 5.1 corresponds to Windows XP™).

Method 1100 may be implemented on any suitable computer system (e.g., backup server 162A), and can be a standalone application or included with a suite of programs/applications.

Figure 11A:
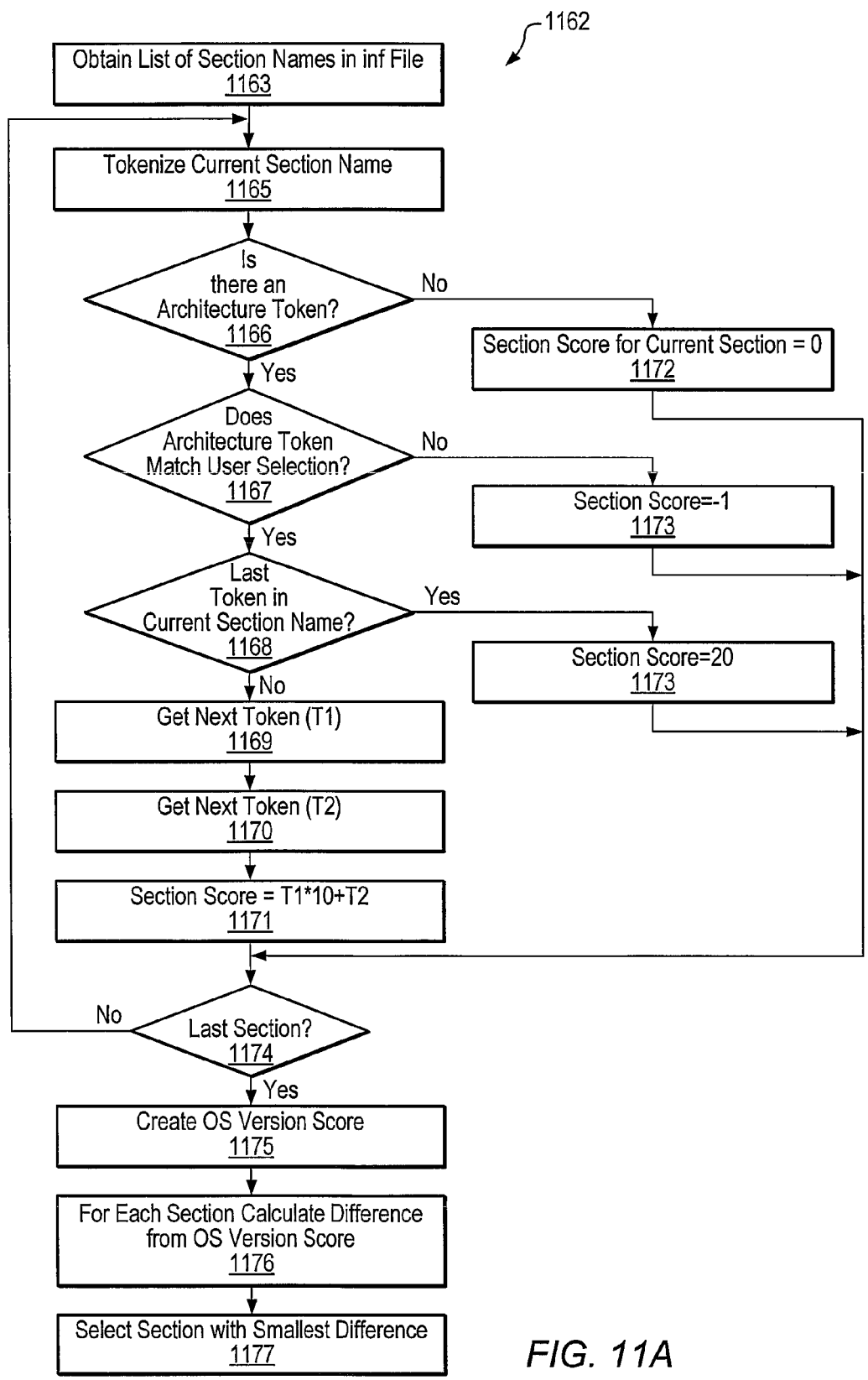
FIG. 11A is a flowchart of one embodiment of a method for selecting a driver section from an inf file.

Turning now to FIG. 11A, a flowchart of a method 1162 is shown. Method 1162 is one embodiment of a method for selecting a driver section from an inf file given user input specifying an operating system version of the target computer system (e.g., a version of the WINDOWS™ operating system) and a system architecture of the target computer system (e.g., AMD 64-bit architecture). In step 1163, a list of the section names in the inf file is obtained. In one embodiment, this step is performed by parsing the inf file to search for the [Manufacturer] section (e.g., section 1004 in inf file 1000). The values after the [Manufacturer] key in this section are usable to perform this task. Consider the following example [Manufacturer] section:

[Manufacturer]

%NVIDIA™%=NVIDIA™, NTx86, NTx86.5.1, NTIA64, NTAMD64

Given this list, the values after "NVIDIA™" may be successively appended to the string "NVIDIA™" to generate the possible section names. For the above example, the possible section names would be:

NVIDIA™ (for all WINDOWS™ systems/architectures, usually used for only Windows 2000)

NVIDIA™.NTx86 (for Windows systems, x86 architecture)

NVIDIA™.NTx86.5.1 (For Windows XP systems, x86 architecture)

NVIDIA™.NTIA64 (for all 64-bit Windows systems with Intel 64-bit architecture)

NVIDIA™.NTAMD64 (For all 64-bit Windows systems with AMD 64-bit architecture)

In step 1165, starting with the first section name, the section name is tokenized using the "dot" for reference. For reference, the WINDOWS™ "declaration" format is as follows:

BaseSectionName.NT [Architecture] [.[OSMajorVersion] [.[OSMinorVersion] [.[ProductType] [.SuiteMask]]]]

Thus, if the section name of a given section is AMD™.ndi.ntX86.5.1, the tokens produced in step 1165 are:

AMD™ ndi ntx86

[NOTE the ™ appended to NVIDIA and AMD in the above examples are not actually part of the example, but are included to indicate that these names are trademarks.]

In step 1166 it is determined whether there is an architecture token in the list obtained in step 1165. In one embodiment, the presence of an architecture token is determined by searching whether any of the tokens have the string "NT." If the result of steps 1166 is "no," a "section score" for the current section is set to 0 in step 1172. If, on the other hand, the result of step 1166 is "yes," the method proceeds to step 1167.

In step 1167, it is determined whether the architecture token matches the user selection for the architecture (e.g., the input previously received, for example, in step 1106). If the result of step 1167 is "no," the section score is set to –1 in step 1173. If, on the other hand, the result of step 1167 is "yes," the method proceeds to step 1168.

In step 1168, it is determined whether the current token is the last token in the list determined for the current section name. If the result of 1168 is "yes," the section score is set to 20 in step 1173. If on the other hand, the result of step 1168 is "no," the method proceeds to step 1169. The next two successive tokens in the current section name are then obtained in steps 1169 and 1170, respectively. Then, in step 1171, the section score is computed by the following formula: T1*10+ T2. (Thus, if the tokens determined in steps 1169 and 1170 are 5 and 1, respectively, the section score computed in step 1171 would be 51 in this embodiment.) In other embodiments, the section score formula of step 1171 may be different.

In step 1174 it is determined whether the current section name is the last section name in the inf file. If the result of step 1174 is "no," the method returns to step 1165 and repeats for the next section name. If, on the other hand, the result of step 1174 is "yes," the method proceeds to step 1175. In step 1175 the OS version score is created. In one embodiment, this value is created by multiplying the version major number by 10 and adding this result to the minor number. This calculation is shown for several versions of the WINDOWS™ operating system as follows:

| Selected version: | Version Number: | OS Version score: |
|---|---|---|
| Windows 2000 ™ | 5.0 | 50 |
| Windows XP ™ | 5.1 | 51 |
| Windows 2003 ™ | 5.2 | 52 |

In step 1176, a difference value is calculated for each section by subtracting the section score for that section from the OS version score. (Note that in this embodiment, only one OS version score is computed, and is used for computing the difference value for each section.) Finally, in step 1177, the section with the smallest difference value is selected as the appropriate section of the inf file.

Consider the following example in which the user chooses an NTx86 architecture and WINDOWS™ version 2003, for which the OS version score is 52 as indicted above:

| Section Name: | Section Score: | OS Version Score – Section Score |
|---|---|---|
| AMD ™.ndi | 0 | 52 |
| AMD ™.ndi.NT | 10 | 42 |
| AMD ™.ndi.NTx86 | 20 | 32 |
| AMD ™.ndi.NTx86.5 | 50 | 2 |
| AMD ™.ndi.NTx86.5.1.0x03.0x80 | 51 | 1 |
| AMD ™.ndi...0x80 | 0 | 52 |
| AMD ™.ndi...0x02 | 0 | 52 |
| AMD ™.NTI64.5.2 | –1 | 53 |

In this example, AMD™.nvi.NTx86.5.1.0x03.0x80 would be selected as the appropriate section because this section name has the smallest difference value, 1. Note that if there were a section named AMD™.ndi.NTx86.5.2, that section would be selected because the difference value in that case would be 0.

Many possible variations of a method for selecting one or more driver sections are possible. For example, generalizing method 1162, a numeric section score can be computed for each section in an inf file, and the driver section(s) that is(are) closest to the another numeric value (e.g., an OS version score) is selected.

Figure 13:
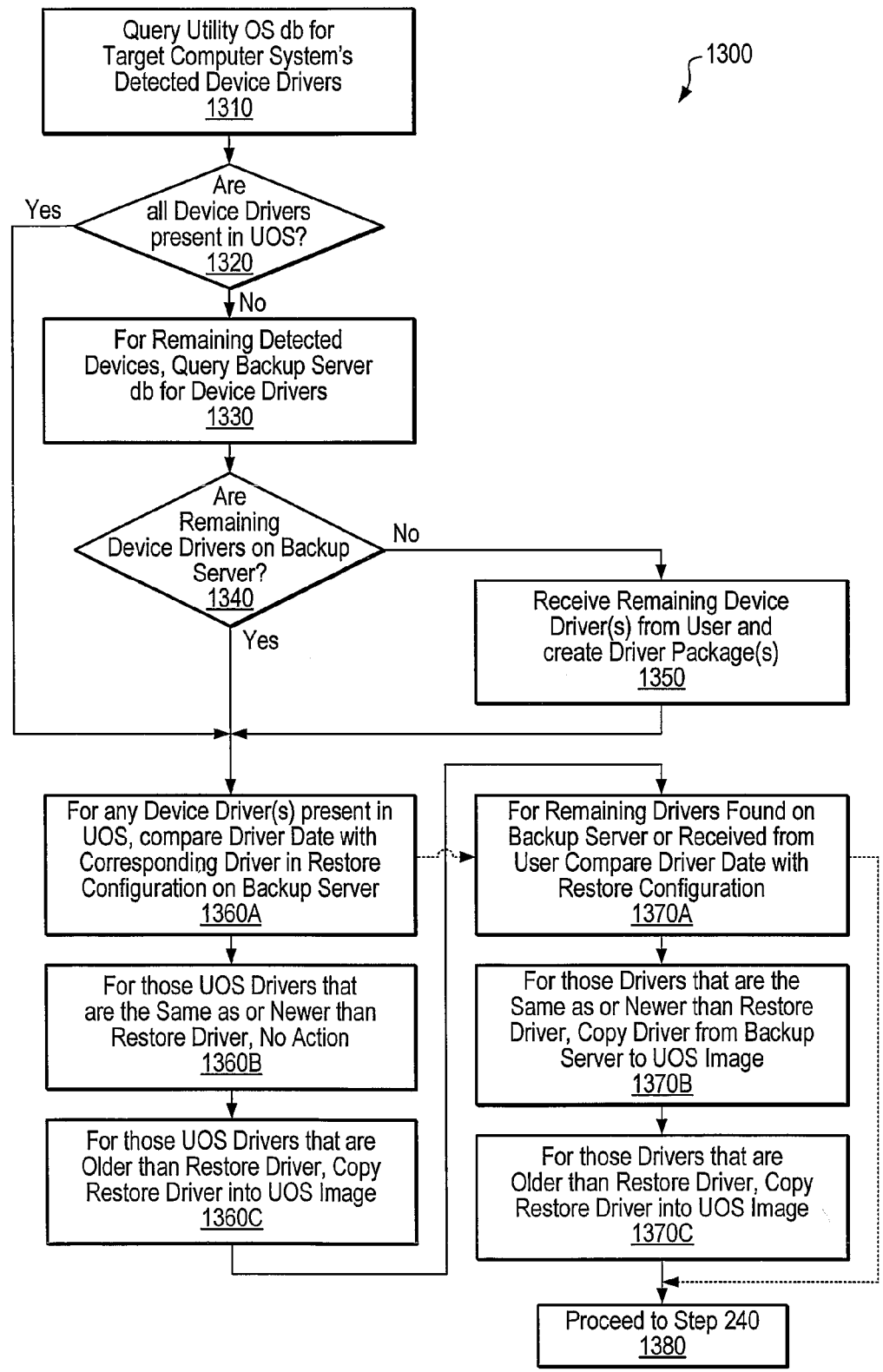
FIG. 13 is a flowchart of one embodiment of a method for locating utility OS device drivers for detected devices.

Turning now to FIG. 13, a flowchart of a method 1300 is shown. Method 1300 is one embodiment of a method for locating device drivers for utility OS 190. In one embodiment, method 1300 is performed within step 530 discussed above with reference to FIG. 5. As described above, step 520 of FIG. 5 locates device drivers for the target operating system. Details of various embodiments of step 520 were discussed above with reference to FIGS. 6-12. As described above, upon completion of step 520 in one embodiment, method 500 proceeds to step 530 in which it is determined whether device drivers for the detected devices are present in or available to the utility operating system 190. In the context of the following description of method 1300, it is assumed that step 520 has already been completed. In other embodiments, however, step 530 need not necessarily be performed after step 520, and at least certain portions of step 530 may be performed before certain portions of step 520.

In step 1310, a utility OS database is queried for the device drivers of the target computer system's devices that were detected in step 220 (i.e., those devices within the predetermined set of device classes). Thus, it is assumed in the context of the embodiment discussed in FIG. 13, that this utility OS database has already been created when step 1310 is performed. The creation of a utility OS database is discussed below in reference to FIG. 14. In one embodiment, the utility OS database is located on backup server 162A. In other embodiments, step 1310 could be done on the fly without actually creating a database.

Next, in step 1320, it is determined whether the device drivers for target computer system 180's detected devices are present in utility OS 190. If the result of step 1320 is "yes," method 1300 proceeds to step 1360A. If, on the other hand, the result of step 1320 is "no," method 1300 proceeds to step 1330. Thus, at the completion of steps 1310 and 1320, it is known whether there is at least one device driver for target computer system 180's detected devices that is not present in utility OS 190.

In step 1330, a backup server database is queried for the device drivers for those detected devices for which device drivers were determined not to be present in utility OS 190. In at least one embodiment, the backup server database of step 1330 is identical to the backup server database described above with reference to FIG. 6. As described in the context of FIG. 6, backup server 162A may include device drivers for a large number of devices, including device drivers copied from any number of network client machines coupled to backup server 162A.

The results of the query of step 1330 can be shown with reference to step 1340. If the result of step 1340 is "no," method 1300 proceeds to step 1350. In step 1350, a driver package is created from files supplied by a user, as described above with reference to FIG. 11. From step 1350, method 1300 then proceeds to step 1360A. Method 1300 also proceeds to step 1360A if the result of step 1340 is "yes." Thus, in the context of method 1300, step 1360A represents a point at which the UOS device drivers for the detected devices have been located.

Although steps 1360A-C are shown as three separate blocks in FIG. 13, these steps can be considered together. In step 1360A, for the driver(s) found to be present in UOS 190, a date comparison is made between the driver present in UOS 190 and the corresponding driver in the target computer system, as denoted in the restore configuration of target computer system 180 previously saved on backup server 162. In other words, the date for a UOS device driver for a first device type identifier is compared to the date for the target OS device driver ("the restore driver") for the same device type identifier. As previously discussed in step 650 of method 600, a restore configuration may have been previously, which corresponds to system settings (e.g., registry values) that are destined for target computer system 180. For example, the restore configuration may include pointers to device drivers to be loaded to target computer system 180. Step 1360B indicates that no action is performed when the UOS driver has the same date or a newer date than the corresponding restore driver denoted in the restore configuration. On the other hand, step 1360C indicates that if a UOS driver is older than the corresponding restore driver denoted in the restore configuration, the restore driver is copied from backup server 162 to the image UOS 190 (also residing on backup server 162A in one embodiment).

From step 1360, method 1300 proceeds to step 1370A. (If not device drivers are present in UOS 190, method 1300 also proceeds from step 1360A to 1370A.) In step 1370A, for any remaining device drivers that were not found to be present in UOS 190, a date comparison is performed between the device driver on 162A and the corresponding restore driver denoted in the restore configuration. For those drivers that have the same date or a newer date than the restore driver, the driver is copied from the backup server to the image of UOS 190 in step 1370B (again, UOS image 190 may be located on the backup server in one embodiment). For those drivers that are older than the restore driver, the restore driver is copied from the backup server to the image of UOS 190 in step 1370C.

Note that steps 1360 and 1370 could be performed differently in other embodiments. For example, in another embodiment, steps 1360 and 1370 might simply compile a list of drivers to be copied to UOS 190, and after completion of these steps, the drivers in the list could be copied. Accordingly, the scope of steps 1360 and 1370 are not meant to be limited to the particular order of steps described in FIG. 13.

Finally, in step 1380, method 1300 concludes, proceeding to step 240 of method 200. Thus, at step 1380 the device drivers for the predetermined set of device classes (e.g., those device deemed necessary to restore target computer system 180) have been located both for the target OS and utility OS 190. Accordingly, in step 240, details of which are described below with reference to FIGS. 18-23, these device drivers are used to continue the DSR process.

Method 1300 may be implemented on any suitable computer system, including backup server 162A, either as a standalone application or part of another program or application.

Figure 14:
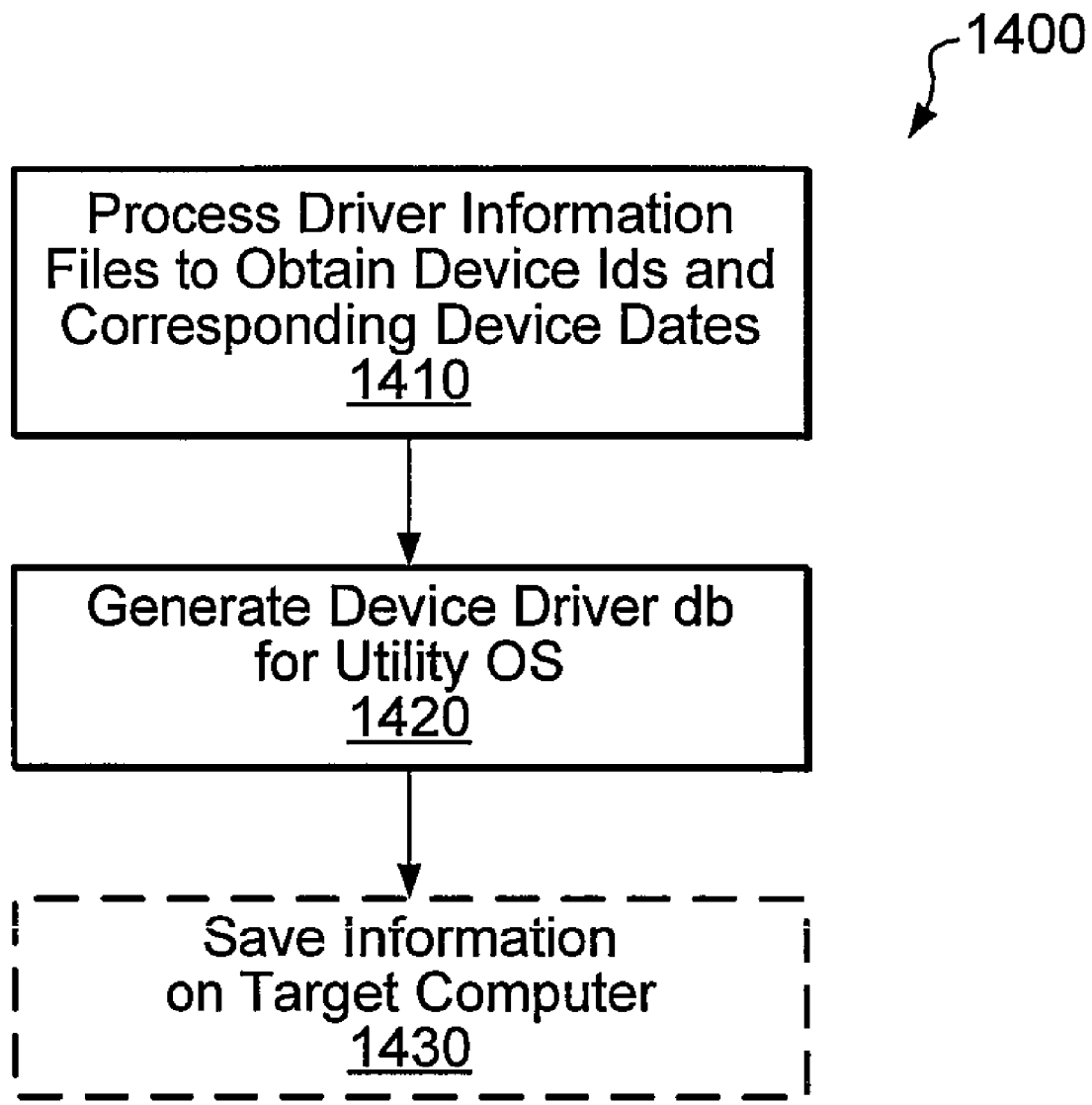
FIG. 14 is a flowchart of one embodiment of a method for creating a database of device drivers present in utility OS 190.

Turning now to FIG. 14, a flowchart of a method 1400 is shown. Method 1400 is one embodiment of a method for creating a database of device drivers present in utility OS 190. This database was previously referenced in steps 1310 and 1320 of FIG. 13, but can also be created and used outside the context of FIG. 13.

In step 1410, driver information files associated with utility OS 190 are processed to obtain all device type identifiers (and corresponding driver dates) referenced within the driver information files. In one embodiment, step 1410 is performed on backup server 162A, with the image of utility OS 190 available to be processed. Next, in step 1420, the device type identifiers and driver dates obtained in 1410 are used to generate a database listing device drivers present in utility OS 190. In one embodiment, this database is searchable by device type identifier. This database can be stored, for example, on backup server 162A.

Finally, in optional step 1430, information in the database created in 1420 can be saved to target computer system 180. In this manner, the utility OS driver database may be accessible locally to target computer system 180 at the time DSR device detection is performed (e.g., step 220 in FIGS. 2-3). Thus, comparison of the detected devices within the predetermined device classes of FIG. 3 to the device drivers available in utility OS 190 may proceed even if target computer system 180 does not have network connectivity (e.g., to backup server 162A).

Figure 15:
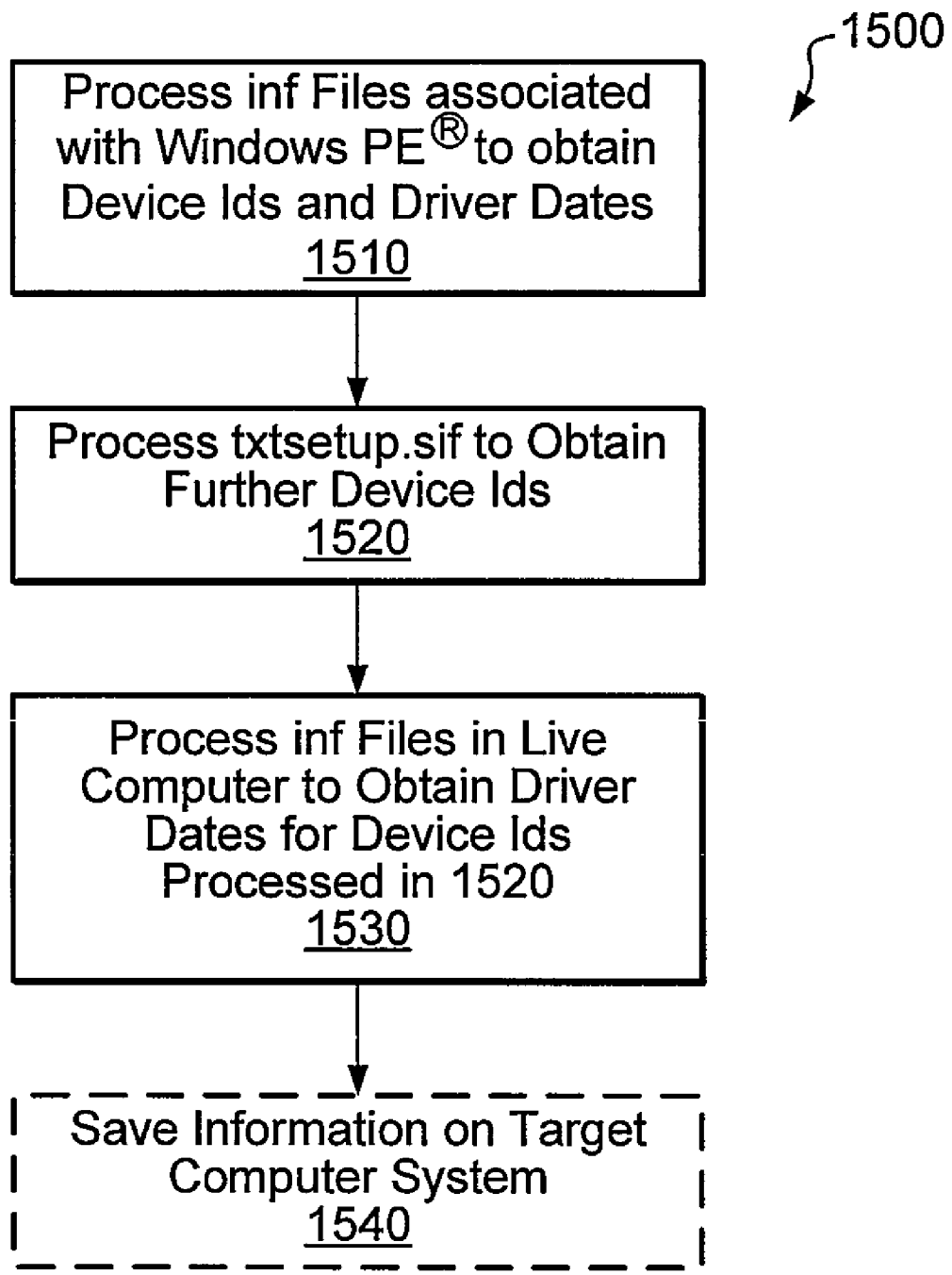
FIG. 15 is a flowchart of one embodiment of a method for creating a database of device drivers present in the Windows PE™ operating system.

Turning now to FIG. 15, a flowchart of a method 1500 is shown. Method 1500 is one embodiment of a method for creating a database of device drivers present in the Windows PE™ operating system. In step 1510, the inf files associated with Windows PE™ are processed to obtain a list of referenced device type identifiers and corresponding driver dates.

Then, in step 1520, a file called txtsetup.sif is processed to obtain further device type identifiers (in Windows PE™, not all devices have device-related information stored in inf files). In Windows PE™ however, txtsetup.sif does not include driver dates; it only includes device type identifiers. Accordingly, in step 1530, the inf files on a live Windows system (in one embodiment, Windows 2003™ Service Pack 1) are processed in order to obtain the driver dates for the additional device type identifiers obtained in step 1520. The information obtained in steps 1510-1530 can thus be used to generate a utility OS database as in step 1420. Finally, in step 1540, the information obtained in steps 1510-1530 can be stored (e.g., in xml format) on target computer system 180.

Before describing how the missing device drivers detected in method 1300 may be added to utility OS 190, it is instructive to again consider a sample inf file, such as the portion of inf file 1600 depicted in FIG. 16. As shown, inf file 1600 includes driver section 1610, which includes lines 1612, 1614, and 1616, each corresponding to a different device type identifier and referencing an install section, as explained above in reference to FIG. 10. Thus, install section 1620 corresponds to the device type identifier specified in line 1612, install section 1630 corresponds to line 1614, and install section 1640 corresponds to line 1616.

Install sections 1620, 1630 and 1640 each reference one or more device driver files. Install section 1620 references three such files: a57w2k.sys, b57w2k.sys, and c57w2k.sys, while install sections 1630 and 1640 each reference two files. The files referenced by install section 1630 (a57w2k.sys and b57w2k.sys) are a subset of the files referenced in install section 1620. In contrast, the files referenced in install section 1640 (a57w2k.sys and d57w2k.sys) are not a subset of the files referenced in section 1620. The comparison of whether files in an install section are a subset of a specified install section is discussed below with reference to FIG. 17.

Inf file 1600 finally includes a package creation section 1650, which may be written to the inf file, for example, upon creation of a driver package using method 1100. Section 1650 is used to indicate what install section was used to create a driver package using this inf file, as well as the corresponding device type identifier. As will be described below, section 1650 may be subsequently used to identify the "actual" install section of inf file 1600.

Figure 17:
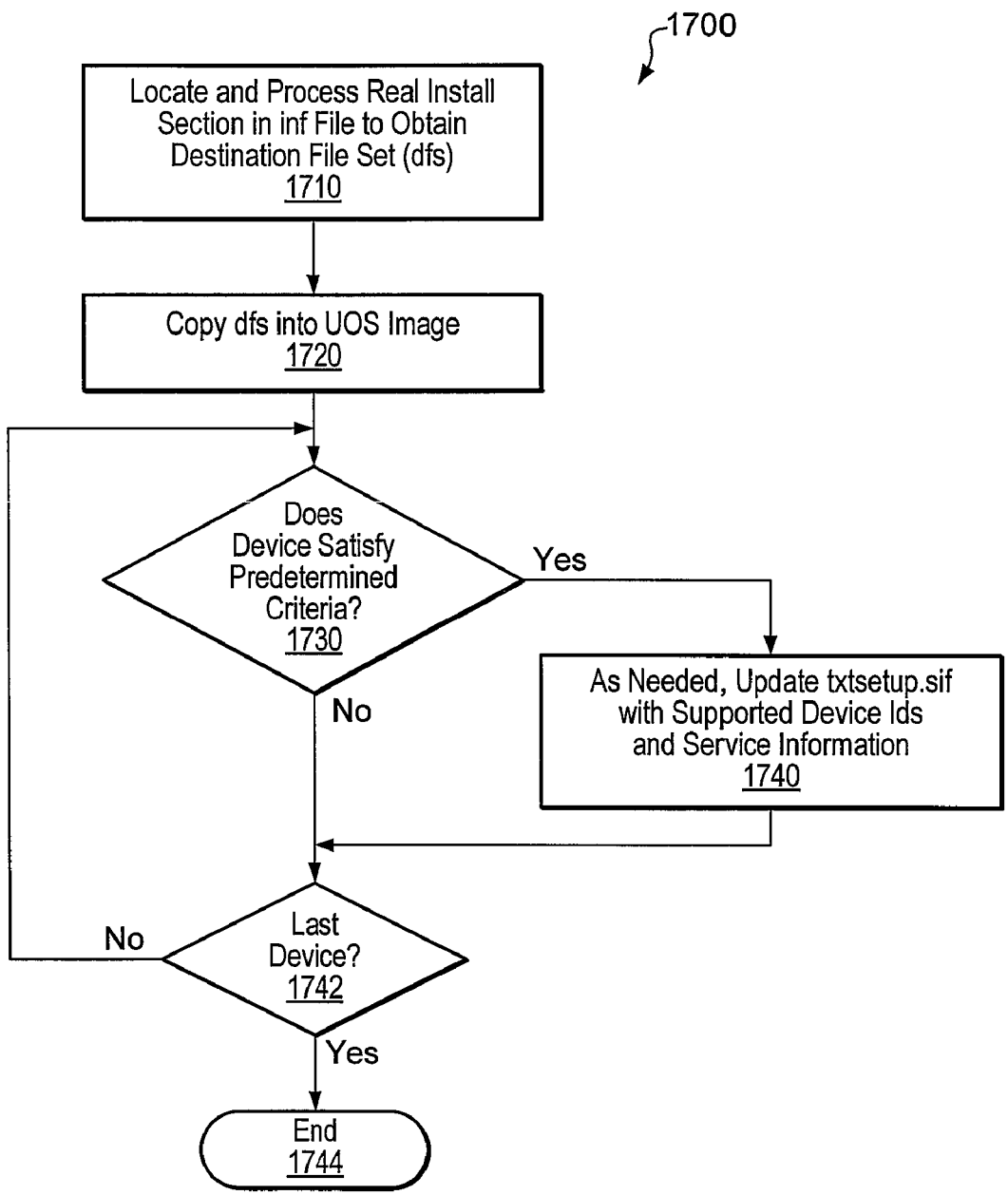
FIG. 17 is a flowchart of one embodiment of a method for copying files into utility operating system 190 in a WINDOWS™-based computer system.

Turning now to FIG. 17, a flowchart of a method 1700 is shown. Method 1700 is one embodiment of a method for copying files into utility operating system 190 in a WINDOWS™-based computer system (e.g., UOS 190 is Windows PE™). As described below, method 1700 copies selected files (e.g., device drivers and related files) into the UOS image, and updates the UOS accordingly. Available at the start of method 1700 are one or more inf files, and device type identifiers corresponding to desired device drivers to be installed. Method 1700 is shown as operating on one inf file at a time, and can thus be repeated as needed for additional inf files. In other embodiments, method 1700 could be modified so as to process more than one inf file in a single pass.

In one embodiment, method 1700 is performed on a server such as backup server 162A. The inf files input to method 1700 thus may reside on server 162A, along with the image of UOS 190 that is to be updated with one or more device drivers. As described above in FIG. 10, a device type identifier provided as input to method 1700 corresponds to a particular line or option of an inf file, and that particular line is associated with a corresponding install section (e.g., install section 1040). The install section purportedly identifies information usable to install the device driver in question. In some instances, however, a given install section may not provide the correct location of the device driver files. (Commonly, only one (or a few) install sections in a given inf file are usable to actually install a given device driver.) In such situations, the install section alone is insufficient to install the needed device driver.

Accordingly, in step 1710, the "actual" install section of a given inf file is located. An actual install section is a section that has a device type identifier that matches or partially matches at least one of the hardware ids or compatible ids of a device on the system. The actual install section can be located in a variety of ways. For drivers copied (ripped) from live machines (e.g., client machines coupled to backup server 162A), the actual install section is that section of an inf file used by the live machine's OS to install the driver. For device driver packages created as specified in FIG. 11, the actual install section may be determined by using the section selected by the user, which may be indicated by reading information appended to the inf file (e.g., the [BmrDriverinfo] section written to the inf file in step 1160 described above). After the actual install section is located, it is processed to obtain the location of a "destination file set," or dfs. The dfs is a set of files, such as a *.sys (driver) files, other *.inf files, and other related files, referenced by an install section of a driver information file. The dfs is a complete set of files needed to be able to complete device driver installation for a given device.

In step 1720, the dfs is copied to the image of UOS 190. In one embodiment, step 1720 simply involves copying files to a particular directory on backup server 162A that corresponds to a designated portion of the image of UOS 190.

Next, in step 1730, a determination is made whether, for each device type identifier ("device id"), that device satisfies predetermined criteria (e.g., belongs to a predetermined set of device classes, etc.). Note that the predetermined criteria of step 1730 need not correspond to the predetermined criteria discussed above with reference to FIGS. 2-3. In one embodiment, the predetermined criteria in step 1730 correspond to those devices that do not have a corresponding inf file in UOS 190. Thus, for example, when UOS 190 is Windows PE™, the predetermined criteria correspond to whether the device is an MSD, because, in Windows PE™, that device class does not use an inf file. Instead, information regarding MSDs in Windows PE™ is stored in a file named txtsetup.sif. For a particular device type identifier, if the device satisfies predetermined criteria in step 1730, method 1700 proceeds to steps 1740. If, on the other hand, the device does not belong to the predetermined set of device classes, method 1700 proceeds to step 1742. In step 1742, a determination is made whether the current device type identifier is the last device type identifier to be processed. If not, method 1700 returns to step 1730, and steps 1730, 1740, and 1742 repeat until the last device type identifier is reached, at which point method 1700 ends at step 1744.

For each device type identifier that does satisfy the predetermined criteria specified in step 1730, step 1740 determines whether to update txtsetup.sif with the device id and associated service information in step 1740. One particular embodiment of step 1740 is described next with reference to FIG. 17A.

Note that steps 1730, 1740 and 1742 could be performed differently in other embodiments. For example, in step 1730, a list could be generated of all devices satisfying the predetermined criteria. Then, in step 1740, txtsetup.sif could be updated once with the supported device type identifiers and service information. In such an embodiment, step 1742 would be unnecessary.

Figure 17A:
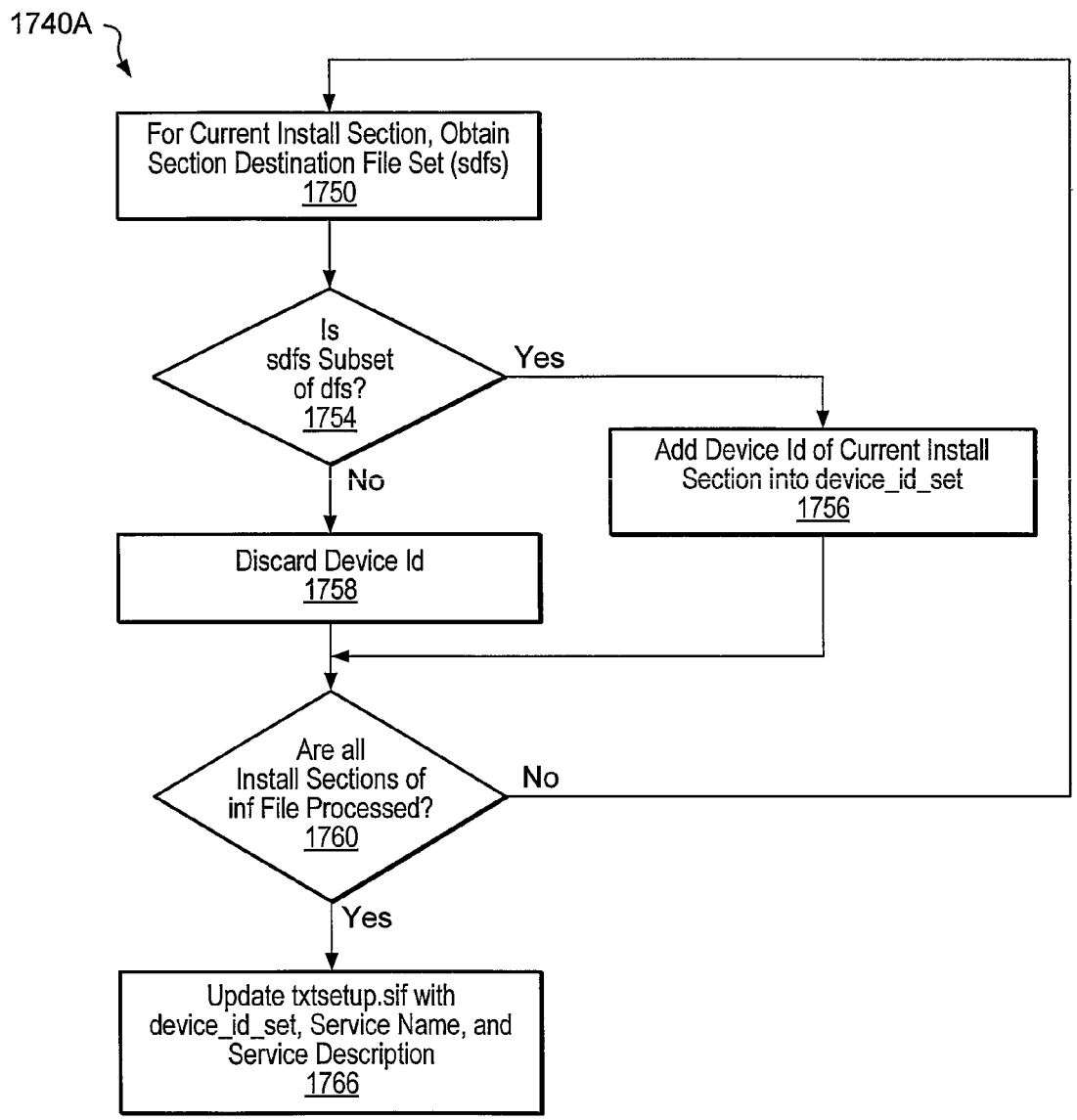
FIG. 17A is a flowchart of one embodiment of a method for updating the txtsetup.sif in a WINDOWS™-based computer system.

Turning now to FIG. 17A, a flowchart of a method 1740A is shown. Method 1740A is one embodiment of a method for implementing step 1740 described above with reference to FIG. 17. Method 1740A processes each install section in a given inf file—the install section currently being processed is referred to as the current install section. In step 1750, the section destination file set (sdfs) is obtained for the current install section. The sdfs for a given install section is the set of files referenced in the current install section. The referenced files may include device driver and related files. In inf file 1600 shown in FIG. 16, the referenced files are indicated by the line that begins "ServiceBinary." Thus, in install section 1620 in FIG. 16, the section destination file set is as follows: a57w2k.sys, b57w2k.sys, and c57w2k.sys.

In step 1754, a determination is made whether the section destination file set for the current install section is a subset of the destination file set obtained in step 1710. Thus, step 1754 determines whether there are any referenced files in the current install section that were not copied to the UOS image in step 1720. In inf file 1600 shown in FIG. 16, the sdfs for install section 1630 is an example of an sdfs that is a subset of dfs. On the other hand, install section 1640 is an example of a section whose sdfs is not a subset of dfs. If the result of step 1754 is "no," method 1740A proceeds to step 1758, in which the device type identifier corresponding to the current install section is discarded. In this scenario, the device type identifier is discarded because the files referenced for that device id have not been copied to and are not available to UOS 190. In other embodiments, the device type identifier may not be discarded if the missing files can be supplied by the user. If, on the other hand, the result of step 1754 is "yes," method 1740A proceeds to step 1756.

In step 1756, the device type identifier corresponding to the current install section is added to a list. This list is referred to in FIG. 17A as "device_id_set." This list (which may be stored in any suitable data structure or database) indicates the device type identifiers to be updated in step 1766 described below. From step 1756, method 1740A proceeds to step 1760, in which its determined whether the current install section is the last install section in the inf file. If the result of step 1760 is "no," method 1740A returns to step 1750, and the method proceeds until all install sections in the inf file are processed. At this point, method 1740A proceeds from step 1760 to 1766.

In step 1766, the file txtsetup.sif is updated to include the contents of the variable device_id_set. In this manner, the next time UOS 190 is booted, the UOS has a record of the updated device drivers that do not have an inf file. Additionally, step 1766 updates the service name and service description. A "service" is an application type that runs in the background and is similar to a Unix™ daemon application. Service applications typically provide features such as client/server applications, Web servers, database servers and device drivers. A "service name" is the name of the entry in the configuration settings (e.g., registry) where all the service information is stored, such as the path of the driver file, when to start, what to do in case of a service error etc. A "service description" is simply a "user-friendly" description of a service. For example, the service "atapi," which is a device driver for IDE hard disk controllers, may have the following service description in one embodiment: "Standard IDE/ESDI Hard Disk Controller."

Figure 18:
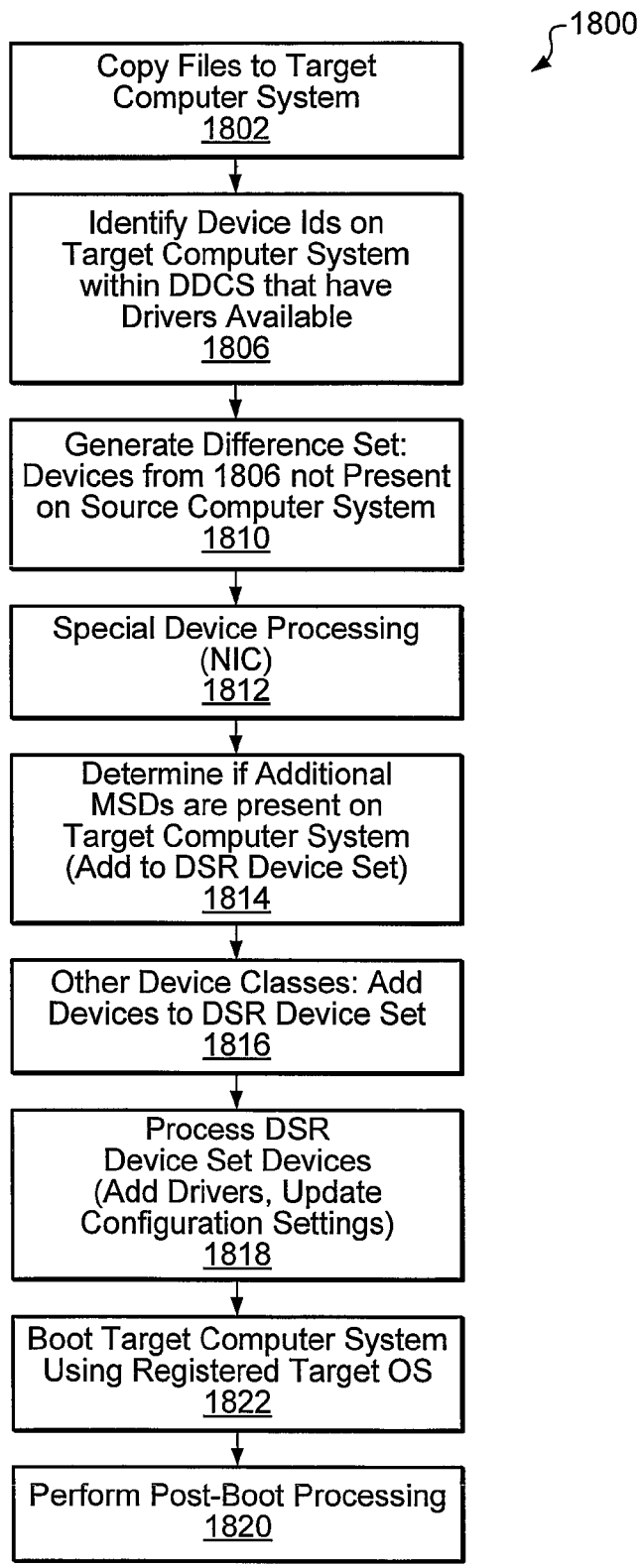
FIG. 18 is a flowchart of one embodiment of a method for a portion of a DSR process.

Turning now to FIG. 18, a flowchart of a method 1800 is shown. Method 1800 is one embodiment of a method for a portion of a DSR process. In one embodiment, method 1800 is performed within step 240 of method 200, in which an embodiment of a DSR process is performed using device drivers located in step 230. Thus, at the commencement of this embodiment of method 1800, an attempt has been made to detect devices that satisfy a predetermined set of criteria on the target computer system, and to locate the device drivers for those devices (both for the target OS and for the utility OS).

In another embodiment, target computer system 180 may already have target OS image 164 installed. In such an embodiment, DSR might commence with method 1800. Thus, previous steps described above may not be needed in all DSR processes.

In step 1802, restore files are copied to target computer system 180. The restore files may include, in one embodiment, the target OS image, the restored configuration settings, the device drivers for target computer system 180. These files may, in one embodiment, be stored on backup server 162A. The restore files may also include any files used previously during the DSR process, or any of the other data described above with reference to FIG. 1C (e.g., source data 165). Thus, at the completion of step 1802 in one embodiment, the files needed to restore target computer system 180 are present on the computer system itself. These files may be copied either via a network or other connection to computer system 180, or manually (e.g., via an optical disk or other removable media).

In one embodiment, step 1802 may include the installation of a program on target computer system 180 for communicating with backup server 162A. One example of a program that might include such functionality is SYMANTEC's™ NetBackup™ program. Installation of such a program could be used in facilitating the copying of files to target computer system 180 in step 1802.

In step 1806, method 1800 identifies device type identifiers on target computer system 180 that are within a predetermined set of device classes and for which device drivers are available (this set of device classes is referred to in step 1806 as the DSR Device Class Set, or DDCS). This predetermined set of device classes does not necessarily correspond to other predetermined sets of criteria discussed previously herein. (The device classes are "predetermined" by being fixed for a particular iteration of method 1800 some time prior to the performance of step 1806. In different iterations of method 1800, the predetermined set may be varied.) As will be described below, this predetermined set of device classes may correspond, in one embodiment, to those devices that are deemed necessary to boot target computer system 180 (either by the operating system being restored or by the user). One embodiment of step 1806, along with an example of device classes that may be in the DDCS, is described below with reference to FIGS. 18A and 19.

In step 1810, the target device type identifiers identified in step 1806 as being within the DDCS are compared to the device type identifiers indicated in the restored configuration (e.g., that configuration copied to target computer system 180 from backup server 162A in step 1802) as also being within the DDCS. Step 1810 generates a "difference set," which includes those device type identifiers present on target computer system 180 that were not present on the source computer system. In method 1800, the difference set does not include those device type identifiers present on the source computer system but not present on target computer system 180 (although in other embodiments, these source devices may be processed in some fashion). One embodiment of step 1810 is described below with reference to FIG. 20.

Next, in step 1812, processing for certain devices may be performed. In one embodiment, NICs are processed in step 1812. For example, in some embodiments, NICs are not deemed to be necessary to bring up target computer system 180. In such embodiments, NICs may be installed later (e.g., in step 1826).

One example of NIC processing on a WINDOWS™-based computer system in step 1812 is as follows: The inf files for the NICs are located and indication of these files is stored in target computer system's configuration settings (that is, the settings being restored, not the settings of UOS 190) for use later (e.g., after target computer system 180 can boot using the restored, target OS). Next, all NICs referenced in the restored registry that are not present on target computer system 180 may be deleted (e.g., from the restored configuration settings). Also, in one embodiment, any NICs present in the difference set generated in step 1810 may be removed from this set. Finally, a script may be created to subsequently set certain NIC parameters (e.g., TCP/IP parameters). Other types of processing for NICs is possible, and processing of other devices within step 1812 is possible in other embodiments.

In step 1814, target computer system 180 is processed to determine if any MSDs are present for which a driver is not currently available. In one embodiment, step 1814 includes comparing all MSDs as determined by target computer system 180's registry to the MSDs for which a driver is available (e.g., MSDs identified by the output of step 1870). The MSDs identified by step 1870 plus any additional MSDs for which drivers are available are then added to a list referred to as "DSR Device Set." In one embodiment, this set is the list of device drivers to be added to the image of the operating system being restored on target computer system 180. One embodiment of step 1814 is described further below with reference to FIG. 21.

In step 1816, devices in the difference set that are not NICs or MSDs are added to DSR Device Set. Each of the devices in DSR Device Set may then be processed in turn in step 1818. This processing includes, in one embodiment, adding device drivers to the appropriate location in restored OS on target computer system 180, along with making the appropriate changes to the restored configuration settings. One embodiment of step 1818 is described further below with reference to FIG. 22.

In step 1822, target computer system 180 is booted using the newly configured target OS image 164 that has been updated as described above, including by step 1818. Next, in step 1826, post-boot processing is performed on target computer system 180. Examples of such processing may include, in one embodiment, installing NICs processed in step 1812. Method 1800 then concludes with this embodiment of DSR now complete.

Figure 18A:
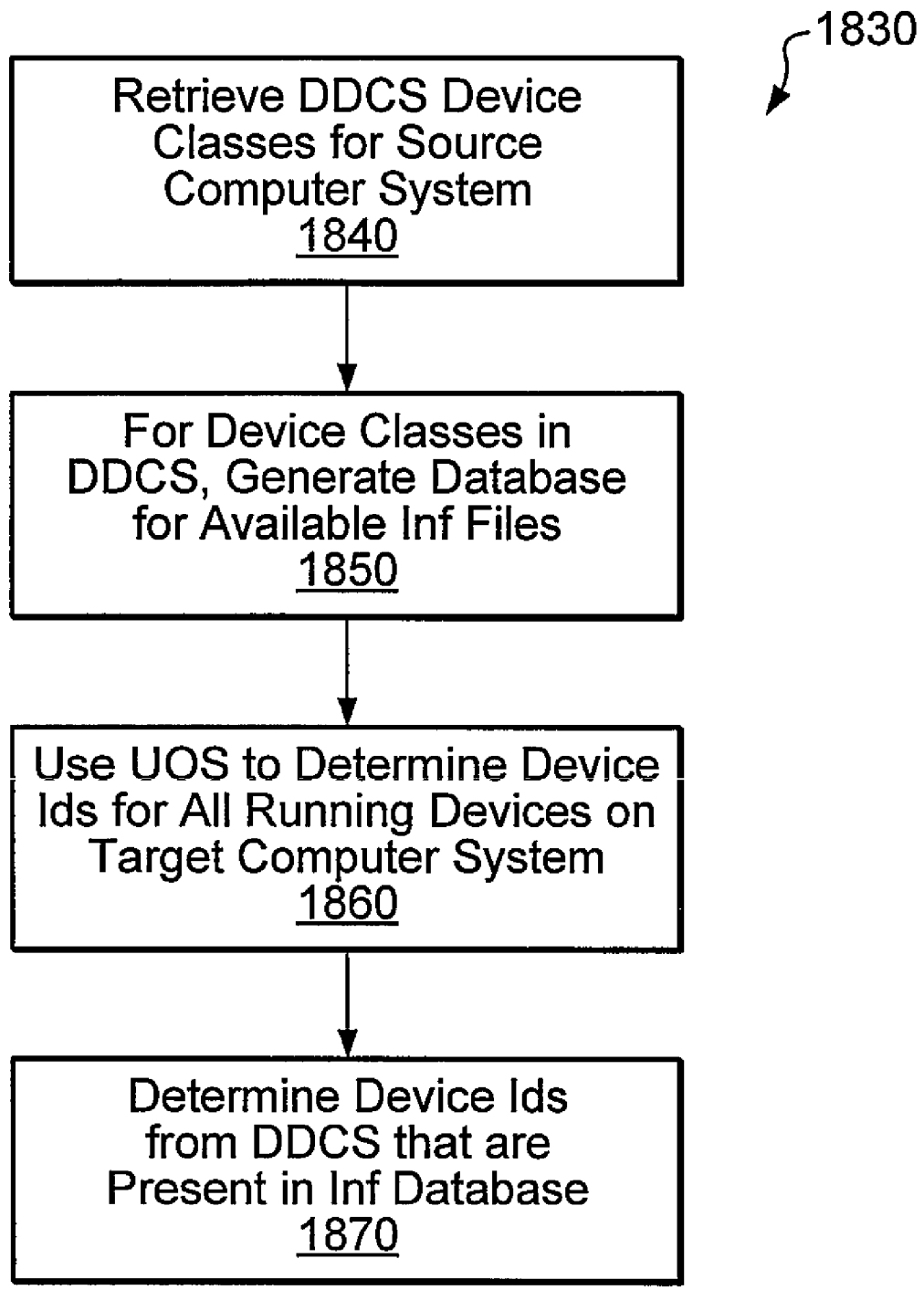
FIG. 18A is a flowchart of one embodiment of a method for determining target devices within the DDCS device classes for which a device driver is available.

Turning now to FIG. 18A, a flowchart of a method 1830 is shown. Method 1830 is one embodiment of a method for determining devices on target computer system 180 that have certain predetermined characteristics (e.g., has a device class within the DDCS) and for which a device driver is available. Method 1830 may be performed as part of step 1806 described above, in one embodiment. In one embodiment of method 1830, the configuration settings of UOS 190 do not include an indication of the device classes of running devices. For example, the configuration settings of Windows PE® do not indicate the device class of a running device. Furthermore, UOS 190 (such as Windows PE™) may not have an API for determining a device class for some or all running devices on target computer system 180.

The "predetermined characteristics" of method 1830 may include whether a device belongs to one or more of a set of predetermined device classes. Additionally, the predetermined characteristics could include a device being a certain kind of device within a device class (e.g., a NIC within the NET device class). The use of the term "predetermined" in the context of method 1830 simply means that the set of predetermined characteristics is fixed for a particular iteration of method 1830 (but may be varied if needed on successive iterations of this method).

In one embodiment, method 1830 is used to determine devices present on target computer system 180 and having any of the following characteristics: 1) a device in a device class that is designated as "critical" in the registry of the (WINDOWS™-based) source computer system, 2) a device in the "computer," "ScsiAdapter," "net," "hdc," "cdrom," "floppydisk," and "fdc" device classes. The remainder of method 1830 and FIGS. 19-22 are described using this example of a DDCS (many other embodiments are possible).

In one embodiment of method 1830, files have been copied from backup server 162A to target computer system 180. UOS 190 is running on target system 180. In such an embodiment, code implementing method 1830 is therefore running on top (or as part of) UOS 190 on system 180.

In step 1840, the DDCS is generated for the source computer system (e.g., system 170). Using the example DDCS given above, step 1840 obtains a list of device classes deemed to be necessary for the restore process. In one embodiment, this list is obtained from the restored configuration settings (i.e., those settings previously saved on a server such as backup server 162A and now residing on target computer system 180). For example, this information may have been saved in the restored configuration settings by a previously executed backup application (e.g., a program that saved data such as the target OS image and source data to backup server from source computer system 170). For example, such information could be saved to a pre-designated key in a registry in a WINDOWS™ based computer system. This key could then be accessed in step 1840. For example, SYMANTEC's™ Bare Metal Restore™ product might save a configuration that includes information relating to devices on the source computer system that are within certain device classes or have certain other characteristics. In other embodiments, other values in the registry of a WINDOWS™-based computer system may be checked to obtain such information (e.g., the restored registry key HKLM\SYSTEM\CurrentControlSet\Control\CoDeviceInstallers may provide a list of "critical" device classes).

In step 1850, inf files on target computer system 180 (e.g., those copied from backup server 162 in step 1802) are used to generate a database (an "inf database" in one embodiment, although method 1850 is not limited to "inf" driver information files) that includes information relating to devices that are within the DDCS device classes and for which device drivers are available. In one embodiment, step 1850 includes processing of inf files that were part of the target OS image, user-supplied inf files for which driver packages were created (e.g., in method 1100), and Original Equipment Manufacturer (OEM) inf files. In one embodiment the inf database may include a plurality of entries, each including a device type identifier for a device, a device class for that device, the corresponding inf file for that device, and the corresponding install section for that device. One particular embodiment of step 1850 is described further below with reference to FIG. 19.

Next, in step 1860, UOS 190 is used to determine one or more device type identifiers for each device running on target computer system 180. In one embodiment, a process akin to method 300 or 400 may be performed, except that device type identifiers for all running devices are obtained in one embodiment (as opposed to simply determining those device type identifiers having certain characteristics, e.g., NIC or MSD, as in method 400). As previously described, with reference to methods 300 and 400, step 1860 may retrieve more than one device type identifier for a given device instance. Furthermore, in one embodiment, a retrieved device type identifier may be one of a number of different types of identifiers (e.g., hardware id or a compatible id).

Finally, in step 1870, it is determined which device type identifiers running on target computer system 180 (e.g., the output of 1860) are present in the inf database generated in step 1850. In one embodiment, the output of 1870 may be deemed to be those devices on target computer system 180 that are in device classes deemed to be necessary to restore the system. Suppose 150 devices are determined to be running on target computer system 180 in step 1860. It might be the case in this hypothetical that only 30 of these 150 devices have device ids located in the inf db (i.e., as the output of step 1870). These 30 devices are, in one embodiment, those devices for which the DSR process needs to add the corresponding drivers to the restored OS image and update the restored registry on target computer system 180.

In one embodiment of step 1870, the inf database is searched for all device type identifiers for a given device, either until a match is found in the inf database or all device type identifiers are exhausted. In one embodiment, the inf database is also searched using any valid partial ids. Thus, the search of step 1870 may use techniques such as methods 700 and 800 described above.

Consider the following example of method 1830, in which step 1840 determines that the DDCS for the source computer system (as determined by processing the restored configuration settings) as the set {A, B}, where A and B are each device classes. Next, suppose that in performing step 1850, the following inf database is created for the inf files available on target computer system 180:

| Device Id | Device Class | Inf File | Install Section |
|---|---|---|---|
| 1 | A | 1.inf | Inst1 |
| 2 | B | 2.inf | Inst2 |
| 6 | A | 3.inf | Inst3 |
| 7 | B | 2.inf | Inst2 |

The table above those shows, for a given device id, the device class, the inf file, and the install section. (The actual format of the device ids in the table above is simplified for convenience.) Suppose further that result of step 1860 is the following set of device ids: {1, 2, 3, 4, 7}, meaning that device ids 1, 2, 3, 4, and 7 are determined to be running on target computer system 180. In this case, the output of step 1870 would be the following device ids: {1, 2, 7}. Accordingly, device ids 1, 2, and 7 in this example correspond to devices that are present on the target computer system 180 and are referenced in the inf database.

Figure 19:
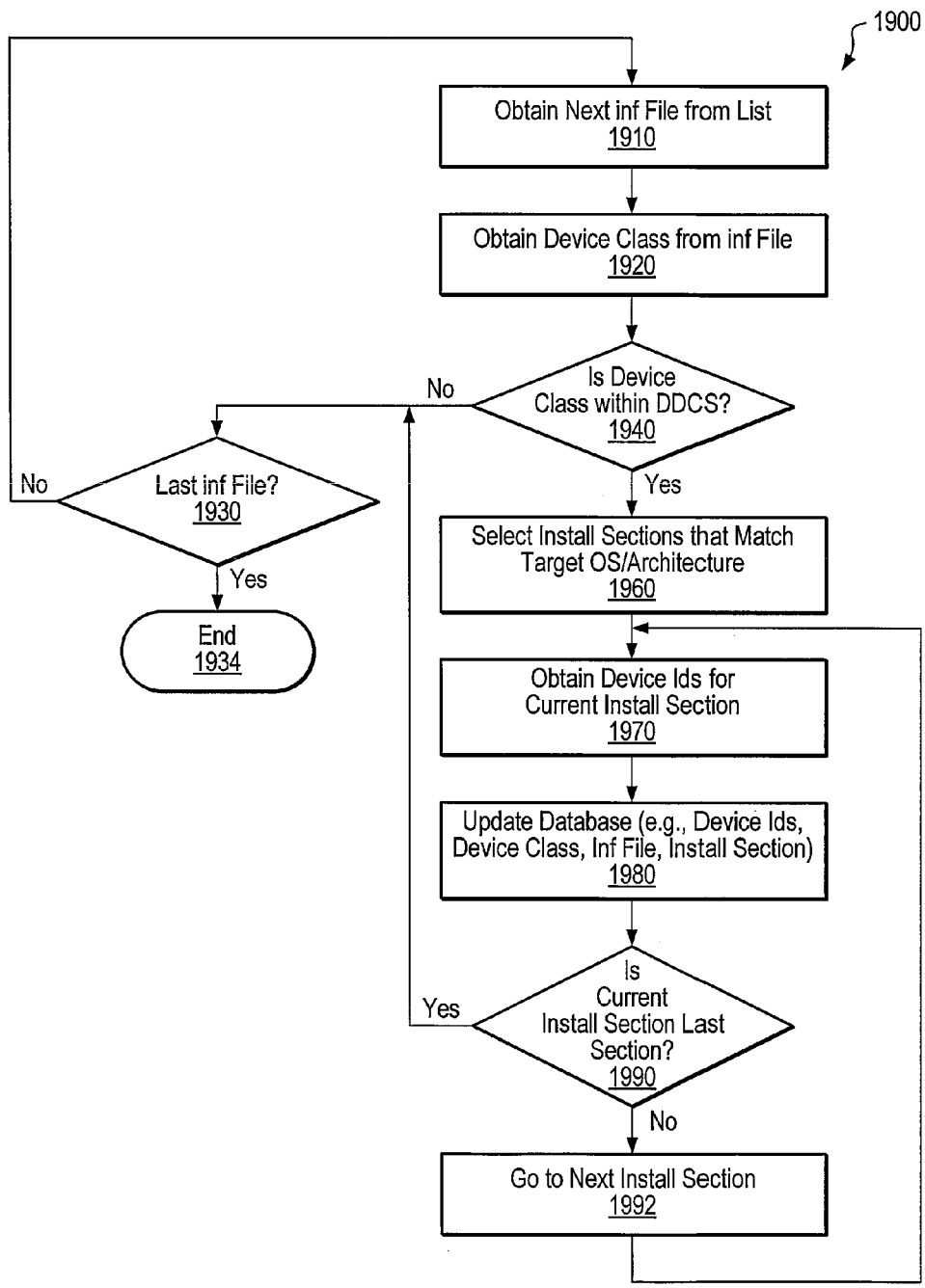
FIG. 19 is a flowchart of one embodiment of a method for generating a database of device type identifiers within the DDCS device classes for which device drivers are available.

Turning now to FIG. 19, a flowchart of a method 1900 is shown. Method 1900 is one embodiment of a method for generating a database of device type identifiers within the DDCS device classes for which device drivers are available. Method 1900 is one embodiment for performing step 1850 within method 1830.

In one embodiment, method 1900 processes each of the inf files present on target computer system 180. Method 1900 thus commences with step 1910 in which the next (or first) inf file is obtained from the list of inf files to be processed. These inf files, in one embodiment, may have been copied from backup server 162A (e.g., in step 1802 of method 1800), and can include inf files present in the restored OS image, as well as inf files supplied by a user (e.g., inf files supplied in the context of FIG. 11). As described below, method 1900 may be repeated for each inf file in target computer system 180. (In an alternate embodiment, method 1900 may process each inf file in each step; in such an embodiment, step 1930 would be unnecessary.)

Next, in step 1920, the device class for the current inf file is determined. In one embodiment this step is performed by parsing the inf file. For example, the following [Version] section of an inf file includes information that the file corresponds to the "Net" device class:

[Version]

Signature="$Windows NT$"

Class=Net

ClassGUID={4d36e972-e325-11ce-bfc1-08002be10318}

CatalogFile=b57win32.cat

Compatible=1

Provider=%BRCM%

DriverVer=06/19/2004,7.80.0.0

From step 1920, method 1900 proceeds to step 1940, in which it is determined whether the device class for the current inf file is within the DDCS device classes. Thus, if the device class for the current inf file matches one of the device classes in the DDCS, method 1900 proceeds to step 1960. Otherwise, method 1900 proceeds to step 1930. Step 1940 thus avoids unnecessarily processing inf files (of which there may be over 1000 on a given target computer system in one application of method 1900) unless it is determined that the inf file includes information relating to devices within the DDCS device classes. Accordingly, if step 1940 determines that the current inf file corresponds to a device class not within the DDCS device classes, method 1900 proceeds, via step 1930, to step 1910 (if the current inf file is not the last inf file) or ends with step 1934 (if the current inf file is the last inf file).

If the current inf file does correspond to a DDCS device class, the install sections of the inf file that match the target OS and hardware architecture are selected from among all of the install sections in the inf file. The target OS version may be obtained, for example, from a value in the restored configuration settings. The target hardware architecture, on the other hand, may be obtained, for example, from a value in the restoring configuration settings (i.e., an entry in the configuration settings of UOS 190 running on target computer system 180). Alternately, code implementing method 1900 might support only a single hardware architecture (e.g., x86). In another embodiment, such information may be supplied by a user.

Once information indicative of the target OS and hardware architecture are supplied, this information is used to select corresponding install sections within the current inf file. In one embodiment, this selection may be performed using method 1162 described in FIG. 11A above. A large number of embodiments for selecting the install sections from the current inf file are possible, however.

In step 1970, the device type identifiers for the current install section are obtained by parsing the install section. Next, in step 1980, any device type identifiers found are used to update the inf database. In one embodiment, an entry in the inf database includes a device type identifier for the device, the corresponding device class of the device, and the name of the inf file and install section being processed. Method 1900 then proceeds to step 1990.

When method 1900 enters step 1990, the current install section has either been processed or skipped (because the current install section does not match the version of the target OS). In step 1990, it is determined whether the current install section is the last install section in the current inf file. If not, method 1900 proceeds to the next install section in step 1992, and then returns to step 1970. Method 1900 then repeats through steps 1970, 1980, and 1990 until the result of step 1990 is "yes."

When the result of step 1990 is "yes," method 1900 proceeds to step 1930. As described above, at step 1930, method 1900 either begins processing of the next inf file in the list (step 1910) or ends (step 1934).

Figure 20:
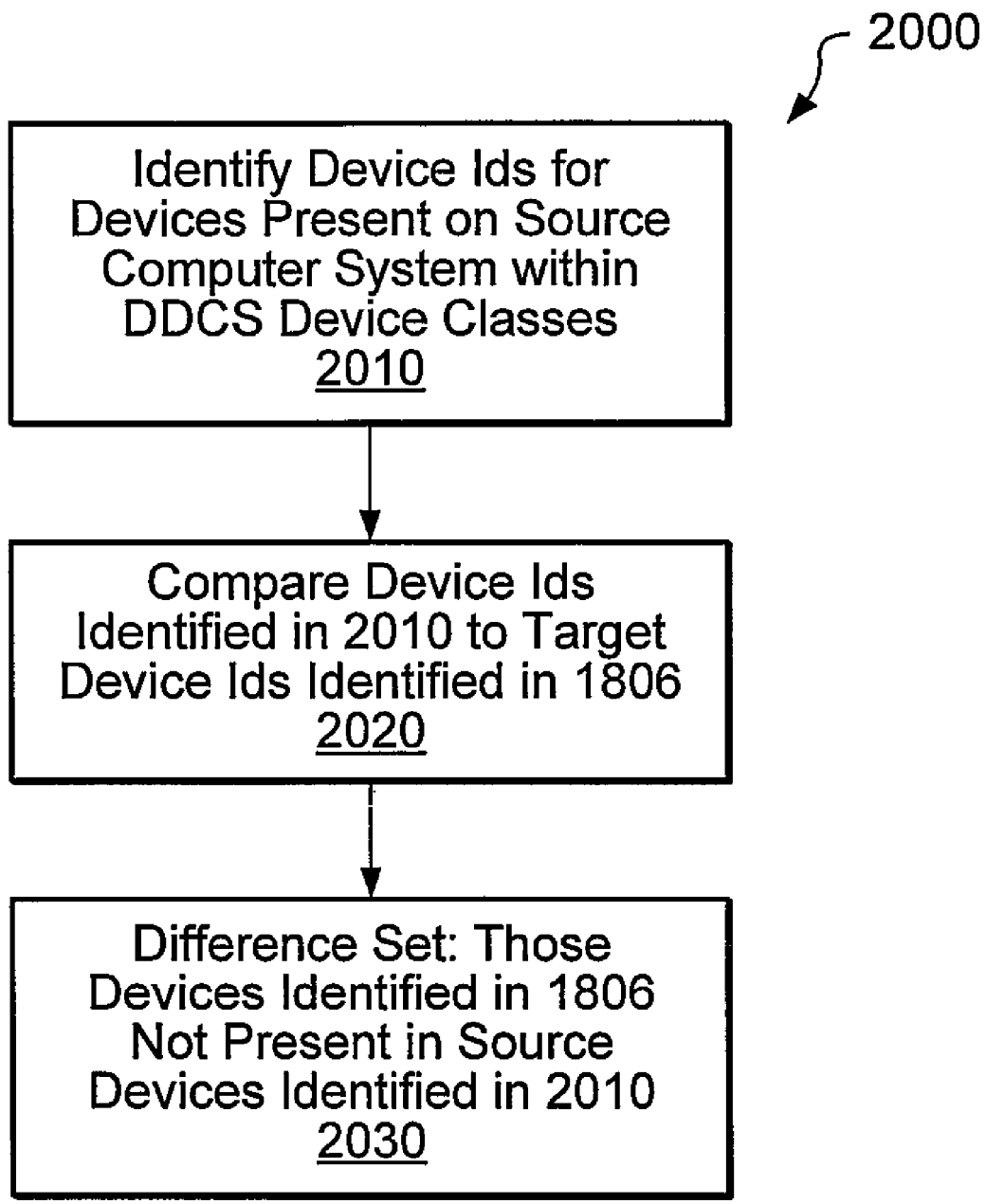
FIG. 20 is a flowchart of one embodiment of a method for generating a difference set between source and target devices in the DDCS device classes.

Turning now to FIG. 20, a flowchart of a method 2000 is shown. Method 2000 is one embodiment of a method for generating a difference set between source and target devices in the DDCS device classes. In one embodiment, method 2000 is performed within step 1810 of method 1800 described above with reference to FIG. 18.

First, in step 2010, device type identifiers are determined for devices present within the restored configuration settings (i.e., the settings being restored from the source computer system) and which are within the DDCS device classes. In one embodiment, this information is present within the restored configuration settings copied to target computer system 180 in step 1802. For example, a backup application such as SYMANTEC'S™ Bare Metal Restore™ might include such functionality during a backup process. Thus, a backup application may create an entry within the configuration settings of the source computer system that indicates devices present on the source computer system that are within a predetermined set of device classes (e.g., the DDCS device classes). Subsequently, this information can be backed up to backup server 162A, and eventually copied to target computer system 180 to perform DSR. The information in step 2010 may be determined differently in other embodiments.

Next, in step 2020, a comparison is performed between the device type identifiers determined in step 2010 and the device type identifiers for target computer system 180 devices that were determined in step 1806. In one embodiment, the comparison in step 2020 is between the DDCS devices present on the source computer and the DDCS devices present on target computer system 180. The result of the comparison in step 2020 is a "difference set," which is generated in step 2030. The difference set includes those devices on target computer system 180 within the DDCS device classes that were not present on the source computer system. Because the devices identified in step 2030 are deemed to be within device classes needed to bring up target computer system 180, these devices are the subject of processing throughout the remainder of method 1800. Note that the difference set does not include, in this embodiment, those devices present on the source computer system that are not present on target computer system 180.

Figure 21:
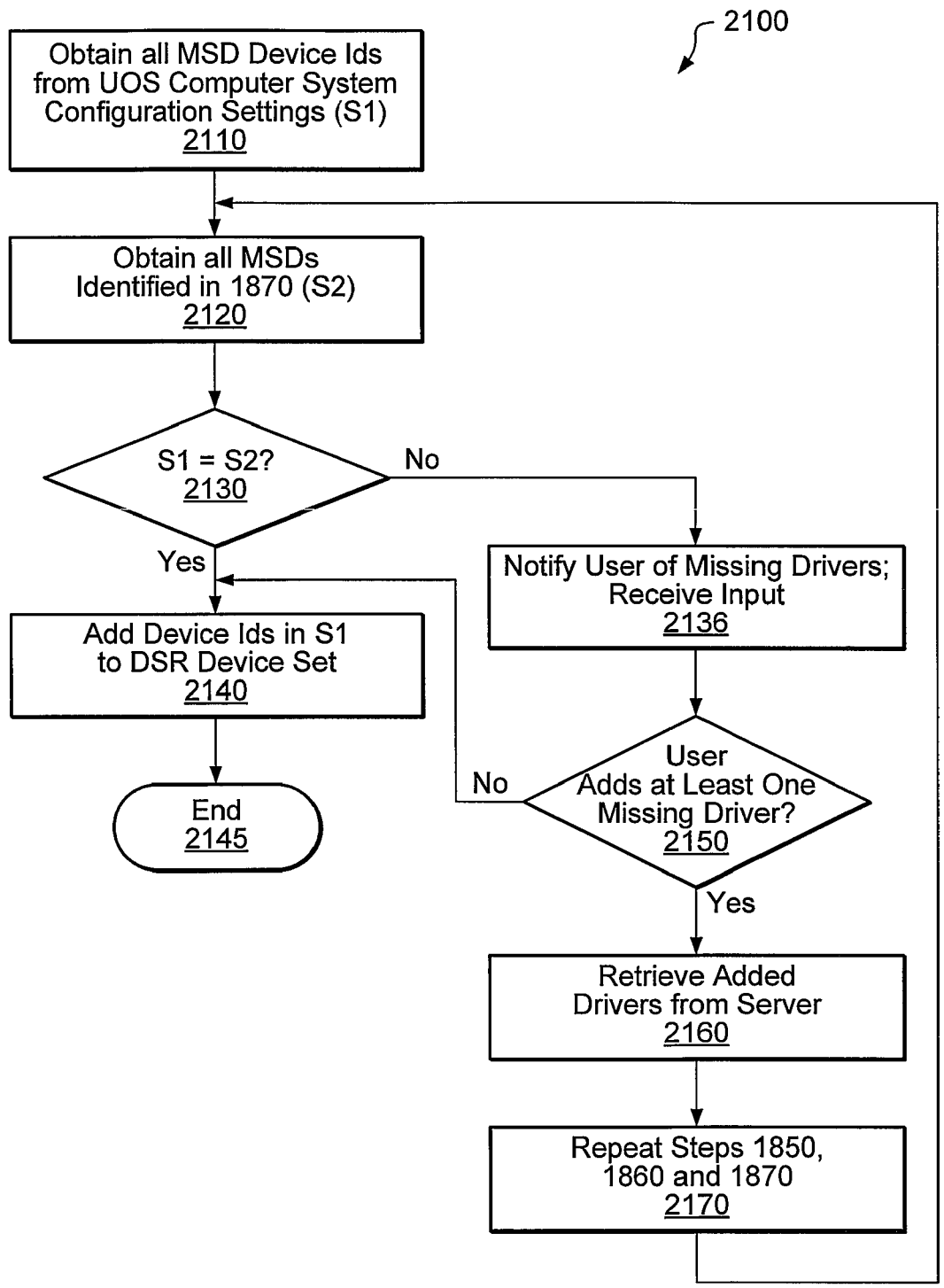
FIG. 21 is a flowchart of one embodiment of a method for processing MSDs present on the target computer system.

Turning now to FIG. 21, a flowchart of a method 2100 is shown. Method 2100 is one embodiment of a method for processing mass storage devices (MSDs) present on target computer system 180. In step 1806, a list of device type identifiers on target computer system 180 that are within the DDCS device classes is generated. This list may include, in one embodiment, one or more MSDs. Because of certain idiosyncrasies related to MSDs in some embodiments, there may be one or more additional MSDs that are not captured by the output of step 1806. (the possibility of a missing MSD is particularly problematic in WINDOWS™-based computer systems.)

Accordingly in step 2110 all MSD device ids are obtained from the configuration settings of the utility operating system running on target computer system 180. In an embodiment in which UOS 190 is Windows PE™, step 2110 may be performed by the following:

1. Get all registry keys under HKEY_LOCAL_MACHINE\HARDWARE\DEVICEMAP\SCSI from the Windows PE™ system.

2. For each key, get the driver value.

3. Get the corresponding service key from HKEY_LOCAL_MACHINE\SYSTEM\ControlSet001\Services 4. Under the service key, get all device ids from the "Enum" key.

As indicated in FIG. 21, the output of step 2110 is indicated as "S1."

Next, in step 2120, a list is obtained for all MSDs that were identified in step 1870. This list thus corresponds to all MSDs present on target computer system 180 for which a device driver is present on target computer system 180. As indicated in FIG. 21, the output of step 2120 is designated as "S2."

In step 2130 it is determined whether the set S1 is equal to the set S2. Note that in the specific embodiment of FIG. 21, because set S1 includes all MSD device ids on target computer system 180, S1 will always be the same size as S2 or greater. (This relationship need not be true in all embodiments, however.) If S1 is equal to S2 in step 2130, method 2100 proceeds to step 2140, in which all of the device type identifiers in set S1 are added to a list called "DSR Device Set." Method 2100 then ends in step 2145.

If, on the other hand, S1 is not equal to S2 in step 2130, method 2100 proceeds to step 2136. In that step, the user is notified of the one or more missing device drivers, and is prompted to respond. The user may choose to either supply one or more of the missing device drivers or to ignore these drivers. Step 2150 determines whether the user has added at least one missing device driver in response to the request for input in step 2136. If the user does not add at least one missing driver, method 2100 proceeds to step 2140.

If, however, it is determined in step 2150 that the user has added at least one missing driver, the corresponding driver package (presumed in the context of FIG. 21 to have been created in step 2136 according to the methods described in FIGS. 11-11A described above) are then retrieved from backup server 162A in step 2160.

Then, in step 2170, steps 1850, 1860 and 1870 of method 1830 are repeated. Thus, the inf database of step 1850 is regenerated to include the one or more driver packages added in step 2136. Steps 1860 and 1870 may then be repeated using the regenerated inf database. The output of this iteration of step 1870 will thus include the one or more MSDs having newly added drivers. Steps 2120, 2130, 2136, etc., of method 2100 will repeat until S1=S2 in step 2130, at which point method 2100 proceeds to step 2140. Other embodiments similar to the functionality of method 2100 are, of course, possible.

Figure 22:
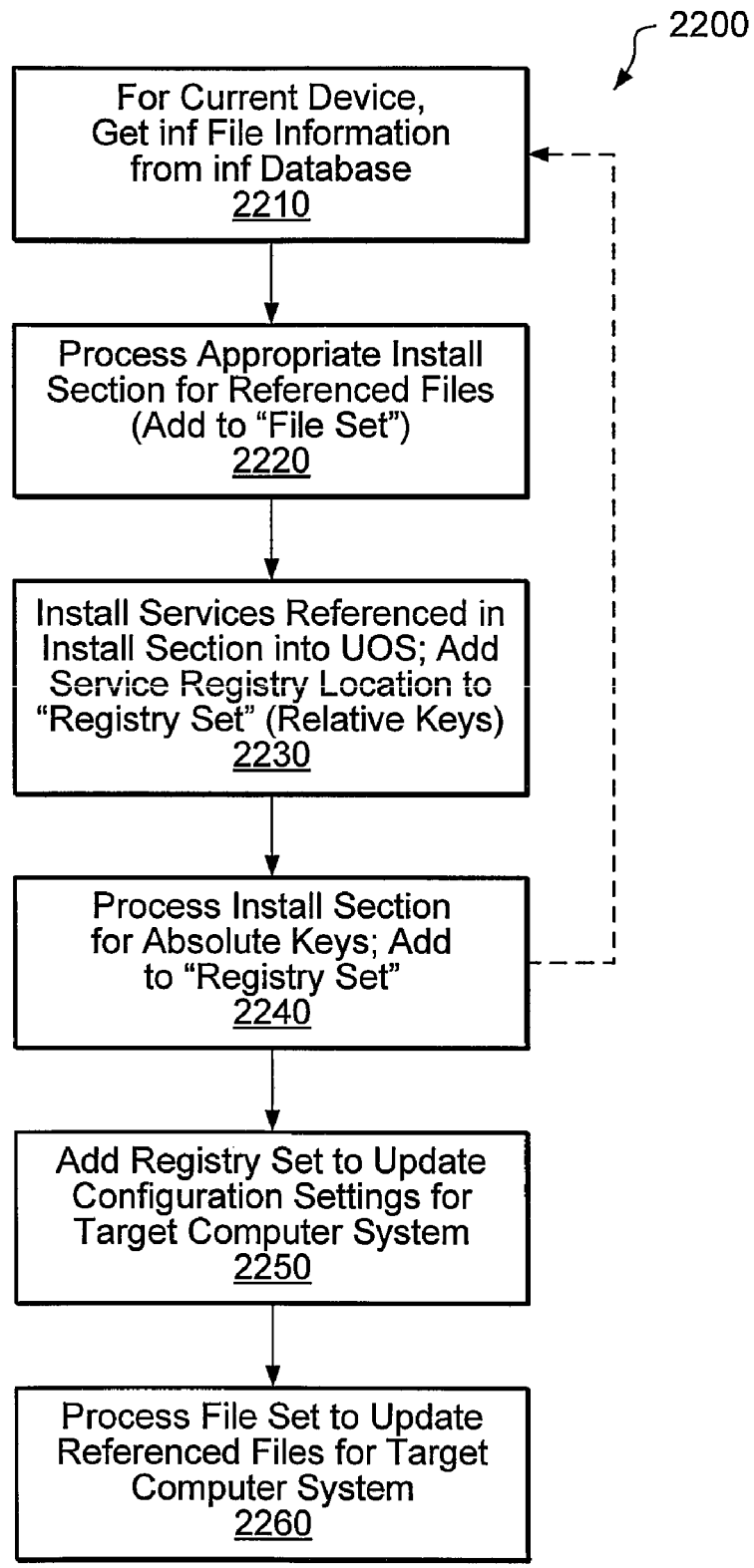
FIG. 22 is a flowchart of one embodiment of a method for processing the devices in the DSR Device Set.

Turning now to FIG. 22, a flowchart of a method 2200 is shown. Method 2200 is one embodiment of a method for processing the devices in the DSR Device Set list. In one embodiment, method 2200 may be performed within step 1818 of method 1800 described with reference to FIG. 18 above. Method 2200 processes those devices listed within DSR Device Set. This list corresponds to devices on target computer system 180 that are within the DDCS device classes, but which do not have corresponding entries in the configuration settings corresponding to the target OS (i.e. the restored configuration settings as opposed to the restoring configuration settings of UOS 190). As described above, DSR Device Set includes, in one embodiment, all MSDs, including those obtained in method 2100 described above, and all other DDCS device class devices, with the exception of NICs.

In step 2210 the first device in the DSR Device Set is processed. In one embodiment, the inf database generated in step 1850 is accessed, using the device type identifier for the current device, in order to determine the inf file and corresponding install section used to install that device. As noted above, in one embodiment, the inf database generated in step 1850 may include, for a given entry, a device type identifier for a given device, a device class for the given device, and the inf file and install section usable to install the device driver for that device.

Next, in step 2220 the corresponding install section (also obtainable via the inf database of step 1850 in one embodiment) is used to determine the one or more files corresponding to that driver. These files are added to a list of files to be processed, referred to as "File Set." Before being added to "File Set," however, referenced files may, in one embodiment, have certain path name information modified to corresponding to the target operating system. Since target computer system 180 is still running under UOS 190, all destination locations specified relative to the referenced files will be UOS 190's destination location. Since target computer system 180 is being restored to the target OS, however, the path names for files in File Set may be altered for the target OS. In one embodiment, the WINDOWS™ API PathUnExpandEnvStrings( ) may be used for this purpose. Then, the directories %SystemRoot%, %SystemDrive%, and %ProgramFiles% may be substituted using path names that are obtained from the restored configuration.

Next, in step 2230, one or more "services" referenced in the current install section are installed using utility OS 190. As used herein, a "service" refers to configuration settings (e.g., in a registry on a WINDOWS™-based computer system) that provide information to an operating system on how to load and execute a device driver program. In one embodiment, the one or more services are installed using UOS 190 in order to process to determine an appropriate update for a "relative" configuration setting. In WINDOWS™-based operating systems, certain sections of a driver information file such as an inf file generate updates to system registry keys that are relative as opposed to absolute. While such updates may be handled by an operating system version such as Windows XP™, such functionality does not exist, for example, Windows PE™. However, the installation of a service referred to in an install section may be used to determine the affect of this installation on one or more configuration settings of UOS 190 (e.g., Windows PE™). These updated values may then be used subsequently to update the corresponding configuration settings for the target OS (i.e., the restored configuration settings). For example, a particular service, "SERVICE 1," may be installed under UOS 190, resulting in an update to relative key KEY 1. The update to KEY 1 may be read and subsequently applied to KEY 1 of the target OS on target computer system 180.

Next, in step 2240, the current install section is processed to determine updates to absolute configuration settings. Like the updates determined in step 2230 these updates are added to a list referred to in method 2200 as "Registry Set." Steps 2210-2240 may then be repeated for each device in DSR Device Set (as shown by the dotted line in FIG. 22). In one embodiment, unique device identifiers for each device (e.g., pnp instance identifiers in a WINDOWS™ operating system) are also added to the Registry Set.

Note that method 2300 described below provides an alternative method for updating the restored configuration settings on target computer system 180 (both absolute and relative configuration settings).

After processing each device in DSR Device Set, the Registry Set and File Set information generated in steps 2210-2240 is then used to update the target OS on target computer system 180 in steps 2250 and 2260.

In step 2250 the registry entries from the UOS 190's configuration settings are copied to the target OS's configuration settings. If UOS 190's configuration settings do not include values that are required for normal functioning of target computer system 180, driver information files on target computer system 180 may be manually processed to complete these missing values.

Finally, in step 2260, the File Set is processed to update the referenced files for devices on target computer system 180. Step 2260 may include copying the files in File Set into a predesignated location on target computer system 180 (e.g., within target OS using modified path names describe above in step 2220). In one embodiment in which target computer system 180 is a Windows™-based computer system, certain files may reside in more than one location. For example, the following steps may be performed within step 2260:

1. If the file is OEM-supplied (not WINDOWS™-native), simply copy the file from the source location into the target OS's destination location 2. If the file is WINDOWS™ native, search the file in the following order:
search %windir%\Driver Cache\I386 directory.
search the cab file SPn.cab where n is the service pack level of the restoring client.
search the cab file SP(n−1).cab, SP(n−2).cab (until SP1.cab).
search driver.cab
Consider the following example in which the target OS is Windows 2000™ SP4, and the file being searched is atapi.sys and the target OS is located in D:\Winnt folder:

1. See if D:\winnt\Driver cache\i386\atapi.sys exists

2. If not, search D:\winnt\Driver cache\i386\SP4.cab to find atapi.sys.

3. If not found, search D:\winnt\Driver cache\i386\SP3.cab

4. If not found, search D:\winnt\Driver cache\i386\SP2.cab

5. If not found, search D:\winnt\Driver cache\i386\SP1.cab

6. If still not found, search D:\winnt\Driver cache\i386\driver.cab

When a particular file within File Set is found, the version of the file that is found should be compared with the one that already exists in the target OS (if any). If the version in the target OS is newer, the file from File Set should not be copied as it may be undesirable to replace a newer copy with an older copy.

Figure 23:
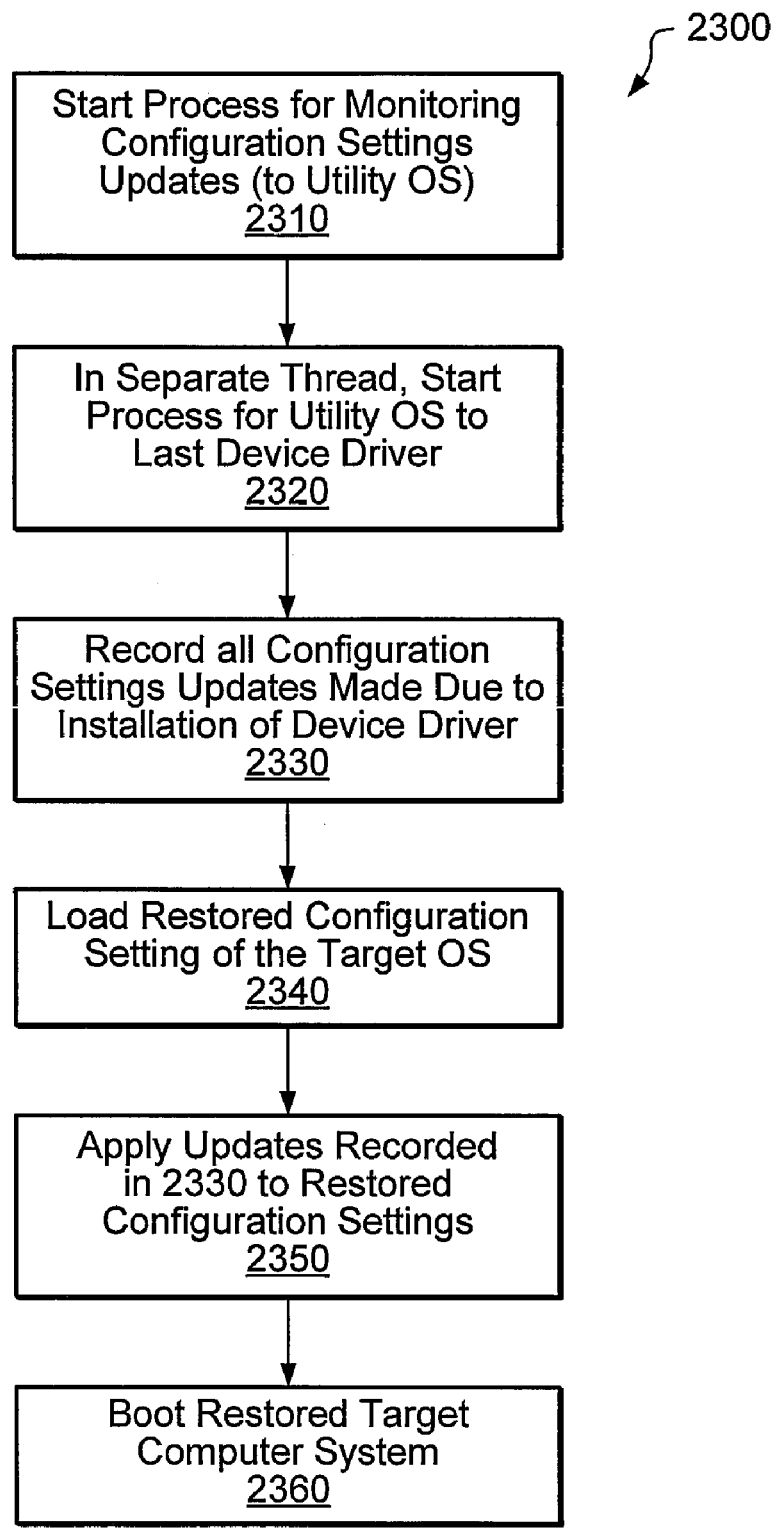
FIG. 23 is a flowchart of one embodiment of a method for monitoring updates to configuration settings of an operating system.

Turning now to FIG. 23, a flowchart of a method 2300 is shown. Method 2300 is one embodiment of a method for monitoring updates to system configuration settings. As described below, method 2300 may be used during installation of a device driver (in one embodiment) to monitor and record changes made to the system configuration settings because of the installation. These recorded changes may then be used to apply updates to configuration settings of another copy of the operating system (e.g., on a different machine) or a different operating system.

Method 2300 commences with step 2310, in which a process for monitoring updates to configuration settings is started. In one embodiment, this process is started on a target computer system running a utility OS such as UOS 190. For example, a monitoring process may be started on a target computer system running Windows PE™ by using the API RegNotifyChangeKeyValue( ). In one embodiment, this API is given the install section of the device driver to be installed as a parameter value. (For example, in one embodiment, such information may be obtained from the inf database generated in step 1850.) Providing the monitoring process an indication of the device driver desired to be monitored allows the process to record only those configuration setting updates that occur because of the indicated device driver. (Note that in some embodiments, the installation of multiple device drivers may be monitored; in such embodiments, indications of the multiple device to be installed are passed to the monitoring process.) During installation of an operating system, many different processes or threads may be active during a given period. Accordingly, these many different processes may all be causing updates to the system configuration settings during this given period. Simply monitoring any updates during the given period may record configuration setting updates due to processes other than those being monitored in method 2300.

Next, in step 2320, a process for utility OS 190 (or other operating system) to install the device driver in question is begun. The process of step 2320 is separate from that of step 2310 (e.g., the processes run in a separate threads, such that they can run concurrently with one another, but independently of one another.) Accordingly, the processes of step 2310 and 2320 are running concurrently on target computer system 180 in one embodiment of method 1800. Steps 2320 and 2310 may be begun substantially at the same time. Note that the utility OS or other OS that is running on target computer system 180 may be installing the device driver for another operating system. For example, Windows PE™ may be used to install device drivers for a operating system such as Windows XP™.

In embodiments in which UOS 190 is Windows PE™, step 2320 may be initiated by using the API SetupInstallFromInfSection( ). In order to know what device driver to install, this API receives the name of the install section for the device driver to be installed. The installation process then begins the installation of the device driver by copying the needed files to the target OS image (e.g., in step 1814 of method 1800).

Once installation of the device driver is begun in step 2320, the monitoring process initiated in step 2310 will record the configuration setting changes made as a result of the device driver installation. In one embodiment, the configuration setting changes being monitored are changes to the configuration settings of the operating system currently running on target computer system 180 (e.g., UOS 190). When Windows PE™ is used to install device drivers for a "full" version of a WINDOWS™ operating system, for example, updates to the configuration settings caused by the installation are made to Windows PE™, not the WINDOWS™ OS for which the device driver is being installed. (The underlying WINDOWS™ OS is not yet fully installed, in on embodiment.) As described below, recording the configuration setting changes to the OS running on target computer system 180, however, may be usable to update the configuration settings of the desired target OS.

In one embodiment, the monitored changes are stored in a database. Note that changes to the configuration settings (which may be a registry, in one embodiment) may be additions of configuration settings, revisions of existing configuration settings, and deletions of configuration settings. Furthermore, these monitored changes may be changes to the values of the configuration settings, as well as changes to names of the configuration settings. For example, in WINDOWS™ systems, updates to both registry keys and registry values are recorded and monitored.

Methods such as method 2300 are particularly useful in detecting changes made to so-called relative configuration settings. For example, in an inf file on a computer system running a WINDOWS™ OS, the install sections for certain device drivers have services that may use a "relative" registry key, which has a value set with reference to another value, such as another key. An example of a relative registry key in one embodiment is "HKR,,TypesSupported,%REG_DWORD%,7" This key, in one embodiment, is used to register operation setting(s) of a device with the operating system (for this particular example, this keys registers the behavior of the event logging of the device).

In contrast, absolute registry keys may be easier to process, as the needed registry updates can typically be determined directly from the corresponding inf file. An example of an absolute registry key is "HKLM,SYSTEM\CurrentControlSet\Services\elxsli2,AutoMap,%REG_DWORD%,0". This key, in one embodiment, is used to register operation setting(s) of a device with the operating system (for this particular example, this keys registers the service parameter of a device). While the WINDOWS™ OS may know how to properly update the relative key in installing the device driver, if a different OS (e.g., UOS 190) is used to perform the installation, the proper way to process the relative registry key may be unknown. Even if the proper way to process the key is known, it may be time-consuming to set, particularly when updates to a large number of relative keys are needed. In one embodiment of step 2330, the underlying installation of the device driver is performed by an API that can properly process configuration setting updates, including relative configuration settings. Accordingly, the monitoring process of step 2310 records these changes. In this manner, manual processing of the corresponding driver information file may be avoided (or at least reduced).

Once installation of the device driver is completed by step 2320, the restored configuration settings are "loaded" in step 2340, meaning that these settings registry can then be updated on target computer system 180. In an embodiment in which a WINDOWS™ operating system is being restored, step 2340 may be performed using the API RegLoadKey( ). Step 2340 may be optional in some embodiments.

Next, in step 2350, the updates recorded in step 2330 are applied to the restored configuration settings. In this manner, the changes made to the OS running on target computer system 180 (e.g., UOS 190) may also be made to the configuration settings of the OS being restored. In performing step 2350, certain configuration settings may not be set for the target OS exactly as they were for the running OS (e.g., UOS 190), however. For example, configuration settings for the running OS that include a path name corresponding to that of the running OS may be changed to use the appropriate path name for the target OS. Other similar modifications of the recorded configuration settings may be appropriate for the configuration settings of the target OS.

Finally, target computer system 180 may then be booted in step 2360 using the target OS, as the changes to the target OS's configuration settings have now been applied. In some embodiments of method 2300, step 2360 is optional. For example, it may be desirable in certain embodiments to perform further processing of target computer system 180 before re-booting the system.

Consider the embodiments of DSR described generally above, including the embodiments described with respect to method 1800. In step 1802, various restore files (device drivers, OS image, etc.) are copied to target computer system 180. Further processing is performed, under control of utility OS (Windows PE™, for example) in steps 1806 and 1810. In step 1814, UOS 190 is used to modify the target OS image to install device drivers referenced by a particular driver information file. In one embodiment, the device driver installation modifies the configuration settings of UOS 190 (not the target OS), even though the device driver is being installed for the target OS. (For example, Windows PE™ can install device drivers for a WINDOWS™ operating system.) As described below, the changes to the configuration settings observed in step 1814 can be subsequently used (e.g., in step 1818) to update the configuration settings of the target OS.

Method 2300 may also be performed in contexts outside of DSR. For example, method 2300 may used to monitor configuration setting updates for device driver installation in a standalone fashion.

Other embodiments of method 2300 may be used to monitor changes to configuration settings that occur due to installation of a desired piece of software (and is thus not limited simply to device drivers). Consider the installation of a first piece of software on a first computer system running a first operating system. By implementing an embodiment of method 2300 in which a monitoring process is initiated prior to the software installation, the configuration setting updates that occur due to the installation of the software can be recorded. Subsequently, if it is desired to install the first piece of software on one or more additional computer systems running the first operating system, these installations may be performed efficiently by using the recorded changes (which may be stored on a server system, in one embodiment, perhaps in a database) to update the configuration settings of the one or more additional computer systems (e.g., clients) in the course of installing the software on these additional systems. Thus a client system could request a copy of the configuration setting updates, which, in response, could be supplied by a server system.

Deployment

FIGS. 2-23 were described above in the context of a dissimilar system restore (DSR), in which information originating from a source computer is backed up (e.g., to backup server 162A) and subsequently restored to target computer system 180, which includes one or more hardware devices that differ from those on the source computer system. The concepts described above are also applicable in a related application, deployment. As in DSR, in deployment information such as an OS image, configuration settings, and device drivers are transferred from a server to one or more client (target) machines. As described below, the concepts described above are equally applicable in the deployment context. In deployment, however, note that there is no "source computer system" per se. Instead, the deployment process is begun (at least in one embodiment) using information (e.g., OS image, etc.) that is located on a server and which may not necessarily have ever resided on a "source" computer system.

Figure 24:
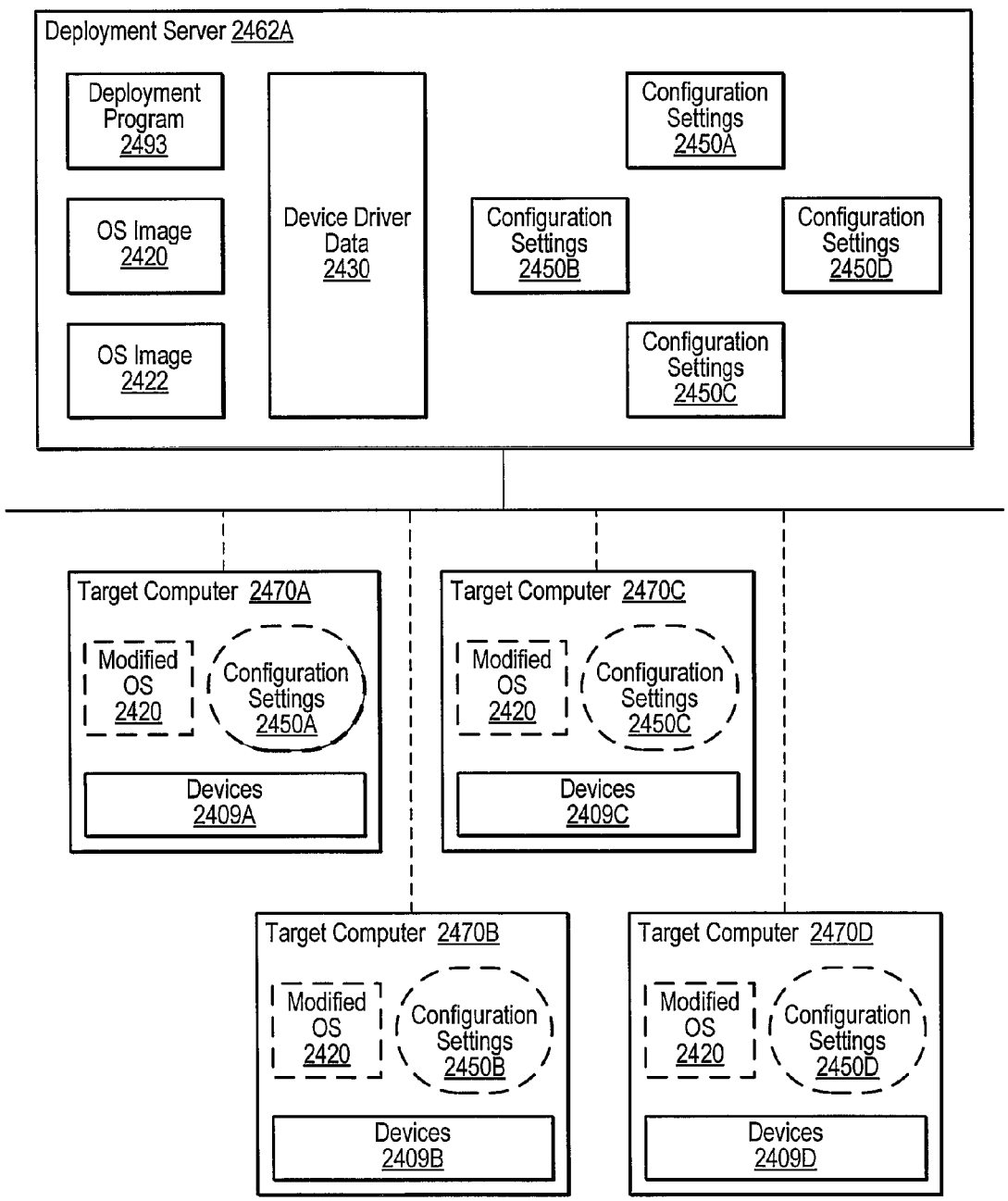
FIG. 24 is a block diagram of one embodiment of a deployment system.

FIG. 24 is a block diagram of a system 2400. System 2400 is one embodiment of a system for deploying data to one or more target computer systems via a network. As shown, system 2400 includes a deployment server 2462A coupled via a network 2496 to a plurality of target computer systems 2470A-D.

Deployment server 2462A stores data and program instructions usable to execute a deployment program 2493. Deployment program 2493 may be used in one embodiment to facilitate the transfer of information between deployment server 2462 and target computer systems 2470, as well as various other tasks relating to deployment (e.g., keeping a log of deployments that have been created, etc.). Deployment program 2493 may also, in one embodiment, have access to information indicating the particular data (e.g., OS version, configuration settings) that is to be deployed to the various target computer systems 2470. Deployment server 2462A stores a variety of information, including OS images 2420 and 2422, device driver packages 2430, and one or more sets of configurations (four sets, labeled 2450A-D, are shown here). Note that the storage architecture of deployment server 2462A may be any suitable configuration, including multiple computer systems or storage arrays in various embodiments.

In the embodiment shown in FIG. 24, deployment server 2462A stores two different OS images, 2420 and 2422. These may be different versions of the same operating system platform or different operating systems altogether. Deployment server 2462A may store an arbitrary number of different OS images. As described below, deployment server 2462A is configured to deploy modified versions of OS images 2420/2422 to selected target computer systems 2470.

Configurations settings 2450A-D correspond to desired configuration settings to be deployed to target computer systems 2470. In the context of FIG. 24, configuration settings 2450A are destined for target computer system 2470A, set 2450B for system 2470B, etc. (although in other embodiments, configurations settings 2450 could be destined for any number or combination of target computer systems 2470). Configuration settings 2450A-D might all be different, even if all four were destined for target computer systems having an identical target OS and hardware configurations.

Deployment server 2462A optionally stores device driver data 2430. Data 2430 may include driver packages such as those described above with reference to FIGS. 10-12. Driver data 2430 may be used by deployment server to modify a desired OS image and set of configuration settings for deployment to a specified target computer system 2470.

As with network 196, network 2496 can be any type of suitable network. Connections between target computer systems 2470 and network 2496 are shown using a dotted line to indicate that these connections may not be working.

Target computer systems 2470A-D are "bare metal" systems in FIG. 24, in that each of these systems currently does not have a functioning operating system installed on them. Target computers 2470A-D are shown as including hardware devices 2409A, 2409A, 2409B and 2409A respectively. Thus, the set of devices in each of target computer systems 2470A, 2470B, and 2470D is identical, but different from the set of devices in 2470C. Devices 2409A-B could also be termed "bare metal" devices, since their target computer systems currently do not have the appropriate device drivers installed.

In the embodiment shown, OS image 2420 has been selected for deployment to target computer 2470A. The methods described above in the context of DSR are also applicable in the deployment context. Image 2420, however, may require modification before deployment in this embodiment. For example, image 2420 may require the addition of one or more device drivers (e.g., using device driver data 2430). OS image 2420 and the required driver packages may then be transferred to system 2470A, wherein methods described above can complete the deployment process (e.g., including modified OS image 2420).

In FIG. 24, OS image 2420 has also been selected for deployment to target computer system 2470B. System 2470B is shown as having the same hardware configuration as 2470A. As such, target computer system 2470B ends up with the same modified OS image 2420 as system 2470A (although system 2470B's configuration settings differ from those of 2470A).

Target computer systems 2470C and 2470D show, respectively, that OS image 2420 can also be deployed to systems having varying hardware configurations (devices 2409B of system 2470C differ from devices 2409A of 2470A-B), and that deployment server can deploy multiple operating systems to systems 2470 (2470D receives OS image 2422).

Figure 25:
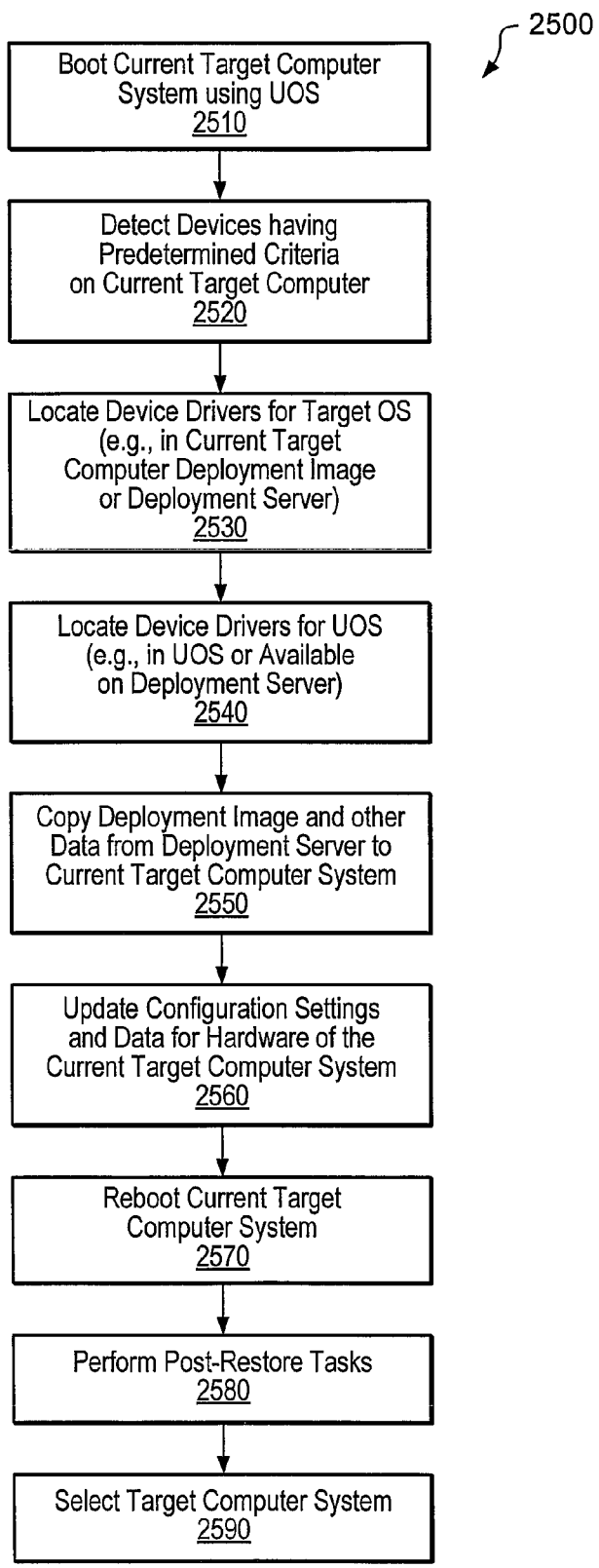
FIG. 25 is a flowchart of one embodiment of a method for deploying data to one or more target computer systems.

Turning now to FIG. 25, a flowchart of a method 2500 is shown. Method 2500 is one embodiment of a method for deploying a system configuration on a deployment server to one or more client (target) computer systems having a hardware configuration different from the system configuration being deployed.

In step 2510, current target computer system 2570 is booted using a UOS such as UOS 190 which detects, in step 2520, those hardware devices 2509 that satisfy a predetermined set device classes (see, for example, methods 300 and 400 described above). Steps 2530 and 2540 attempt to locate device drivers (for the target OS and UOS 190, respectively) for devices identified in step 2520. In one embodiment, steps 2530 and 2540 may both be performed on deployment server 2562A if an image of UOS 190 is copied there. Steps 2530 and 2540 may use methods described above with reference to FIGS. 10-17A.

Next, in step 2550, data is copied to the current target computer system 2570, as in step 1802 of method 1800. At this point, the data from deployment server 2562A has been copied to target computer system 2570. The remainder of method 2500 thus is executed on the target computer system 2570 under the control of UOS 190.

Step 2560 updates the deployment image 2520/2522 and configuration settings 2550 that have been copied to target computer system 2570 according to the hardware on that system. This step may be performed according to the methods described above with reference to FIGS. 18-23 in one embodiment. Target computer system 2570 is then booted in step 2570 using the OS image 2520/2522 that has been restored by the preceding steps. Post-boot processing is performed in step 2580. The next target computer system is selected in step 2590 and method 2500 repeats as needed.

Other Applications

Although the system and method of the present invention have been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

While the embodiments disclosed above have been described in part with respect to specific applications such as DSR and deployment, these embodiments are not intended to specifically limit the applications of these embodiments. For example, as mentioned above, embodiments such as those relating device drivers to UOS 190 may be applicable in other contexts, including "same system restore." Thus, the disclosure is intended to cover such alternatives, modifications, and equivalents, as can be reasonably included within the spirit and scope of the invention as defined by the appended claims.

What is claimed is:

1. One or more computer-readable memory media storing program instructions for restoring a target computer system to run a target operating system, wherein the program instructions are computer-executable to:
    generate a database indicative of a first set of device identifiers that are included within a first plurality of driver information files, wherein the first plurality of driver information files are stored on the target computer system and are usable to install device drivers for devices within a predetermined set of device classes;
    use a first operating system running on the target computer system to determine a second set of device type identifiers that includes one or more device type identifiers for each device running on the target computer system;
    use the second set of device type identifiers to determine those devices running on the target computer system that have a corresponding entry in the database.

2. The computer-readable memory media of claim 1, wherein the first operating system is a utility operating system, wherein the utility operating system does not include an application program interface (API) usable to determine a device class of a device located on the target computer system.

3. The computer-readable memory media of claim 1, wherein the program instructions are further executable to:
    identify a location of one or more driver information files corresponding to one or more network interface cards located on the target computer system;
    update restored configuration settings to be installed on the target computer system;
    wherein the updated restored configuration settings are usable to process the one or more network interface cards after restoration of the target computer system.

4. The computer-readable memory media of claim 1, wherein the program instructions are further executable to:
    delete any network interface cards that are referenced in the restored configuration settings but are not present on the target computer system;
    wherein the restored configuration settings are to be installed on the target computer system.

5. The computer-readable memory media of claim 1, wherein the program instructions are further executable to:
    determine one or more of the predetermined set of device classes from a first set of restored configuration settings that are stored on the target computer system and are associated with the target operating system.

6. The computer-readable memory media of claim 5, wherein the predetermined set of device classes includes at least one device class designated as a critical device class within the first set of restored configuration settings.

7. The computer-readable memory media of claim 1, wherein the program instructions are further executable to:
    generate a difference set by determining those devices on the target computer system having a device type identifier within the third set of device type identifiers that do not have an entry in restored configuration settings to be installed on the target computer system.

8. The computer-readable memory media of claim 7, wherein the program instructions are further executable to:
    update the restored configuration settings to include one or more devices indicated by the difference set.

9. The computer-readable memory media of claim 1, wherein the program instructions are executable to:
    select a first driver information file on the target computer system;

select at least a first install section from the first driver information file, wherein the first install section corresponds to the target operating system;

determine at least a first device type identifier referenced within the first install section, wherein the first device type identifier corresponds to a first device;

include the first device type identifier within the first set of device type identifiers.

10. The computer-readable memory media of claim 9, wherein the program instructions are executable to:

update the database to include a first entry, wherein the first entry includes the first device type identifier, a device class of the first device, wherein the device class of the first device is within the predetermined set of device classes.

11. The computer-readable memory media of claim 10, wherein the first entry further includes a name of the first driver information file and a name of the first install section.

12. The computer-readable memory media of claim 9, wherein the first install section also corresponds to a hardware architecture of the target computer system.

13. One or more computer-readable memory media storing program instructions for restoring a target computer system to run a target operating system, wherein the program instructions are computer-executable under a first operating system running on the target computer system to:

determine whether any mass storage device on the target computer system is missing a corresponding device driver;

obtain, from a user, one or more driver information files corresponding to a first mass storage device on the target computer system that is missing a device driver; and create, from the one or more driver packages received from the user, a driver package corresponding to the first mass storage device.

14. The computer-readable memory media of claim 13, wherein the program instructions are executable to:

obtain, from a first set of configuration settings corresponding to the first operating system, a first set of device type identifiers, wherein the first set includes at least one device type identifier for each mass storage device on the target computer system;

determine a second set of device type identifiers corresponding to those mass storage devices on the target computer system for which a device driver is available;

compare the first and second sets of device type identifiers.

15. One or more computer-readable memory media storing program instructions for restoring a target computer system to run a target operating system, wherein the program instructions are computer-executable under a first operating system running on the target computer system to:

determine a list of devices on the target computer system that are within a predetermined set of device classes and that do not have corresponding entries in a first set of restored configuration settings corresponding to the target operating system;

for each device in the list of devices:

determine a corresponding driver information file on the target computer system and an install section of the driver information associated with that device;

use the install section to determine one or more device driver files and one or more updates to the restored configuration settings that are associated with installation of a device driver for that device.

16. The computer-readable memory media of claim 15, wherein the program instructions, for a given device in the list of devices, are executable to:

apply the one or more updates to the restored configuration settings for the given device; and copy the device driver files for the given device to the target operating system.

17. The computer-readable memory media of claim 15, wherein the program instructions are executable to:

process a first install section of a first driver information file to determine one or more updates to absolute configuration settings associated with a first device.

18. The computer-readable memory media of claim 15, wherein the program instructions are executable to:

modify a path name associated with one or more device driver files referenced within a first install section of a first driver information file, wherein the first install section is associated with a first device;

copy the one or more device driver files to a location specified by the modified path name, wherein the location corresponds to the target operating system.

19. The computer-readable memory media of claim 15, wherein the program instructions are executable to:

install, using the first operating system, a first service referenced by a first install section of a first driver information file, wherein the first install section is associated with a first device;

retrieve a configuration setting of the first operating system that is updated by installation of the first device;

apply the retrieved configuration setting to a corresponding configuration setting of the target operating system.

20. The computer-readable memory media of claim 19, wherein the configuration setting of the first operating is a relative configuration setting.

* * * * *